United States Patent
Yi et al.

(10) Patent No.: US 11,005,637 B2
(45) Date of Patent: May 11, 2021

(54) METHOD AND USER EQUIPMENT FOR RECEIVING DOWNLINK CHANNEL, AND METHOD AND BASE STATION FOR TRANSMITTING DOWNLINK CHANNEL

(71) Applicant: LG ELECTRONICS INC., Seoul (KR)

(72) Inventors: Yunjung Yi, Seoul (KR); Hyangsun You, Seoul (KR); Hyunho Lee, Seoul (KR)

(73) Assignee: LG Electronics Inc., Seoul (KR)

(*) Notice: Subject to any disclaimer, the term of this patent is extended or adjusted under 35 U.S.C. 154(b) by 214 days.

(21) Appl. No.: 16/318,360

(22) PCT Filed: Jul. 21, 2017

(86) PCT No.: PCT/KR2017/007917
§ 371 (c)(1),
(2) Date: Jan. 16, 2019

(87) PCT Pub. No.: WO2018/016923
PCT Pub. Date: Jan. 25, 2018

(65) Prior Publication Data
US 2019/0229879 A1    Jul. 25, 2019

Related U.S. Application Data

(60) Provisional application No. 62/365,349, filed on Jul. 21, 2016, provisional application No. 62/373,958, (Continued)

(51) Int. Cl.
*H04L 5/00*    (2006.01)
*H04L 1/00*    (2006.01)
(Continued)

(52) U.S. Cl.
CPC .......... *H04L 5/0082* (2013.01); *H04L 1/0038* (2013.01); *H04L 5/005* (2013.01);
(Continued)

(58) Field of Classification Search
CPC ........... H04W 72/042; H04W 72/0446; H04W 72/14; H04L 5/005; H04L 5/0051; H04L 5/0082; H04L 1/0038
See application file for complete search history.

(56) References Cited

U.S. PATENT DOCUMENTS

2013/0266094 A1* 10/2013 Orio .................... H04L 27/2653
                                                                  375/340
2015/0131560 A1   5/2015 Von Elbwart et al.
2019/0141679 A1*  5/2019 He ........................ H04L 5/0007

FOREIGN PATENT DOCUMENTS

KR    1020090034263    4/2009
WO    2013055193       4/2013

OTHER PUBLICATIONS

He et al., U.S. Appl. No. 62/331,740 dated May 4, 2016, whole document. (Year: 2016).*

(Continued)

*Primary Examiner* — Kodzovi Acolatse
*Assistant Examiner* — Farhad Ali
(74) *Attorney, Agent, or Firm* — Lee Hong Degerman Kang Waimey

(57) ABSTRACT

The present invention relates to a wireless communication system and provides a method and a device therefor, the method comprising: a step of receiving a downlink control channel carrying downlink control information on at least one OFDM symbol in a TTI; and a step of receiving, in the TTI, a downlink data channel on the basis of the downlink control information, wherein the downlink control channel is received by using one or more CCEs, wherein each of the CCEs comprises multiple REGs, wherein each of the REGs
(Continued)

comprises an N number of consecutive subcarriers in the same OFDM symbol, wherein the downlink data channel is received by using at least one RB, wherein the N is the same as the number of subcarriers constituting the RB.

14 Claims, 24 Drawing Sheets

Related U.S. Application Data filed on Aug. 11, 2016, provisional application No. 62/413,951, filed on Oct. 27, 2016.

(51) Int. Cl.
*H04W 24/08* (2009.01)
*H04W 72/04* (2009.01)
*H04W 76/11* (2018.01)
*H04W 72/14* (2009.01)
*H04W 88/02* (2009.01)

(52) U.S. Cl.
CPC .......... *H04L 5/0044* (2013.01); *H04L 5/0051* (2013.01); *H04L 5/0094* (2013.01); *H04W 24/08* (2013.01); *H04W 72/042* (2013.01); *H04W 72/0446* (2013.01); *H04W 72/14* (2013.01); *H04W 76/11* (2018.02); *H04W 88/02* (2013.01); *H04L 5/001* (2013.01); *H04L 5/0007* (2013.01)

(56) References Cited

OTHER PUBLICATIONS

PCT International Application No. PCT/KR2017/007917, Written Opinion of the International Searching Authority dated Oct. 24, 2017, 25 pages.
Huawei, et al., "Views on TTI length", 3GPP TSG RAN WG1 Meeting #85, R1-164058, May 2016, 5 pages.
Samsung, "Discussion on TTI, subframe and signalling timing for NR", 3GPP TSG RAN WG1 Meeting #85, R1-164004, May 2016, 5 pages.

\* cited by examiner

[P] RE occupied by CRS of port p ( p∈0, p∈0,1 or p∈0,1,2,3 )

▨ RE occupied by UE-RS of port(s) p ( p∈7, p∈8, p∈7,8 or p∈7,8,11,13 )

▧ RE occupied by UE-RS of port(s) p ( p∈9, p∈10, p∈9,10 or p∈9,10,12,14 )

(a)

(b)

(c)

METHOD AND USER EQUIPMENT FOR RECEIVING DOWNLINK CHANNEL, AND METHOD AND BASE STATION FOR TRANSMITTING DOWNLINK CHANNEL

CROSS-REFERENCE TO RELATED APPLICATIONS

This application is the National Stage filing under 35 U.S.C. 371 of International Application No. PCT/KR2017/007917, filed on Jul. 21, 2017, which claims the benefit of U.S. Provisional Application No. 62/365,349, filed on Jul. 21, 2016, 62/373,958, filed on Aug. 11, 2016, and 62/413,951, filed on Oct. 27, 2016, the contents of which are all hereby incorporated by reference herein in their entirety.

TECHNICAL FIELD

The present invention relates to a wireless communication system, and more particularly, to a method and apparatus for transmitting/receiving a downlink channel.

BACKGROUND ART

With appearance and spread of machine-to-machine (M2M) communication and a variety of devices such as smartphones and tablet PCs and technology demanding a large amount of data transmission, data throughput needed in a cellular network has rapidly increased. To satisfy such rapidly increasing data throughput, carrier aggregation technology, cognitive radio technology, etc. for efficiently employing more frequency bands and multiple input multiple output (MIMO) technology, multi-base station (BS) cooperation technology, etc. for raising data capacity transmitted on limited frequency resources have been developed.

A general wireless communication system performs data transmission/reception through one downlink (DL) band and through one uplink (UL) band corresponding to the DL band (in case of a frequency division duplex (FDD) mode), or divides a prescribed radio frame into a UL time unit and a DL time unit in the time domain and then performs data transmission/reception through the UL/DL time unit (in case of a time division duplex (TDD) mode). A base station (BS) and a user equipment (UE) transmit and receive data and/or control information scheduled on a prescribed time unit basis, e.g. on a subframe basis. The data is transmitted and received through a data region configured in a UL/DL subframe and the control information is transmitted and received through a control region configured in the UL/DL subframe. To this end, various physical channels carrying radio signals are formed in the UL/DL subframe. In contrast, carrier aggregation technology serves to use a wider UL/DL bandwidth by aggregating a plurality of UL/DL frequency blocks in order to use a broader frequency band so that more signals relative to signals when a single carrier is used can be simultaneously processed.

In addition, a communication environment has evolved into increasing density of nodes accessible by a user at the periphery of the nodes. A node refers to a fixed point capable of transmitting/receiving a radio signal to/from the UE through one or more antennas. A communication system including high-density nodes may provide a better communication service to the UE through cooperation between the nodes.

DISCLOSURE OF THE INVENTION

Technical Task

Due to introduction of new radio communication technology, the number of user equipments (UEs) to which a BS should provide a service in a prescribed resource region increases and the amount of data and control information that the BS should transmit to the UEs increases. Since the amount of resources available to the BS for communication with the UE(s) is limited, a new method in which the BS efficiently receives/transmits uplink/downlink data and/or uplink/downlink control information using the limited radio resources is needed.

With development of technologies, overcoming delay or latency has become an important challenge. Applications whose performance critically depends on delay/latency are increasing. Accordingly, a method to reduce delay/latency compared to the legacy system is demanded.

Also, with development of smart devices, a new scheme for efficiently transmitting/receiving a small amount of data or efficiently transmitting/receiving data occurring at a low frequency is required.

In addition, a signal transmission/reception method is required in the system supporting new radio access technologies.

The technical objects that can be achieved through the present invention are not limited to what has been particularly described hereinabove and other technical objects not described herein will be more clearly understood by persons skilled in the art from the following detailed description.

Technical Solution

In an aspect of the present invention, provided is a method of receiving a downlink channel by a User Equipment (UE) in a wireless communication system. The method may include: receiving a downlink control channel carrying downlink control information in at least one Orthogonal Frequency Division Multiplexing (OFDM) symbol within a Transmission Time Interval (TTI); and receiving a downlink data channel within the TTI based on the downlink control information. In this case, the downlink control channel may be received using one or more Control Channel Elements (CCEs), each of which is composed of a plurality of Resource Element Groups (REGs), each of which is composed of N consecutive subcarriers in one same OFDM symbol. In addition, the downlink data channel may be received using at least one Resource Block (RB), and N may be equal to the number of subcarriers constituting one RB.

In another aspect of the present invention, provided is a User Equipment (UE) used in a wireless communication system. The UE may include: a Radio Frequency (RF) unit; and a processor configured to control the RF unit, the processor configured to: receive a downlink control channel carrying downlink control information in at least one Orthogonal Frequency Division Multiplexing (OFDM) symbol within a Transmission Time Interval (TTI); and receive a downlink data channel within the TTI based on the downlink control information. In this case, the downlink control channel may be received using one or more Control Channel Elements (CCEs), each of which is composed of a plurality of Resource Element Groups (REGs), each of which is composed of N consecutive subcarriers in one same OFDM symbol. In addition, the downlink data channel may be received using at least one Resource Block (RB), and N may be equal to the number of subcarriers constituting one RB.

Preferably, N may be 12.

Preferably, the number of REGs constituting each CCE may vary according to a Reference Signal (RS) configuration in an OFDM symbol, and the number of REGs constituting one CCE in an OFDM symbol having an RS set therein is greater than the number of REGs constituting one CCE in an OFDM symbol having no RS set therein.

Preferably, receiving the downlink control channel may include performing blind decoding of downlink control channel candidates, each of which is composed of one or more CCEs. The number of CCEs constituting one downlink control channel candidate may vary according to a Reference Signal (RS) configuration in an OFDM symbol, and the number of CCEs constituting one downlink control channel candidate in an OFDM symbol having an RS set therein may be twice the number of CCEs constituting one downlink control channel candidate in an OFDM symbol having no RS set therein.

Preferably, receiving the downlink control channel may include monitoring downlink control channel candidates in a plurality of search spaces configured per Aggregation Level (AL), and each search space may have an identical starting location in a CCE domain regardless of ALs.

Preferably, the TTI may be equal to or less than 0.5 ms in a time domain.

Preferably, the TTI may be configured within a different TTI with a length of 1 ms in a time domain.

Preferably, CCEs in the at least one OFDM symbol may be indexed in a time-first or frequency-first manner.

Advantageous Effects

According to the present invention, uplink/downlink signals can be efficiently transmitted/received. Therefore, overall throughput of a radio communication system can be improved.

According to an embodiment of the present invention, delay/latency occurring during communication between a user equipment and a base station may be reduced.

In addition, owing to development of smart devices, it is possible to efficiently transmit/receive not only a small amount of data but also data which occurs infrequently.

Moreover, signals can be transmitted/received in the system supporting new radio access technologies.

It will be appreciated by persons skilled in the art that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention.

BEST MODE FOR INVENTION

Figure 1:
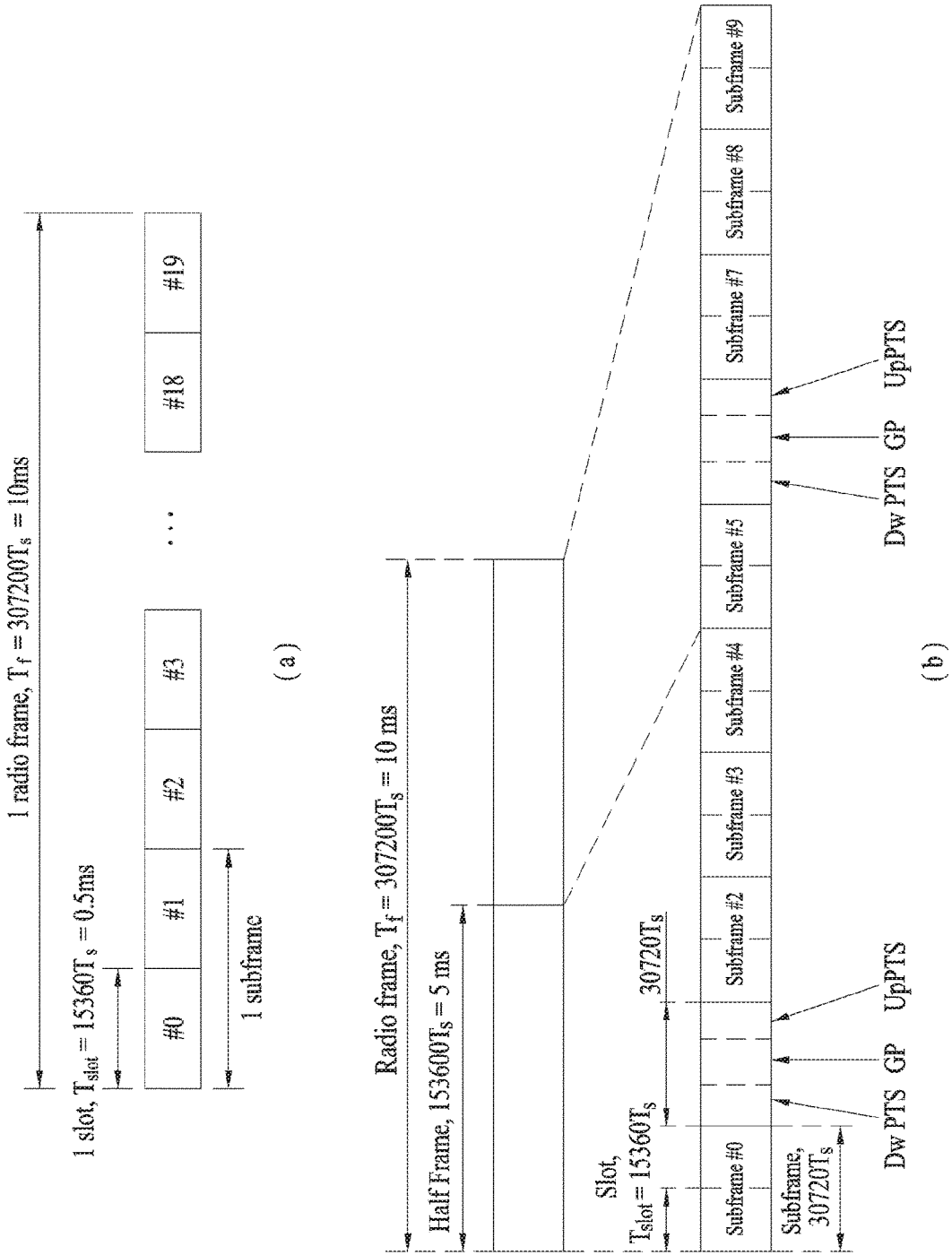
FIG. 1 illustrates the structure of a radio frame used in a wireless communication system.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, it is assumed that the present invention is applied to 3GPP LTE/LTE-A. However, the technical features of the present invention are not limited thereto. For example, although the following detailed description is given based on a mobile communication system corresponding to a 3GPP LTE/LTE-A system, aspects of the present invention that are not specific to 3GPP LTE/LTE-A are applicable to other mobile communication systems.

For example, the present invention is applicable to contention based communication such as Wi-Fi as well as non-contention based communication as in the 3GPP LTE/LTE-A system in which an eNB allocates a DL/UL time/frequency resource to a UE and the UE receives a DL signal and transmits a UL signal according to resource allocation of the eNB. In a non-contention based communication scheme, an access point (AP) or a control node for controlling the AP allocates a resource for communication between the UE and the AP, whereas, in a contention based communication scheme, a communication resource is occupied through contention between UEs which desire to access the AP. The contention based communication scheme will now be described in brief. One type of the contention based communication scheme is carrier sense multiple access (CSMA). CSMA refers to a probabilistic media access control (MAC) protocol for confirming, before a node or a communication device transmits traffic on a shared transmission medium (also called a shared channel) such as a frequency band, that there is no other traffic on the same shared transmission medium. In CSMA, a transmitting device determines whether another transmission is being performed before attempting to transmit traffic to a receiving device. In other words, the transmitting device attempts to detect presence of a carrier from another transmitting device before attempting to perform transmission. Upon sensing the carrier, the transmitting device waits for another transmission device which is performing transmission to finish transmission, before performing transmission thereof. Consequently, CSMA can be a communication scheme based on the principle of "sense before transmit" or "listen before talk". A scheme for avoiding collision between transmitting devices in the contention based communication system using CSMA includes carrier sense multiple access with collision detection (CSMA/CD) and/or carrier sense multiple access with collision avoidance (CSMA/CA). CSMA/CD is a collision detection scheme in a wired local area network (LAN) environment. In CSMA/CD, a personal computer (PC) or a server which desires to perform communication in an Ethernet environment first confirms whether communication occurs on a network and, if another device carries data on the network, the PC or the server waits and then transmits data. That is, when two or more users (e.g. PCs, UEs, etc.) simultaneously transmit data, collision occurs between simultaneous transmission and CSMA/CD is a scheme for flexibly transmitting data by monitoring collision. A transmitting device using CSMA/CD adjusts data transmission thereof by sensing data transmission performed by another device using a specific rule. CSMA/CA is a MAC protocol specified in IEEE 802.11 standards. A wireless LAN (WLAN) system conforming to IEEE 802.11 standards does not use CSMA/CD which has been used in IEEE 802.3 standards and uses CA, i.e. a collision avoidance scheme. Transmission devices always sense carrier of a network and, if the network is empty, the transmission devices wait for determined time according to locations thereof registered in a list and then transmit data. Various methods are used to determine priority of the transmission devices in the list and to reconfigure priority. In a system according to some versions of IEEE 802.11 standards, collision may occur and, in this case, a collision sensing procedure is performed. A transmission device using CSMA/CA avoids collision between data transmission thereof and data transmission of another transmission device using a specific rule.

In the present invention, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present invention, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. In describing the present invention, a BS will be referred to as an eNB.

In the present invention, a node refers to a fixed point capable of transmitting/receiving a radio signal through communication with a UE. Various types of eNBs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, the node may not be an eNB. For example, the node may be a radio remote head (RRH) or a radio remote unit (RRU). The RRH or RRU generally has a lower power level than a power level of an eNB. Since the RRH or RRU (hereinafter, RRH/RRU) is generally connected to the eNB through a dedicated line such as an optical cable, cooperative communication between RRH/RRU and the eNB can be smoothly performed in comparison with cooperative communication between eNBs connected by a radio line. At least one antenna is installed per node. The antenna may mean a physical antenna or mean an antenna port or a virtual antenna.

In the present invention, a cell refers to a prescribed geographical area to which one or more nodes provide a communication service. Accordingly, in the present invention, communicating with a specific cell may mean communicating with an eNB or a node which provides a communication service to the specific cell. In addition, a DL/UL signal of a specific cell refers to a DL/UL signal from/to an eNB or a node which provides a communication service to the specific cell. A node providing UL/DL communication services to a UE is called a serving node and a cell to which UL/DL communication services are provided by the serving node is especially called a serving cell. Furthermore, channel status/quality of a specific cell refers to channel status/quality of a channel or communication link formed between an eNB or node which provides a communication service to the specific cell and a UE. The UE may measure DL channel state received from a specific node using cell-specific reference signal(s) (CRS(s)) transmitted on a CRS resource and/or channel state information reference signal(s) (CSI-RS(s)) transmitted on a CSI-RS resource, allocated by antenna port(s) of the specific node to the specific node. Detailed CSI-RS configuration may be understood with reference to 3GPP TS 36.211 and 3GPP TS 36.331 documents.

Meanwhile, a 3GPP LTE/LTE-A system uses the concept of a cell in order to manage radio resources and a cell associated with the radio resources is distinguished from a cell of a geographic region.

A "cell" of a geographic region may be understood as coverage within which a node can provide service using a carrier and a "cell" of a radio resource is associated with bandwidth (BW) which is a frequency range configured by the carrier. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of a radio resource used by the node. Accordingly, the term "cell" may be used to indicate service coverage of the node sometimes, a radio resource at other times, or a range that a signal using a radio resource can reach with valid strength at other times. The "cell" of the radio resource will be described later in more detail.

3GPP LTE/LTE-A standards define DL physical channels corresponding to resource elements carrying information derived from a higher layer and DL physical signals corresponding to resource elements which are used by a physical layer but which do not carry information derived from a higher layer. For example, a physical downlink shared channel (PDSCH), a physical broadcast channel (PBCH), a physical multicast channel (PMCH), a physical control format indicator channel (PCFICH), a physical downlink control channel (PDCCH), and a physical hybrid ARQ indicator channel (PHICH) are defined as the DL physical channels, and a reference signal and a synchronization signal are defined as the DL physical signals. A reference signal (RS), also called a pilot, refers to a special waveform of a predefined signal known to both a BS and a UE. For example, a cell-specific RS (CRS), a UE-specific RS (UE-RS), a positioning RS (PRS), and channel state information RS (CSI-RS) may be defined as DL RSs. Meanwhile, the 3GPP LTE/LTE-A standards define UL physical channels corresponding to resource elements carrying information derived from a higher layer and UL physical signals corresponding to resource elements which are used by a physical layer but which do not carry information derived from a higher layer. For example, a physical uplink shared channel (PUSCH), a physical uplink control channel (PUCCH), and a physical random access channel (PRACH) are defined as the UL physical channels, and a demodulation reference signal (DM RS) for a UL control/data signal and a sounding reference signal (SRS) used for UL channel measurement are defined as the UL physical signals.

In the present invention, a physical downlink control channel (PDCCH), a physical control format indicator channel (PCFICH), a physical hybrid automatic retransmit request indicator channel (PHICH), and a physical downlink shared channel (PDSCH) refer to a set of time-frequency resources or resource elements (REs) carrying downlink control information (DCI), a set of time-frequency resources or REs carrying a control format indicator (CFI), a set of time-frequency resources or REs carrying downlink acknowledgement (ACK)/negative ACK (NACK), and a set of time-frequency resources or REs carrying downlink data, respectively. In addition, a physical uplink control channel (PUCCH), a physical uplink shared channel (PUSCH) and a physical random access channel (PRACH) refer to a set of time-frequency resources or REs carrying uplink control information (UCI), a set of time-frequency resources or REs carrying uplink data and a set of time-frequency resources or REs carrying random access signals, respectively. In the present invention, in particular, a time-frequency resource or RE that is assigned to or belongs to PDCCH/PCFICH/PHICH/PDSCH/PUCCH/PUSCH/PRACH is referred to as PDCCH/PCFICH/PHICH/PDSCH/PUCCH/PUSCH/PRACH RE or PDCCH/PCFICH/PHICH/PDSCH/PUCCH/PUSCH/PRACH time-frequency resource, respectively. Therefore, in the present invention, PUCCH/PUSCH/PRACH transmission of a UE is conceptually identical to UCI/uplink data/random access signal transmission on PUSCH/PUCCH/PRACH, respectively. In addition, PDCCH/PCFICH/PHICH/PDSCH transmission of an eNB is conceptually identical to downlink data/DCI transmission on PDCCH/PCFICH/PHICH/PDSCH, respectively.

Hereinafter, OFDM symbol/subcarrier/RE to or for which CRS/DMRS/CSI-RS/SRS/UE-RS/TRS is assigned or configured will be referred to as CRS/DMRS/CSI-RS/SRS/UE-RS/TRS symbol/carrier/subcarrier/RE. For example, an OFDM symbol to or for which a tracking RS (TRS) is assigned or configured is referred to as a TRS symbol, a subcarrier to or for which the TRS is assigned or configured is referred to as a TRS subcarrier, and an RE to or for which the TRS is assigned or configured is referred to as a TRS RE. In addition, a subframe configured for transmission of the TRS is referred to as a TRS subframe. Moreover, a subframe in which a broadcast signal is transmitted is referred to as a broadcast subframe or a PBCH subframe and a subframe in which a synchronization signal (e.g. PSS and/or SSS) is transmitted is referred to a synchronization signal subframe or a PSS/SSS subframe. OFDM symbol/subcarrier/RE to or for which PSS/SSS is assigned or configured is referred to as PSS/SSS symbol/subcarrier/RE, respectively.

In the present invention, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna ports configured to transmit CRSs may be distinguished from each other by the locations of REs occupied by the CRSs according to CRS ports, antenna ports configured to transmit UE-RSs may be distinguished from each other by the locations of REs occupied by the UE-RSs according to UE-RS ports, and antenna ports configured to transmit CSI-RSs may be distinguished from each other by the locations of REs occupied by the CSI-RSs according to CSI-RS ports. Therefore, the term CRS/UE-RS/CSI-RS/TRS ports may also be used to indicate a pattern of REs occupied by CRSs/UE-RSs/CSI-RSs/TRSs in a predetermined resource region. In the present invention, both a DMRS and a UE-RS refer to RSs for demodulation and, therefore, the terms DMRS and UE-RS are used to refer to RSs for demodulation.

For terms and technologies which are not specifically described among the terms of and technologies employed in this specification, 3GPP LTE/LTE-A standard documents, for example, 3GPP TS 36.211, 3GPP TS 36.212, 3GPP TS 36.213, 3GPP TS 36.321 and 3GPP TS 36.331 may be referenced.

FIG. 1 illustrates the structure of a radio frame used in a wireless communication system.

Specifically, FIG. 1(a) illustrates an exemplary structure of a radio frame which can be used in frequency division multiplexing (FDD) in 3GPP LTE/LTE-A and FIG. 1(b) illustrates an exemplary structure of a radio frame which can be used in time division multiplexing (TDD) in 3GPP LTE/LTE-A.

Referring to FIG. 1, a 3GPP LTE/LTE-A radio frame is 10 ms (307,200$T_s$) in duration. The radio frame is divided into 10 subframes of equal size. Subframe numbers may be assigned to the 10 subframes within one radio frame, respectively. Here, $T_s$ denotes sampling time where $T_s=1/(2048*15$ kHz$)$. Each subframe is 1 ms long and is further divided into two slots. 20 slots are sequentially numbered from 0 to 19 in one radio frame. Duration of each slot is 0.5 ms. A time interval in which one subframe is transmitted is defined as a transmission time interval (TTI). Time resources may be distinguished by a radio frame number (or radio frame index), a subframe number (or subframe index), a slot number (or slot index), and the like.

A TTI refers to an interval at which data may be scheduled. For example, referring to FIGS. 1 and 3, the transmission opportunity of a UL grant or DL grant is given every 1 ms in the current LTE/LTE-A system. The UL/DL grant opportunity is not given several times within a time shorter than 1 ms. Accordingly, the TTI is 1 ms in the current LTE-LTE-A system.

A radio frame may have different configurations according to duplex modes. In FDD mode for example, since DL transmission and UL transmission are discriminated according to frequency, a radio frame for a specific frequency band operating on a carrier frequency includes either DL subframes or UL subframes. In TDD mode, since DL transmission and UL transmission are discriminated according to time, a radio frame for a specific frequency band operating on a carrier frequency includes both DL subframes and UL subframes.

Table 1 shows an exemplary UL-DL configuration within a radio frame in TDD mode.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a DL subframe, U denotes a UL subframe, and S denotes a special subframe. The special subframe includes three fields, i.e. downlink pilot time slot (DwPTS), guard period (GP), and uplink pilot time slot (UpPTS). DwPTS is a time slot reserved for DL transmission and UpPTS is a time slot reserved for UL transmission. Table 2 shows an example of the special subframe configuration.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Figure 2:
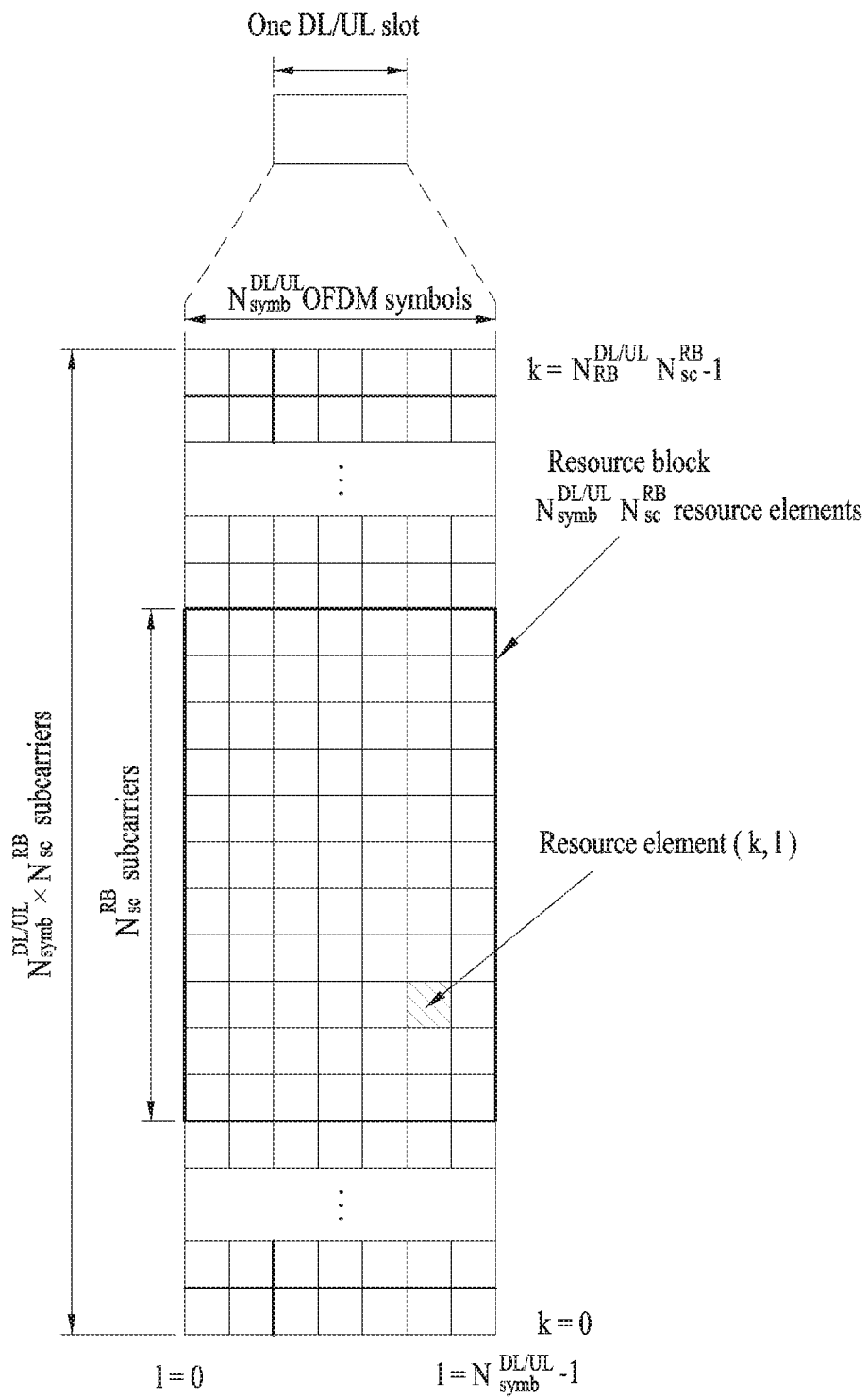
FIG. 2 illustrates the structure of a downlink (DL)/uplink (UL) slot in a wireless communication system.

FIG. 2 illustrates the structure of a DL/UL slot structure in a wireless communication system.

Referring to FIG. 2, a slot includes a plurality of orthogonal frequency division multiplexing (OFDM) symbols in the time domain and includes a plurality of resource blocks (RBs) in the frequency domain. The OFDM symbol may refer to one symbol duration. Referring to FIG. 2, a signal transmitted in each slot may be expressed by a resource grid including $N^{DL/UL}_{RB} * N^{RB}_{sc}$ subcarriers and $N^{DL/UL}_{symb}$ OFDM symbols. $N^{DL}_{RB}$ denotes the number of RBs in a DL slot and $N^{UL}_{RB}$ denotes the number of RBs in a UL slot. $N^{DL}_{RB}$ and $N^{UL}_{RB}$ depend on a DL transmission bandwidth and a UL transmission bandwidth, respectively. $N^{DL}_{symb}$ denotes the number of OFDM symbols in a DL slot, $N^{UL}_{symb}$ denotes the number of OFDM symbols in a UL slot, and $N^{RB}_{sc}$ denotes the number of subcarriers configuring one RB.

An OFDM symbol may be referred to as an OFDM symbol, a single carrier frequency division multiplexing (SC-FDM) symbol, etc. according to multiple access schemes. The number of OFDM symbols included in one slot may be varied according to channel bandwidths and CP lengths. For example, in a normal cyclic prefix (CP) case, one slot includes 7 OFDM symbols. In an extended CP case, one slot includes 6 OFDM symbols. Although one slot of a subframe including 7 OFDM symbols is shown in FIG. 2 for convenience of description, embodiments of the present invention are similarly applicable to subframes having a different number of OFDM symbols. Referring to FIG. 2, each OFDM symbol includes $N^{DL/UL}_{RB} * N^{RB}_{sc}$ subcarriers in the frequency domain. The type of the subcarrier may be divided into a data subcarrier for data transmission, a reference signal (RS) subcarrier for RS transmission, and a null subcarrier for a guard band and a DC component. The null subcarrier for the DC component is unused and is mapped to a carrier frequency $f_0$ in a process of generating an OFDM signal or in a frequency up-conversion process. The carrier frequency is also called a center frequency $f_c$.

One RB is defined as $N^{DL/UL}_{symb}$ (e.g. 7) consecutive OFDM symbols in the time domain and as $N^{RB}_{sc}$ (e.g. 12) consecutive subcarriers in the frequency domain. For reference, a resource composed of one OFDM symbol and one subcarrier is referred to as a resource element (RE) or tone. Accordingly, one RB includes $N^{DL/UL}_{symb} * N^{RB}_{sc}$ REs. Each RE within a resource grid may be uniquely defined by an index pair (k, l) within one slot. k is an index ranging from 0 to $N^{DL/UL}_{RB} * N^{RB}_{sc} - 1$ in the frequency domain, and l is an index ranging from 0 to $N^{DL/UL}_{symb} - 1$ in the time domain.

Meanwhile, one RB is mapped to one physical resource block (PRB) and one virtual resource block (VRB). A PRB is defined as $N^{DL}_{symb}$ (e.g. 7) consecutive OFDM or SC-FDM symbols in the time domain and $N^{RB}_{sc}$ (e.g. 12) consecutive subcarriers in the frequency domain. Accordingly, one PRB is configured with $N^{DL/UL}_{symb} * N^{RB}_{sc}$ REs. In one subframe, two RBs each located in two slots of the subframe while occupying the same $N^{RB}_{sc}$ consecutive subcarriers are referred to as a physical resource block (PRB) pair. Two RBs configuring a PRB pair have the same PRB number (or the same PRB index).

Figure 3:
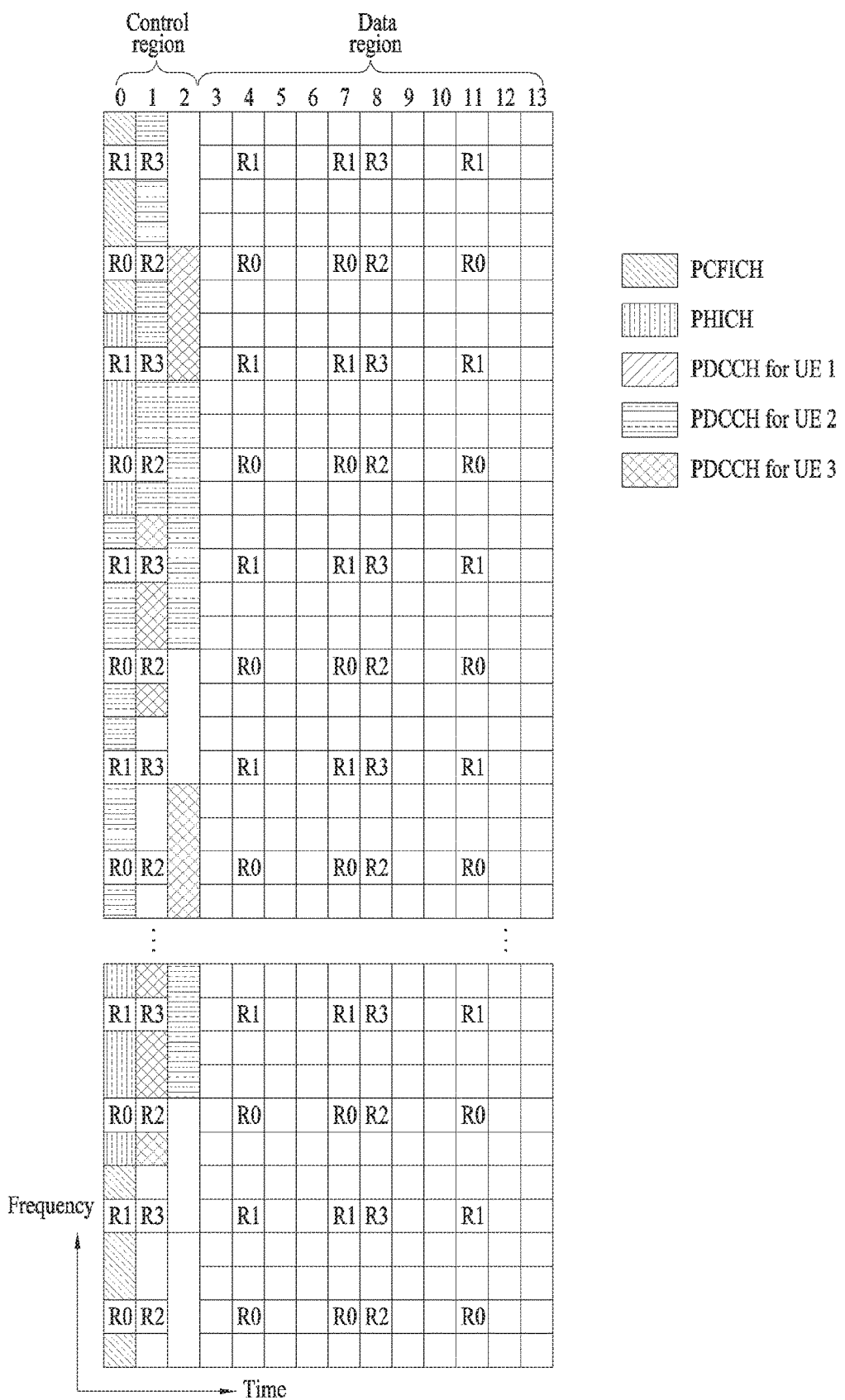
FIG. 3 illustrates the structure of a DL subframe used in a wireless communication system.

FIG. 3 illustrates the structure of a DL subframe used in a wireless communication system.

Referring to FIG. 3, a DL subframe is divided into a control region and a data region in the time domain. Referring to FIG. 3, a maximum of 3 (or 4) OFDM symbols located in a front part of a first slot of a subframe corresponds to the control region. Hereinafter, a resource region for PDCCH transmission in a DL subframe is referred to as a PDCCH region. OFDM symbols other than the OFDM symbol(s) used in the control region correspond to the data region to which a physical downlink shared channel (PDSCH) is allocated. Hereinafter, a resource region available for PDSCH transmission in the DL subframe is referred to as a PDSCH region.

Examples of a DL control channel used in 3GPP LTE include a physical control format indicator channel (PCFICH), a physical downlink control channel (PDCCH), a physical hybrid ARQ indicator channel (PHICH), etc.

The PCFICH is transmitted in the first OFDM symbol of a subframe and carries information about the number of OFDM symbols available for transmission of a control channel within a subframe. The PCFICH notifies the UE of the number of OFDM symbols used for the corresponding subframe every subframe. The PCFICH is located at the first OFDM symbol. The PCFICH is configured by four resource element groups (REGs), each of which is distributed within a control region on the basis of cell ID. One REG includes four REs.

A set of OFDM symbols available for the PDCCH at a subframe is given by the following Table.

TABLE 3

| Subframe | Number of OFDM symbols for PDCCH when $N^{DL}_{RB} > 10$ | Number of OFDM symbols for PDCCH when $N^{DL}_{RB} \leq 10$ |
| --- | --- | --- |
| Subframe 1 and 6 for frame structure type 2 | 1, 2 | 2 |
| MBSFN subframes on a carrier supporting PDSCH, configured with 1 or 2 cell-specfic antenna ports | 1, 2 | 2 |
| MBSFN subframes on a carrier supporting PDSCH, configured with 4 cell-specific antenna ports | 2 | 2 |
| Subframes on a carrier not supporting PDSCH | 0 | 0 |
| Non-MBSFN subframes (except subframe 6 for frame structure type 2) configured with positioning reference signals | 1, 2, 3 | 2, 3 |
| All other cases | 1, 2, 3 | 2, 3, 4 |

A subset of downlink subframes within a radio frame on a carrier for supporting PDSCH transmission may be configured as MBSFN subframe(s) by a higher layer. Each MBSFN subframe is divided into a non-MBSFN region and an MBSFN region. The non-MBSFN region spans first one or two OFDM symbols, and its length is given by Table 3. The same CP as cyclic prefix (CP) used for subframe 0 is used for transmission within the non-MBSFN region of the MBSFN subframe. The MBSFN region within the MBSFN subframe is defined as OFDM symbols which are not used in the non-MBSFN region.

The PCFICH carries a control format indicator (CFI), which indicates any one of values of 1 to 3. For a downlink system bandwidth $N^{DL}_{RB}>10$, the number 1, 2 or 3 of OFDM symbols which are spans of DCI carried by the PDCCH is given by the CFI. For a downlink system bandwidth $N^{DL}_{RB}\leq 10$, the number 2, 3 or 4 of OFDM symbols which are spans of DCI carried by the PDCCH is given by CFI+1.

The PHICH carries a HARQ (Hybrid Automatic Repeat Request) ACK/NACK (acknowledgment/negative-acknowledgment) signal as a response to UL transmission. The PHICH includes three REGs, and is scrambled cell-specifically. ACK/NACK is indicated by 1 bit, and the ACK/NACK of 1 bit is repeated three times. Each of the repeated ACK/NACK bits is spread with a spreading factor (SF) 4 or 2 and then mapped into a control region.

The control information transmitted through the PDCCH will be referred to as downlink control information (DCI). The DCI includes resource allocation information for a UE or UE group and other control information. Transmit format and resource allocation information of a downlink shared channel (DL-SCH) are referred to as DL scheduling information or DL grant. Transmit format and resource allocation information of an uplink shared channel (UL-SCH) are referred to as UL scheduling information or UL grant. The size and usage of the DCI carried by one PDCCH are varied depending on DCI formats. The size of the DCI may be varied depending on a coding rate. In the current 3GPP LTE system, various formats are defined, wherein formats 0 and 4 are defined for a UL, and formats 1, 1A, 1B, 1C, 1D, 2, 2A, 2B, 2C, 3 and 3A are defined for a DL. Combination selected from control information such as a hopping flag, RB allocation, modulation coding scheme (MCS), redundancy version (RV), new data indicator (NDI), transmit power control (TPC), cyclic shift, cyclic shift demodulation reference signal (DM RS), UL index, channel quality information (CQI) request, DL assignment index, HARQ process number, transmitted precoding matrix indicator (TPMI), precoding matrix indicator (PMI) information is transmitted to the UE as the DCI. The following table shows examples of DCI formats.

TABLE 4

| DCI format | Description |
| --- | --- |
| 0 | Resource grants for the PUSCH transmissions (uplink) |
| 1 | Resource assignments for single codeword PDSCH transmissions |
| 1A | Compact signaling of resource assignments for single codeword PDSCH |
| 1B | Compact signaling of resource assignments for single codeword PDSCH |
| 1C | Very compact resource assignments for PDSCH (e.g. paging/broadcast system information) |
| 1D | Compact resource assignments for PDSCH using multi-user MIMO |
| 2 | Resource assignments for PDSCH for closed-loop MIMO operation |
| 2A | Resource assignments for PDSCH for open-loop MIMO operation |
| 2B | Resource assignments for PDSCH using up to 2 antenna ports with UE-specific reference signals |
| 2C | Resource assignment for PDSCH using up to 8 antenna ports with UE-specific reference signals |
| 3/3A | Power control commands for PUCCH and PUSCH with 2-bit/1-bit power adjustments |
| 4 | Scheduling of PUSCH in one UL Component Carrier with multi-antenna port transmission mode |

Other DCI formats in addition to the DCI formats defined in Table 4 may be defined.

A plurality of PDCCHs may be transmitted within a control region. A UE may monitor the plurality of PDCCHs. An eNB determines a DCI format depending on the DCI to be transmitted to the UE, and attaches cyclic redundancy check (CRC) to the DCI. The CRC is masked (or scrambled) with an identifier (for example, a radio network temporary identifier (RNTI)) depending on usage of the PDCCH or owner of the PDCCH. For example, if the PDCCH is for a specific UE, the CRC may be masked with an identifier (for example, cell-RNTI (C-RNTI)) of the corresponding UE. If the PDCCH is for a paging message, the CRC may be masked with a paging identifier (for example, paging-RNTI (P-RNTI)). If the PDCCH is for system information (in more detail, system information block (SIB)), the CRC may be masked with system information RNTI (SI-RNTI). If the PDCCH is for a random access response, the CRC may be masked with a random access RNTI (RA-RNTI). For example, CRC masking (or scrambling) includes XOR operation of CRC and RNTI at the bit level.

Generally, a DCI format, which may be transmitted to the UE, is varied depending on a transmission mode configured for the UE. In other words, certain DCI format(s) corresponding to the specific transmission mode not all DCI formats may only be used for the UE configured to a specific transmission mode.

For example, a transmission mode is semi-statically configured for the UE to allow the UE to receive a PDSCH which is transmitted according to one of a plurality of predefined transmission modes. The UE attempts to decode the PDCCH using only DCI formats corresponding to the transmission mode thereof. In other words, in order to maintain the computational load of the UE according to an attempt of blind decoding at a level lower than or equal to a certain level, not all DCI formats are simultaneously searched by the UE. Table 5 shows transmission modes for configuring the MIMO technology and DCI formats used by the UE to perform blind decoding in the corresponding transmission modes. In particular, Table 6 shows a relationship between the PDCCH and PDSCH configured by a cell radio network temporary identifier (cell RNTI or C-RNTI).

TABLE 5

| Transmission mode | DCI format | Search Space | Transmission scheme of PDSCH corresponding to PDCCH |
|---|---|---|---|
| Mode 1 | DCI format 1A | Common and UE specific by C-RNTI | Single-antenna port, port 0 |
| | DCI format 1 | UE specific by C-RNTI | Single-antenna port, port 0 |
| Mode 2 | DCI format 1A | Common and UE specific by C-RNTI | Transmit diversity |
| | DCI format 1 | UE specific by C-RNTI | Transmit diversity |
| Mode 3 | DCI format 1A | Common and UE specific by C-RNTI | Transmit diversity |
| | DCI format 2A | UE specific by C-RNTI | Large delay CDD or Transmit diversity |
| Mode 4 | DCI format 1A | Common and UE specific by C-RNTI | Transmit diversity |
| | DCI format 2 | UE specific by C-RNTI | Closed-loop spatial multiplexing or Transmit diversity |
| Mode 5 | DCI format 1A | Common and UE specific by C-RNTI | Transmit diversity |
| | DCI format 1D | UE specific by C-RNTI | Multi-user MIMO |
| Mode 6 | DCI format 1A | Common and UE specific by C-RNTI | Transmit diversity |
| | DCI format 1B | UE specific by C-RNTI | Closed-loop spatial multiplexing using a single transmission layer |
| Mode 7 | DCI format 1A | Common and UE specific by C-RNTI | If the number of PBCH antenna ports is one, Single-antenna port, port 0 is used, otherwise Transmit diversity |
| | DCI format 1 | UE specific by C-RNTI | Single-antenna port, port 5 |
| Mode 8 | DCI format 1A | Common and UE specific by C-RNTI | If the number of PBCH antenna ports is one, Single-antenna port, port 0 is used, otherwise Transmit diversity |
| | DCI format 2B | UE specific by C-RNTI | Dual layer transmission, port 7 and 8 or single-antenna port, port 7 or 8 |
| Mode 9 | DCI format 1A | Common and UE specific by C-RNTI | Non-MBSFN subframe: If the number of PBCH antenna ports is one, Single-antenna port, port 0 is used, otherwise Transmit diversity. MBSFN subframe: Single-antenna port, port 7 |
| | DCI format 2C | UE specific by C-RNTI | Up to 8 layer transmission, ports 7-14 or single-antenna port, port 7 or 8 |

TABLE 5-continued

| Transmission mode | DCI format | Search Space | Transmission scheme of PDSCH corresponding to PDCCH |
|---|---|---|---|
| Mode 10 | DCI format 1A | Common and UE specific by C-RNTI | Non-MBSFN subframe: If the number of PBCH antenna ports is one, Single-antenna port, port 0 is used, otherwise Transmit diversity.<br>MBSFN subframe: Single-antenna port, port 7 |
| | DCI format 2D | UE specific by C-RNTI | Up to 8 layer transmission, ports 7-14 or single-antenna port, port 7 or 8 |

Although transmission modes 1 to 10 are listed in Table 5, other transmission modes in addition to the transmission modes defined in Table 5 may be defined.

Referring to Table 5, a UE configured to a transmission mode 9, for example, tries to decode PDCCH candidates of a UE-specific search space (USS) to a DCI format 1A, and tries to decode PDCCH candidates of a common search space (CSS) and the USS to a DCI format 2C. The UE may decode a PDSCH in accordance with DCI based on the DCI format successfully decoded. If DCI decoding from one of a plurality of PDCCH candidates to the DCI format 1A is successfully performed, the UE may decode the PDSCH by assuming that up to 8 layers from antenna ports 7 to 14 are transmitted thereto through the PDSCH, or may decode the PDSCH by assuming that a single layer from the antenna port 7 or 8 is transmitted thereto through the PDSCH.

The PDCCH is allocated to first m number of OFDM symbol(s) within a subframe, where m is an integer equal to or greater than 1, and is indicated by the PCFICH.

The PDCCH is transmitted on an aggregation of one or a plurality of continuous control channel elements (CCEs). The CCE is a logic allocation unit used to provide a coding rate based on the status of a radio channel to the PDCCH. The CCE corresponds to a plurality of resource element groups (REGs). For example, each CCE contains 9 REGs, which are distributed across the first 1/2/3 (/4 if needed for a 1.4 MHz channel) OFDM symbols and the system bandwidth through interleaving to enable diversity and to mitigate interference. One REG corresponds to four REs. Four QPSK symbols are mapped to each REG. A resource element (RE) occupied by the reference signal (RS) is not included in the REG. Accordingly, the number of REGs within given OFDM symbols is varied depending on the presence of the RS. The REGs are also used for other downlink control channels (that is, PDFICH and PHICH).

Assuming that the number of REGs not allocated to the PCFICH or the PHICH is $N_{REG}$, the number of available CCEs in a DL subframe for PDCCH(s) in a system is numbered from 0 to $N_{CCE}-1$, where $N_{CCE}=\text{floor}(N_{REG}/9)$.

A PDCCH format and the number of DCI bits are determined in accordance with the number of CCEs. The CCEs are numbered and consecutively used. To simplify the decoding process, a PDCCH having a format including n CCEs may be initiated only on CCEs assigned numbers corresponding to multiples of n. The number of CCEs used for transmission of a specific PDCCH is determined by a network or the eNB in accordance with channel status. For example, one CCE may be required for a PDCCH for a UE (for example, adjacent to eNB) having a good downlink channel. However, in case of a PDCCH for a UE (for example, located near the cell edge) having a poor channel, eight CCEs may be required to obtain sufficient robustness. Additionally, a power level of the PDCCH may be adjusted to correspond to a channel status.

In a 3GPP LTE/LTE-A system, a set of CCEs on which a PDCCH can be located for each UE is defined. A CCE set in which the UE can detect a PDCCH thereof is referred to as a PDCCH search space or simply as a search space (SS). An individual resource on which the PDCCH can be transmitted in the SS is called a PDCCH candidate. A set of PDCCH candidates that the UE is to monitor is defined in terms of SSs, where a search space $S^{(L)}_k$ at aggregation level $L \in \{1,2,4,8\}$ is defined by a set of PDCCH candidates. SSs for respective PDCCH formats may have different sizes and a dedicated SS and a common SS are defined. The dedicated SS is a UE-specific SS (USS) and is configured for each individual UE. The common SS (CSS) is configured for a plurality of UEs.

The following Table shows an example of aggregation levels for defining SS.

TABLE 6

| | Search space $S^{(L)}_k$ | | Number of PDCCH |
|---|---|---|---|
| Type | Aggregation level L | Size [in CCEs] | candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

The eNB transmits an actual PDCCH (DCI) on a PDCCH candidate in a search space and the UE monitors the search space to detect the PDCCH (DCI). Here, monitoring implies attempting to decode each PDCCH in the corresponding SS according to all monitored DCI formats. The UE may detect a PDCCH thereof by monitoring a plurality of PDCCHs. Basically, the UE does not know the location at which a PDCCH thereof is transmitted. Therefore, the UE attempts to decode all PDCCHs of the corresponding DCI format for each subframe until a PDCCH having an ID thereof is detected and this process is referred to as blind detection (or blind decoding (BD)).

For example, it is assumed that a specific PDCCH is CRC-masked with a radio network temporary identity (RNTI) 'A' and information about data transmitted using a radio resource 'B' (e.g. frequency location) and using transport format information 'C' (e.g. transmission block size, modulation scheme, coding information, etc.) is transmitted in a specific DL subframe. Then, the UE monitors the PDCCH using RNTI information thereof. The UE having the RNTI 'A' receives the PDCCH and receives the PDSCH indicated by 'B' and 'C' through information of the received PDCCH.

Figure 4:
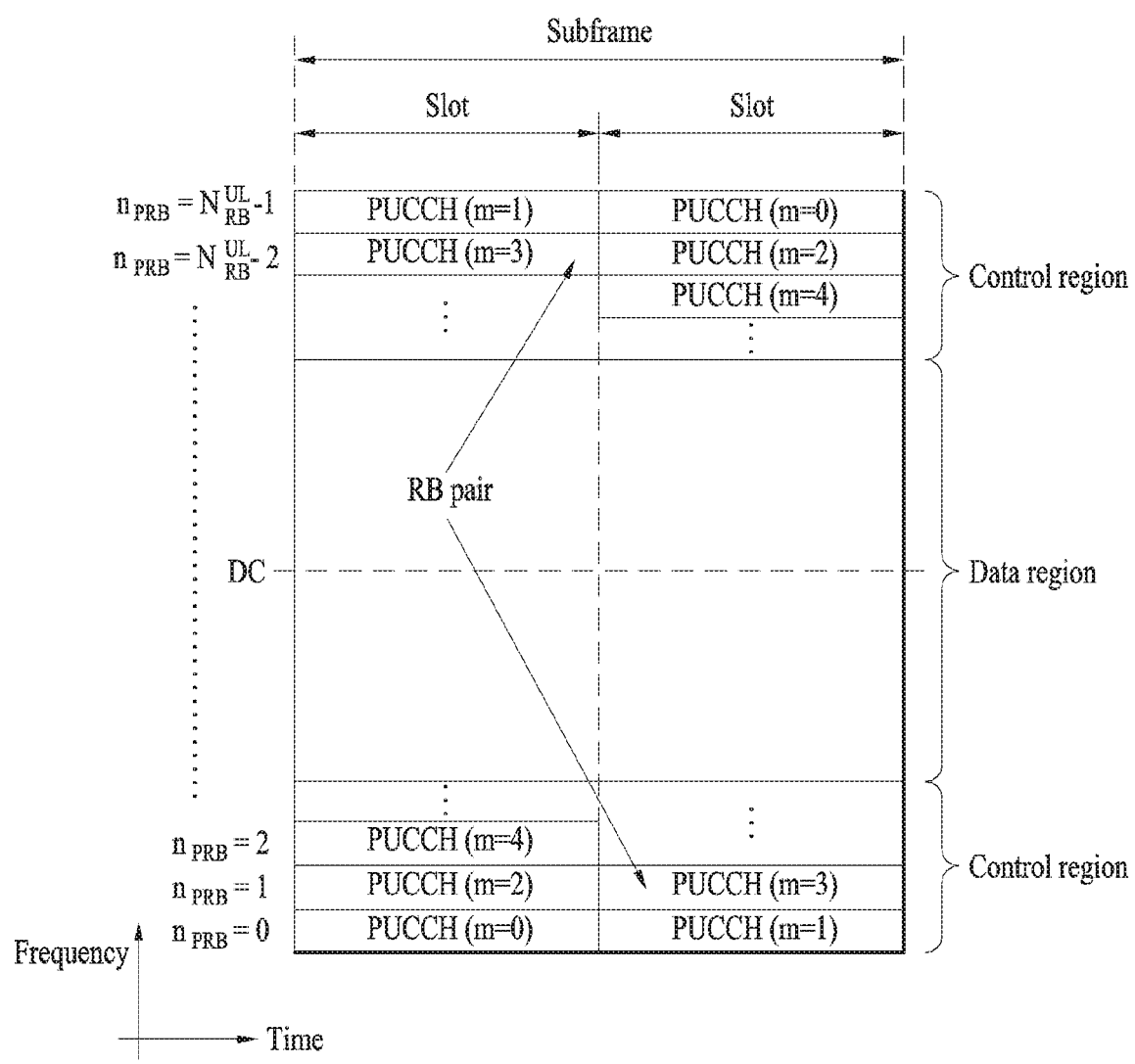
FIG. 4 illustrates the structure of a UL subframe used in a wireless communication system.

FIG. 4 illustrates the structure of a UL subframe used in a wireless communication system.

Referring to FIG. 4, a UL subframe may be divided into a data region and a control region in the frequency domain. One or several PUCCHs may be allocated to the control region to deliver UCI. One or several PUSCHs may be allocated to the data region of the UE subframe to carry user data.

In the UL subframe, subcarriers distant from a direct current (DC) subcarrier are used as the control region. In other words, subcarriers located at both ends of a UL transmission BW are allocated to transmit UCI. A DC subcarrier is a component unused for signal transmission and is mapped to a carrier frequency $f_0$ in a frequency up-conversion process. A PUCCH for one UE is allocated to an RB pair belonging to resources operating on one carrier frequency and RBs belonging to the RB pair occupy different subcarriers in two slots. The PUCCH allocated in this way is expressed by frequency hopping of the RB pair allocated to the PUCCH over a slot boundary. If frequency hopping is not applied, the RB pair occupies the same subcarriers.

The PUCCH may be used to transmit the following control information.

Scheduling request (SR): SR is information used to request a UL-SCH resource and is transmitted using an on-off keying (OOK) scheme.

HARQ-ACK: HARQ-ACK is a response to a PDCCH and/or a response to a DL data packet (e.g. a codeword) on a PDSCH. HARQ-ACK indicates whether the PDCCH or PDSCH has been successfully received. 1-bit HARQ-ACK is transmitted in response to a single DL codeword and 2-bit HARQ-ACK is transmitted in response to two DL codewords. A HARQ-ACK response includes a positive ACK (simply, ACK), negative ACK (NACK), discontinuous transmission (DTX), or NACK/DRX. HARQ-ACK is used interchangeably with HARQ ACK/NACK and ACK/NACK.

Channel state information (CSI): CSI is feedback information for a DL channel. CSI may include channel quality information (CQI), a precoding matrix indicator (PMI), a precoding type indicator, and/or a rank indicator (RI). In the CSI, MIMO-related feedback information includes the RI and the PMI. The RI indicates the number of streams or the number of layers that the UE can receive through the same time-frequency resource. The PMI is a value reflecting a space characteristic of a channel, indicating an index of a preferred precoding matrix for DL signal transmission based on a metric such as an SINR. The CQI is a value of channel strength, indicating a received SINR that can be obtained by the UE generally when the eNB uses the PMI.

Various PUCCH formats can be used for UCI transmission. UCI carried by one PUCCH may have different size and usage according to PUCCH formats, and size thereof may vary according to coding rates.

A general wireless communication system performs data transmission/reception through one downlink (DL) band and through one uplink (UL) band corresponding to the DL band (in case of a frequency division duplex (FDD) mode), or divides a prescribed radio frame into a UL time unit and a DL time unit in the time domain and then performs data transmission/reception through the UL/DL time unit (in case of a time division duplex (TDD) mode). Recently, to use a wider frequency band in recent wireless communication systems, introduction of carrier aggregation (or BW aggregation) technology that uses a wider UL/DL BW by aggregating a plurality of UL/DL frequency blocks has been discussed. A carrier aggregation (CA) is different from an orthogonal frequency division multiplexing (OFDM) system in that DL or UL communication is performed using a plurality of carrier frequencies, whereas the OFDM system carries a base frequency band divided into a plurality of orthogonal subcarriers on a single carrier frequency to perform DL or UL communication. Hereinbelow, each of carriers aggregated by carrier aggregation will be referred to as a component carrier (CC).

For example, three 20 MHz CCs may be aggregated on each of a UL and a DL to support a bandwidth of 60 MHz. The respective CCs may be contiguous or non-contiguous in the frequency domain. For convenience, although it has been described that the bandwidth of UL CC and the bandwidth of DL CC are the same as each other and symmetric to each other, the bandwidth of each CC may be independently determined. Asymmetrical carrier aggregation in which the number of UL CCs is different from the number of DL CCs may be implemented. DL/UL CC limited to a specific UE may be referred to as a serving UL/DL CC configured for the specific UE.

Meanwhile, the 3GPP LTE-A standard uses the concept of a cell to manage radio resources. The "cell" associated with the radio resources is defined by combination of downlink resources and uplink resources, that is, combination of DL CC and UL CC. The cell may be configured by downlink resources only, or may be configured by downlink resources and uplink resources. If carrier aggregation is supported, linkage between a carrier frequency of the downlink resources (or DL CC) and a carrier frequency of the uplink resources (or UL CC) may be indicated by system information. For example, combination of the DL resources and the UL resources may be indicated by linkage of system information block type 2 (SIB2). The carrier frequency means a center frequency of each cell or CC. A cell operating on a primary frequency may be referred to as a primary cell (Pcell) or PCC, and a cell operating on a secondary frequency may be referred to as a secondary cell (Scell) or SCC. The carrier corresponding to the Pcell on downlink will be referred to as a downlink primary CC (DL PCC), and the carrier corresponding to the Pcell on uplink will be referred to as an uplink primary CC (UL PCC). A Scell means a cell that may be configured after completion of radio resource control (RRC) connection establishment and used to provide additional radio resources. The Scell may form a set of serving cells for the UE together with the Pcell in accordance with capabilities of the UE. The carrier corresponding to the Scell on the downlink will be referred to as downlink secondary CC (DL SCC), and the carrier corresponding to the Scell on the uplink will be referred to as uplink secondary CC (UL SCC). Although the UE is in RRC-CONNECTED state, if it is not configured by carrier aggregation or does not support carrier aggregation, a single serving cell configured by the Pcell only exists.

The eNB may activate all or some of the serving cells configured in the UE or deactivate some of the serving cells for communication with the UE. The eNB may change the activated/deactivated cell, and may change the number of cells which is/are activated or deactivated. If the eNB allocates available cells to the UE cell-specifically or UE-specifically, at least one of the allocated cells is not deactivated unless cell allocation to the UE is fully reconfigured or unless the UE performs handover. Such a cell which is not deactivated unless CC allocation to the UE is fully reconfigured will be referred to as Pcell, and a cell which may be activated/deactivated freely by the eNB will be referred to as Scell. The Pcell and the Scell may be discriminated from each other on the basis of the control information. For example, specific control information may be set to be transmitted and received through a specific cell only. This specific cell may be referred to as the Pcell, and the other cell(s) may be referred to as Scell(s).

A configured cell refers to a cell in which carrier aggregation is performed for a UE based on measurement report from another eNB or UE among cells of an eNB and is configured per UE. The cell configured for the UE may be a serving cell in terms of the UE. For the cell configured for the UE, i.e. the serving cell, resources for ACK/NACK transmission for PDSCH transmission are reserved in advance. An activated cell refers to a cell configured to be actually used for PDSCH/PUSCH transmission among cells configured for the UE and CSI reporting and SRS transmission for PDSCH/PUSCH transmission are performed in the activated cell. A deactivated cell refers to a cell configured not to be used for PDSCH/PUSCH transmission by the command of an eNB or the operation of a timer and, if a cell is deactivated, CSI reporting and SRS transmission are also stopped in the cell.

For reference, a carrier indicator (CI) denotes a serving cell index (ServCellIndex), CI=0 is applied to Pcell. The serving cell index is a short ID used to identify a serving cell. For example, any one of integers from 0 to 'maximum number of carrier frequencies which can be configured for the UE at a time−1' may be allocated to one serving cell as the serving cell index. That is, the serving cell index may be a logical index used to identify a specific serving cell among cells allocated to the UE rather than a physical index used to identify a specific carrier frequency among all carrier frequencies.

As described above, the term "cell" used in carrier aggregation is differentiated from the term "cell" indicating a certain geographical area where a communication service is provided by one eNB or one antenna group.

The cell mentioned in the present invention means a cell of carrier aggregation which is combination of UL CC and DL CC unless specifically noted.

Meanwhile, since one serving cell is only present in case of communication based on a single carrier, a PDCCH carrying UL/DL grant and corresponding PUSCH/PDSCH are transmitted on one cell. In other words, in case of FDD under a single carrier environment, a PDCCH for a DL grant for a PDSCH, which will be transmitted on a specific DL CC, is transmitted on the specific CC, and a PDCCH for a UL grant for a PUSCH, which will be transmitted on a specific UL CC, is transmitted on a DL CC linked to the specific UL CC. In case of TDD under a single carrier environment, a PDCCH for a DL grant for a PDSCH, which will be transmitted on a specific DL CC, is transmitted on the specific CC, and a PDCCH for a UL grant for a PUSCH, which will be transmitted on a specific UL CC, is transmitted on the specific CC.

On the other hand, since a plurality of serving cells can be configured in a multi-carrier system, transmission of UL/DL grant through a serving cell having a good channel state may be allowed. In this way, when a cell carrying UL/DL grant corresponding to scheduling information is different from that where UL/DL transmission corresponding to the UL/DL grant is performed, it can be referred to as cross-carrier scheduling.

Hereinafter, the case where a cell is scheduled by itself and the case where a cell is scheduled by another cell will be respectively referred to as self-CC scheduling and cross-CC scheduling.

The 3GPP LTE/LTE-A system can support aggregation of a plurality of CCs and cross carrier-scheduling operation based on the aggregation to improve a data transmission rate and achieve stable control signaling.

When the cross-carrier scheduling (or cross-CC scheduling) is applied, a PDCCH carrying a DL grant, that is, downlink allocation for DL CC B or DL CC C may be transmitted through DL CC A, and a corresponding PDSCH may be transmitted through DL CC B or DL CC C. In addition, a carrier indicator field (CIF) may be introduced for the cross-CC scheduling. The CIF can be included or not in the PDCCH, and this can be configured through higher layer signaling (e.g., RRC signaling) semi-statically and UE-specifically (or UE-group-specifically). In legacy systems subject to communication with one node, the UE-RS, CSI-RS, and CRS are transmitted at the same location, and therefore the UE does not consider a situation in which delay spread, Doppler spread, frequency shift, average received power, and received timing differ among the UE-RS port(s), CSI-RS port(s) and CRS port (s0. However, for a communication system to which coordinated Multi-Point (CoMP) communication technology allowing more than one node to simultaneously participate in communication with the UE is applied, the properties may differ among the PDCCH port(s), PDSCH port(s), UE-RS port(s), CSI-RS port(s) and/or CRS port(s). For this reason, the concept of a "quasi co-located antenna port" is introduced for a mode (hereinafter, CoMP mode) in which multiple nodes can participate in communication.

With respect to antenna ports, the term "Quasi co-located (QCL)" or "quasi co-location (QCL)" can be defined as follows: if two antenna ports are QCL, the UE may assume that the large-scale properties of a signal received through one of the two antenna ports can be inferred from the signal received through the other antenna port. The large-scale properties include delay spread, Doppler spread, frequency shift, average received power and/or received timing.

With respect to channels, the term QCL may also be defined as follows: if two antenna ports are QCL, the UE may assume that the large-scale properties of a channel for conveying a symbol on one of the two antenna ports can be inferred from the large-scale properties of a channel for conveying a symbol on the other antenna port. The large-scale properties include delay spread, Doppler spread, Doppler shift, average gain and/or average delay.

One of the two definitions of QCL given above may be applied to the embodiments of the present invention. Alternatively, the definition of QCL may be modified to assume that antenna ports for which QCL assumption is established are co-located. For example, QCL may be defined in a manner that the UE assumes that the antenna ports for which QCL assumption is established are antenna ports of the same transmission point.

For non-quasi co-located (NQC) antenna ports, the UE cannot assume the same large-scale properties between the antenna ports. A typical UE needs to perform independent processing for each NQC antenna with respect to timing acquisition and tracking, frequency offset estimation and compensation, and delay estimation and Doppler estimation.

On the other hand, for antenna ports for which QCL assumption can be established, the UE performs the following operations:

Regarding Doppler spread, the UE may apply the results of estimation of the power-delay-profile, the delay spread and Doppler spectrum and the Doppler spread for one port to a filter (e.g., a Wiener filter) which is used for channel estimation for another port;

Regarding frequency shift and received timing, after performing time and frequency synchronization for one port, the UE may apply the same synchronization to demodulation on another port;

Further, regarding average received power, the UE may average measurements of reference signal received power (RSRP) over two or more antenna ports.

For example, if the UE receives a specific DMRS-based DL-related DCI format (e.g., DCI format 2C) over a PDCCH/EPDCCH, the UE performs data demodulation after performing channel estimation of the PDSCH through a configured DMRS sequence. If the UE can make an assumption that a DMRS port configuration received through the DL scheduling grant and a port for a specific RS (e.g., a specific CSI-RS, a specific CRS, a DL serving cell CRS of the UE, etc.) port are QCL, then the UE may apply the estimate(s) of the large-scale properties estimated through the specific RS port to channel estimation through the DMRS port, thereby improving processing performance of the DMRS-based receiver.

Figure 5:
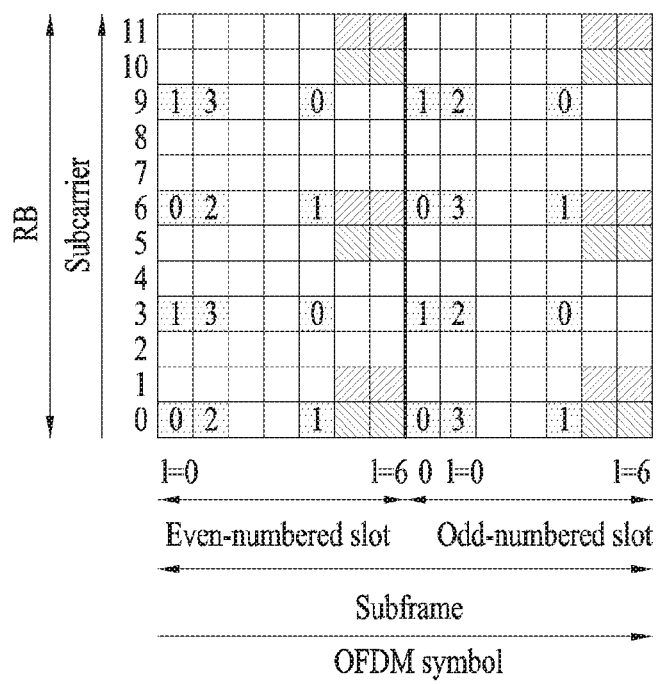
FIG. 5 illustrates configuration of cell specific reference signals (CRSs) and user specific reference signals (UE-RS).

FIG. 5 illustrates configuration of cell specific reference signals (CRSs) and user specific reference signals (UE-RS). In particular, FIG. 5 shows REs occupied by the CRS(s) and UE-RS(s) on an RB pair of a subframe having a normal CP.

In an existing 3GPP system, since CRSs are used for both demodulation and measurement, the CRSs are transmitted in all DL subframes in a cell supporting PDSCH transmission and are transmitted through all antenna ports configured at an eNB.

Referring to FIG. 5, the CRS is transmitted through antenna ports p=0, p=0, 1, p=0, 1, 2, 3 in accordance with the number of antenna ports of a transmission mode. The CRS is fixed to a certain pattern within a subframe regardless of a control region and a data region. The control channel is allocated to a resource of the control region, to which the CRS is not allocated, and the data channel is also allocated to a resource of the data region, to which the CRS is not allocated.

A UE may measure CSI using the CRSs and demodulate a signal received on a PDSCH in a subframe including the CRSs. That is, the eNB transmits the CRSs at predetermined locations in each RB of all RBs and the UE performs channel estimation based on the CRSs and detects the PDSCH. For example, the UE may measure a signal received on a CRS RE and detect a PDSCH signal from an RE to which the PDSCH is mapped using the measured signal and using the ratio of reception energy per CRS RE to reception energy per PDSCH mapped RE. However, when the PDSCH is transmitted based on the CRSs, since the eNB should transmit the CRSs in all RBs, unnecessary RS overhead occurs. To solve such a problem, in a 3GPP LTE-A system, a UE-specific RS (hereinafter, UE-RS) and a CSI-RS are further defined in addition to a CRS. The UE-RS is used for demodulation and the CSI-RS is used to derive CSI. The UE-RS is one type of DRS. Since the UE-RS and the CRS are used for demodulation, the UE-RS and the CRS may be regarded as demodulation RSs in terms of usage. Since the CSI-RS and the CRS are used for channel measurement or channel estimation, the CSI-RS and the CRS may be regarded as measurement RSs.

Referring to FIG. 5, UE-RSs are transmitted on antenna port(s) p=5, p=7, p=8 or p=7, 8, . . . , υ+6 for PDSCH transmission, where v is the number of layers used for the PDSCH transmission. UE-RSs are present and are a valid reference for PDSCH demodulation only if the PDSCH transmission is associated with the corresponding antenna port. UE-RSs are transmitted only on RBs to which the corresponding PDSCH is mapped. That is, the UE-RSs are configured to be transmitted only on RB(s) to which a PDSCH is mapped in a subframe in which the PDSCH is scheduled unlike CRSs configured to be transmitted in every subframe irrespective of whether the PDSCH is present. Accordingly, overhead of the RS may be lowered compared to that of the CRS.

In the 3GPP LTE-A system, the UE-RSs are defined in a PRB pair. Referring to FIG. 5, in a PRB having frequency-domain index $N_{PRB}$ assigned for PDSCH transmission with respect to p=7, p=8, or p=7, 8, . . . , υ+6, a part of UE-RS sequence r(m) is mapped to complex-valued modulation symbols $a^{(p)}_{k,l}$ in a subframe according to the following equation.

$$a_{k,l}^{(P)} = w_p(l') \cdot r(3 \cdot l' \cdot N_{RB}^{max,DL} + 3 \cdot n_{PRB} + m') \quad \text{[Equation 1]}$$

where $w_p(i)$, l', m' are given as follows.

$$w_p(i) = \begin{cases} \overline{w}_p(i) & (m' + n_{PRB}) \bmod 2 = 0 \\ \overline{w}_p(3-i) & (m' + n_{PRB}) \bmod 2 = 1 \end{cases} \quad \text{[Equation 2]}$$

$$k = 5m' + N_{sc}^{RB} n_{PRB} + k'$$

$$k' = \begin{cases} 1 & p \in \{7,8,11,13\} \\ 0 & p \in \{9,10,12,14\} \end{cases}$$

$$l = \begin{cases} l' \bmod 2 + 2 & \text{if in a } specialsubframewith \text{ configuration 3, 4, or 8 (see Table 2)} \\ l' \bmod 2 + 2 + 3\lfloor l'/2 \rfloor & \text{if in a } specialsubframewith \text{ configuration 1, 2, 6, or 7 (see Table 2)} \\ l' \bmod 2 + 5 & \text{if not in a } specialsubframe \end{cases}$$

$$l' = \begin{cases} 0,1,2,3 & \text{if } n_s \bmod 2 = 0 \text{ and in a } specialsubframewith \\ & \text{configuration 1, 2, 6, or 7 (see Table 2)} \\ 0,1 & \text{if } n_s \bmod 2 = 0 \text{ and not in } specialsubframewith \\ & \text{configuration 1, 2, 6, or 7 (see Table 2)} \\ 2,3 & \text{if } n_s \bmod 2 = 1 \text{ and not in } specialsubframewith \\ & \text{configuration 1, 2, 6, or 7 (see Table 2)} \end{cases}$$

$$m' = 0,1,2$$

where $n_s$ is the slot number within a radio frame and an integer among 0 to 19. The sequence $\overline{w}_p(i)$ for normal CP is given according to the following equation.

TABLE 7

| Antenna port p | [$\overline{w}_p(0)$ $\overline{w}_p(1)$ $\overline{w}_p(2)$ $\overline{w}_p(3)$] |
|---|---|
| 7  | [+1 +1 +1 +1] |
| 8  | [+1 −1 +1 −1] |
| 9  | [+1 +1 +1 +1] |
| 10 | [+1 −1 +1 −1] |
| 11 | [+1 +1 −1 −1] |
| 12 | [−1 −1 +1 +1] |
| 13 | [+1 −1 −1 +1] |
| 14 | [−1 +1 +1 −1] |

For antenna port p∈{7, 8, ..., υ+6}, the UE-RS sequence r(m) is defined as follows.

$$r(m) = \frac{1}{\sqrt{2}}(1-2\cdot c(2m)) + j\frac{1}{\sqrt{2}}(1-2\cdot c(2m+1)),$$ [Equation 3]

$$m = \begin{cases} 0,1,\ldots,12N_{RB}^{max,DL}-1 & \text{normal cyclic prefix} \\ 0,1,\ldots,16N_{RB}^{max,DL}-1 & \text{extended cyclic prefix} \end{cases}$$

where c(i) is a pseudo-random sequence defined by a length-31 Gold sequence. The output sequence c(n) of length $M_{PN}$, where n=0, 1, ..., $M_{PN}$−1, is defined by the following equation.

$$c(n)=(x_1(n+N_C)\times x_2(n+N_C))\bmod 2$$

$$x_1(n+31)=(x_1(n+3)+x_1(n))\bmod 2$$

$$x_2(n+31)=(x_2(n+3)+x_2(n+2)+x_2(n+1)+x_2(n))\bmod 2$$ [Equation 1]

where $N_C$=1600 and the first m-sequence is initialized with $x_1(0)$=1, $x_1(n)$=0, n=1, 2, ..., 30. The initialization of the second m-sequence is denoted by $c_{init}=\Sigma_{i=0}^{30}x_2(i)\cdot 2^i$ with the value depending on the application of the sequence.

In Equation 3, the pseudo-random sequence generator for generating c(i) is initialized with $c_{init}$ at the start of each subframe according to the following equation.

$$c_{init}=(\lfloor n_s/2\rfloor+1)\cdot(2n_{ID}^{(nSCID)}+1)\cdot 2^{16}+n_{SCID}$$

where the quantities $n^{(i)}_{ID}$, i=0,1, which is corresponding to $n^{(nsCID)}_{ID}$, are given by a physical layer cell identity $N^{cell}_{ID}$ if no value for a scrambling identity $n^{DMRS,i}_{ID}$ is provided by higher layers or if DCI format 1A, 2B or 2C is used for DCI format associated with the PDSCH transmission, and given by $n^{DMRS,i}_{ID}$ otherwise.

In Equation 5, the value of $n_{SCID}$ is zero unless specified otherwise. For a PDSCH transmission on antenna ports 7 or 8, $n_{SCID}$ is given by the DCI format 2B or 2C. DCI format 2B is a DCI format for resource assignment for a PDSCH using a maximum of two antenna ports having UE-RSs. DCI format 2C is a DCI format for resource assignment for a PDSCH using a maximum of 8 antenna ports having UE-RSs.

Figure 6:
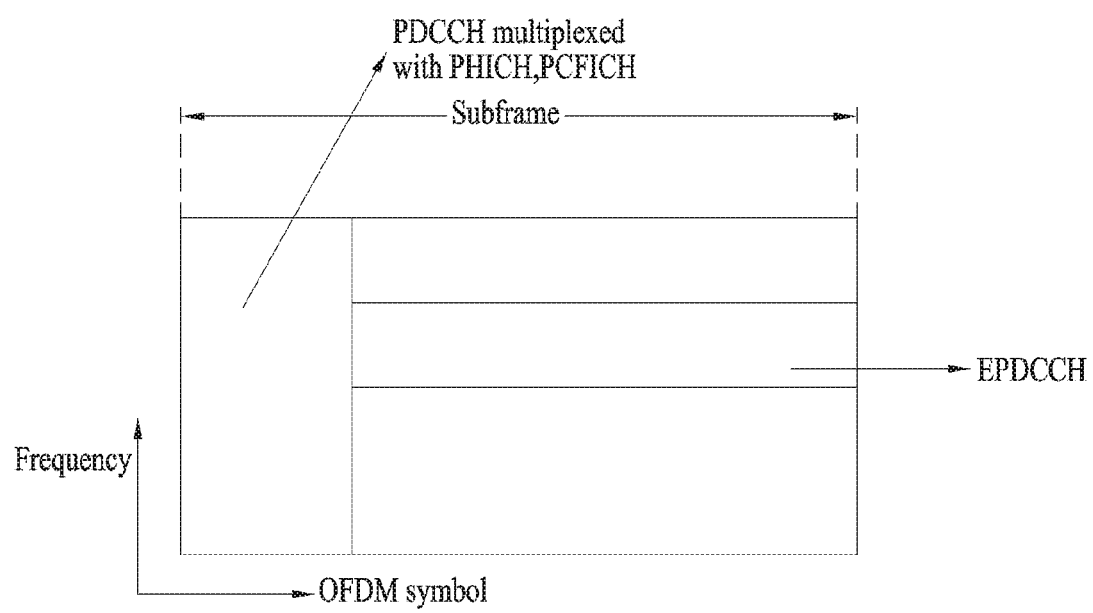
FIG. 6 is an example of a downlink control channel configured in a data region of a DL subframe.

FIG. 6 is an example of a downlink control channel configured in a data region of a DL subframe.

Meanwhile, if RRH technology, cross-carrier scheduling technology, etc. are introduced, the amount of PDCCH which should be transmitted by the eNB is gradually increased. However, since a size of a control region within which the PDCCH may be transmitted is the same as before, PDCCH transmission acts as a bottleneck of system throughput. Although channel quality may be improved by the introduction of the aforementioned multi-node system, application of various communication schemes, etc., the introduction of a new control channel is required to apply the legacy communication scheme and the carrier aggregation technology to a multi-node environment. Due to the need, a configuration of a new control channel in a data region (hereinafter, referred to as PDSCH region) not the legacy control region (hereinafter, referred to as PDCCH region) has been discussed. Hereinafter, the new control channel will be referred to as an enhanced PDCCH (hereinafter, referred to as EPDCCH).

The EPDCCH may be configured within rear OFDM symbols starting from a configured OFDM symbol, instead of front OFDM symbols of a subframe. The EPDCCH may be configured using continuous frequency resources, or may be configured using discontinuous frequency resources for frequency diversity. By using the EPDCCH, control information per node may be transmitted to a UE, and a problem that a legacy PDCCH region may not be sufficient may be solved. For reference, the PDCCH may be transmitted through the same antenna port(s) as that (those) configured for transmission of a CRS, and a UE configured to decode the PDCCH may demodulate or decode the PDCCH by using the CRS. Unlike the PDCCH transmitted based on the CRS, the EPDCCH is transmitted based on the demodulation RS (hereinafter, DMRS). Accordingly, the UE decodes/demodulates the PDCCH based on the CRS and decodes/demodulates the EPDCCH based on the DMRS. The DMRS associated with EPDCCH is transmitted on the same antenna port p∈{107,108,109,110} as the associated EPDCCH physical resource, is present for EPDCCH demodulation only if the EPDCCH transmission is associated with the corresponding antenna port, and is transmitted only on the PRB(s) upon which the corresponding EPDCCH is mapped. For example, the REs occupied by the UE-RS(s) of the antenna port 7 or 8 may be occupied by the DMRS(s) of the antenna port 107 or 108 on the PRB to which the EPDCCH is mapped, and the REs occupied by the UE-RS(s) of antenna port 9 or 10 may be occupied by the DMRS(s) of the antenna port 109 or 110 on the PRB to which the EPDCCH is mapped. In other words, a certain number of REs are used on each RB pair for transmission of the DMRS for demodulation of the EPDCCH regardless of the UE or cell if the type of EPDCCH and the number of layers are the same as in the case of the UE-RS for demodulation of the PDSCH.

For each serving cell, higher layer signaling can configure a UE with one or two EPDCCH-PRB-sets for EPDCCH monitoring. The PRB-pairs corresponding to an EPDCCH-PRB-set are indicated by higher layers. Each EPDCCH-PRB-set consists of set of ECCEs numbered from 0 to $N_{ECCE,p,k}$−1, where $N_{ECCE,p,k}$ is the number of ECCEs in EPDCCH-PRB-set p of subframe k. Each EPDCCH-PRB-set can be configured for either localized EPDCCH transmission or distributed EPDCCH transmission.

The UE shall monitor a set of EPDCCH candidates on one or more activated serving cells as configured by higher layer signaling for control information.

The set of EPDCCH candidates to monitor are defined in terms of EPDCCH UE-specific search spaces. For each serving cell, the subframes in which the UE monitors EPDCCH UE-specific search spaces are configured by higher layers.

An EPDCCH UE-specific search space $ES^{(L)}_k$ at aggregation level L∈{1,2,4,8,16,32} is defined by a set of EPDCCH candidates. For an EPDCCH-PRB-set p, the ECCEs corresponding to EPDCCH candidate m of the search space $ES^{(L)}_k$ are given by the following equation.

$$L\left\{\left(Y_{p,k} + \left\lfloor\frac{m\cdot N_{ECCE,p,k}}{L\cdot M_p^{(L)}}\right\rfloor + b\right)\bmod \lfloor N_{ECCE,p,k}/L\rfloor\right\} + i$$ [Equation 6]

where i=0, ..., L−1. b=$n_{CI}$ if the UE is configured with a carrier indicator field for the serving cell on which EPDCCH is monitored, otherwise b=0. $n_{CI}$ is the carrier indicator field (CIF) value, which is the same as a serving cell index (ServCellIndex). m=0, 1, ..., $M^{(L)}_p$−1, $M^{(L)}_p$ is the number of EPDCCH candidates to monitor at aggregation level L in EPDDCH-PRB-set p. The variable $Y_{p,k}$ is defined by '$Y_{p,k}=(A_p\cdot Y_{p,k-1})\bmod D$', where $Y_{p,k-1}=n_{RNTI}\neq 0$, $A_0=39827$, $A_p=39829$, $D=65537$ and $k=\text{floor}(n_s/2)$. $n_s$ is the slot number within a radio frame.

A UE is not expected to monitor an EPDCCH candidate, if an ECCE corresponding to that EPDCCH candidate is mapped to a PRB pair that overlaps in frequency with a transmission of either PBCH or PSS/SSS in the same subframe.

An EPDCCH is transmitted using an aggregation of one or several consecutive enhanced control channel elements (ECCEs). Each ECCE consists of multiple enhanced resource element groups (EREGs). EREGs are used for defining the mapping of enhanced control channels to resource elements. There are 16 EREGs, numbered from 0 to 15, per physical resource block (PRB) pair. Number all resource elements (REs), except resource elements carrying DMRS (hereinafter, EPDCCH DMRS) for demodulation of the EPDCCH, in a physical resource-block pair cyclically from 0 to 15 in an increasing order of first frequency. Therefore, all the REs, except REs carrying the EPDCCH DMRS, in the PRB pair has any one of numbers 0 to 15. All REs with number i in that PRB pair constitutes EREG number i. As described above, it is noted that EREGs are distributed on frequency and time axes within the PRB pair and an EPDCCH transmitted using aggregation of one or more ECCEs, each of which includes a plurality of EREGs, is also distributed on frequency and time axes within the PRB pair.

The number of ECCEs used for one EPDCCH depends on the EPDCCH format as given by Table 8, the number of EREGs per ECCE is given by Table 9. Table 8 shows an example of supported EPDCCH formats, and Table 9 shows an example of the number of EREGs per ECCE, $N^{EREG}_{ECCE}$. Both localized and distributed transmission is supported.

TABLE 8

Number of ECCEs for one EPDCCH, $N^{EPDCCH}_{ECCE}$

| EPDCCH format | Case A | | Case B | |
|---|---|---|---|---|
| | Localized transmission | Distributed transmission | Localized transmission | Distributed transmission |
| 0 | 2 | 2 | 1 | 1 |
| 1 | 4 | 4 | 2 | 2 |
| 2 | 8 | 8 | 4 | 4 |
| 3 | 16 | 16 | 8 | 8 |
| 4 | — | 32 | — | 16 |

TABLE 9

| Normal cyclic prefix | | | Extended cyclic prefix | |
|---|---|---|---|---|
| Normal subframe | Special subframe, configuration 3, 4, 8 | Special subframe, configuration 1, 2, 6, 7, 9 | Normal subframe | Special subframe, configuration 1, 2, 3, 5, 6 |
| 4 | | | 8 | |

An EPDCCH can use either localized or distributed transmission, differing in the mapping of ECCEs to EREGs and PRB pairs. One or two sets of PRB pairs which a UE shall monitor for EPDCCH transmissions can be configured. All EPDCCH candidates in EPDCCH set $S_p$ (i.e., EPDCCH-PRB-set) use either only localized or only distributed transmission as configured by higher layers. Within EPDCCH set $S_p$ in subframe k, the ECCEs available for transmission of EPDCCHs are numbered from 0 to $N_{ECCE,p,k}-1$. ECCE number n is corresponding to the following EREG(s):

EREGs numbered (n mod $N^{ECCE}_{RB}$)+$jN^{ECCE}_{RB}$ in PRB index floor(n/$N^{ECCE}_{RB}$) for localized mapping, and EREGs numbered floor (n/$N^{Sm}_{RB}$)+$jN^{ECCE}_{RB}$ in PRB indices (n+jmax(1,$N^{Sp}_{RB}/N^{EREG}_{ECCE}$))mod $N^{Sp}_{RB}$ for distributed mapping, where j=0, 1, . . . , $N^{EREG}_{ECCE}-1$, $N^{EREG}_{ECCE}$ is the number of EREGs per ECCE, and $N^{ECCE}_{RB}=16/N^{EREG}_{ECCE}$ is the number of ECCEs per RB pair. The PRB pairs constituting EPDCCH set $S_p$ are assumed to be numbered in ascending order from 0 to $N^{Sp}_{RB}-1$.

Case A in Table 8 applies when:

DCI formats 2, 2A, 2B, 2C or 2D is used and $N^{DL}_{RB} \geq 25$, or any DCI format when $n_{EPDCCH}<104$ and normal cyclic prefix is used in normal subframes or special subframes with configuration 3, 4, 8.

Otherwise case 2 is used. The quantity $E_{PDCCH}$ for a particular UE is defined as the number of downlink resource elements (k,l) in a PRB pair configured for possible EPDCCH transmission of EPDCCH set $S_0$ and fulfilling all of the following criteria, they are part of any one of the 16 EREGs in the physical resource-block pair, they are assumed by the UE not to be used for CRSs or CSI-RSs, the index l in a subframe fulfils $l \geq l_{EPDCCHStart}$.

where $l_{EPDCCHStart}$ is given based on higher layer signaling 'epdcch-StartSymbol-r11', higher layer signaling 'pdsch-Start-r11', or CFI value carried by PCFICH.

The mapping to resource elements (k,l) on antenna port p meeting the criteria above is in increasing order of first the index k and then the index l, starting with the first slot and ending with the second slot in a subframe.

For localized transmission, the single antenna port p to use is given by Table 12 with n'=$n_{ECCE,low}$ mod $N^{ECCE}_{RB}$+ $n_{RNTI}$ mod min($N^{ECCE}_{EPDCCH}$, $N^{ECEE}_{RB}$), where $n_{ECCE,low}$ is the lowest ECCE index used by this EPDCCH transmission in the EPDCCH set, $n_{RNTI}$ corresponds to the RNTI associated with the EPDCCH transmission, and $N^{ECCE}_{EPDCCH}$ is the number of ECCEs used for this EPDCCH.

TABLE 10

| | Normal cyclic prefix | | Extended cyclic prefix |
|---|---|---|---|
| n' | Normal subframes, Special subframes, configurations 3, 4, 8 | Special subframes, configurations 1, 2, 6, 7, 9 | Normal subframes, Special subframes, configurations 3, 4, 8 |
| 0 | 107 | 107 | 107 |
| 1 | 108 | 109 | 108 |

TABLE 10-continued

| | Normal cyclic prefix | | Extended cyclic prefix |
|---|---|---|---|
| n' | Normal subframes, Special subframes, configurations 3, 4, 8 | Special subframes, configurations 1, 2, 6, 7, 9 | Normal subframes, Special subframes, configurations 3, 4, 8 |
| 2 | 109 | — | — |
| 4 | 110 | — | — |

For distributed transmission, each resource element in an EREG is associated with one out of two antenna ports in an alternating manner where $p \in \{107,109\}$ for normal cyclic prefix and $p \in \{107,108\}$ for extended cyclic prefix.

Hereinafter, the PDCCH and EPDCCH will be commonly referred to as the PDCCH or (E)PDCCH.

Recently, machine type communication (MTC) has come to the fore as a significant communication standard issue. MTC refers to exchange of information between a machine and an eNB without involving persons or with minimal human intervention. For example, MTC may be used for data communication for measurement/sensing/reporting such as meter reading, water level measurement, use of a surveillance camera, inventory reporting of a vending machine, etc. and may also be used for automatic application or firmware update processes for a plurality of UEs. In MTC, the amount of transmission data is small and UL/DL data transmission or reception (hereinafter, transmission/reception) occurs occasionally. In consideration of such properties of MTC, it would be better in terms of efficiency to reduce production cost and battery consumption of UEs for MTC (hereinafter, MTC UEs) according to data transmission rate. Since the MTC UE has low mobility, the channel environment thereof remains substantially the same. If an MTC UE is used for metering, reading of a meter, surveillance, and the like, the MTC UE is very likely to be located in a place such as a basement, a warehouse, and mountain regions which the coverage of a typical eNB does not reach. In consideration of the purposes of the MTC UE, it is better for a signal for the MTC UE to have wider coverage than the signal for the conventional UE (hereinafter, a legacy UE).

When considering the usage of the MTC UE, there is a high probability that the MTC UE requires a signal of wide coverage compared with the legacy UE. Therefore, if the eNB transmits a PDCCH, a PDSCH, etc. to the MTC UE using the same scheme as a scheme of transmitting the PDCCH, the PDSCH, etc. to the legacy UE, the MTC UE has difficulty in receiving the PDCCH, the PDSCH, etc. Therefore, the present invention proposes that the eNB apply a coverage enhancement scheme such as subframe repetition (repetition of a subframe with a signal) or subframe bundling upon transmission of a signal to the MTC UE having a coverage issue so that the MTC UE can effectively receive a signal transmitted by the eNB. For example, the PDCCH and PDSCH may be transmitted to the MTC UE having the coverage issue in a plurality of subframes (e.g. about 100 subframes).

The embodiments of the present invention can be applied to not only the 3GPP LTE/LTE-A system but also a new radio access technology (RAT) system. As a number of communication devices have required much higher communication capacity, the necessity of mobile broadband communication, which is much enhanced compared to the conventional RAT, has increased. In addition, massive MTC capable of providing various services anytime and anywhere by connecting a number of devices or things to each other has been considered as a main issue in the next generation communication system. Moreover, the design of a communication system capable of supporting services/UEs sensitive to reliability and latency has also been discussed. That is, the introduction of the next generation RAT considering the enhanced mobile broadband communication, massive MTC, Ultra-reliable and low latency communication (URLLC), etc. has been discussed. For convenience of description, the corresponding technology is simply referred to as a new RAT in this specification.

In the next system of LTE-A, a method to reduce latency of data transmission is considered. Packet data latency is one of the performance metrics that vendors, operators and also end-users (via speed test applications) regularly measure. Latency measurements are done in all phases of a radio access network system lifetime, when verifying a new software release or system component, when deploying a system and when the system is in commercial operation.

Better latency than previous generations of 3GPP RATs was one performance metric that guided the design of LTE. LTE is also now recognized by the end-users to be a system that provides faster access to internet and lower data latencies than previous generations of mobile radio technologies.

However, with respect to further improvements specifically targeting the delays in the system little has been done. Packet data latency is important not only for the perceived responsiveness of the system; it is also a parameter that indirectly influences the throughput. HTTP/TCP is the dominating application and transport layer protocol suite used on the internet today. According to HTTP Archive (http://httparchive.org/trends.php) the typical size of HTTP-based transactions over the internet are in the range from a few 10's of Kbytes up to 1 Mbyte. In this size range, the TCP slow start period is a significant part of the total transport period of the packet stream. During TCP slow start the performance is latency limited. Hence, improved latency can rather easily be shown to improve the average throughput, for this type of TCP-based data transactions. In addition, to achieve really high bit rates (in the range of Gbps), UE L2 buffers need to be dimensioned correspondingly. The longer the round trip time (RTT) is, the bigger the buffers need to be. The only way to reduce buffering requirements in the UE and eNB side is to reduce latency.

Radio resource efficiency could also be positively impacted by latency reductions. Lower packet data latency could increase the number of transmission attempts possible within a certain delay bound; hence higher block error ration (BLER) targets could be used for the data transmissions, freeing up radio resources but still keeping the same level of robustness for users in poor radio conditions. The increased number of possible transmissions within a certain delay bound, could also translate into more robust transmissions of real-time data streams (e.g. VoLTE), if keeping the same BLER target. This would improve the VoLTE voice system capacity.

There are more over a number of existing applications that would be positively impacted by reduced latency in terms of increased perceived quality of experience: examples are gaming, real-time applications like VoLTE/OTT VoIP and video telephony/conferencing.

Going into the future, there will be a number of new applications that will be more and more delay critical. Examples include remote control/driving of vehicles, augmented reality applications in e.g. smart glasses, or specific machine communications requiring low latency as well as critical communications.

In embodiments of the present invention described below, the term "assume" may mean that a subject to transmit a channel transmits the channel in accordance with the corresponding "assumption." This may also mean that a subject to receive the channel receives or decodes the channel in a form conforming to the "assumption," on the assumption that the channel has been transmitted according to the "assumption."

Figure 7:
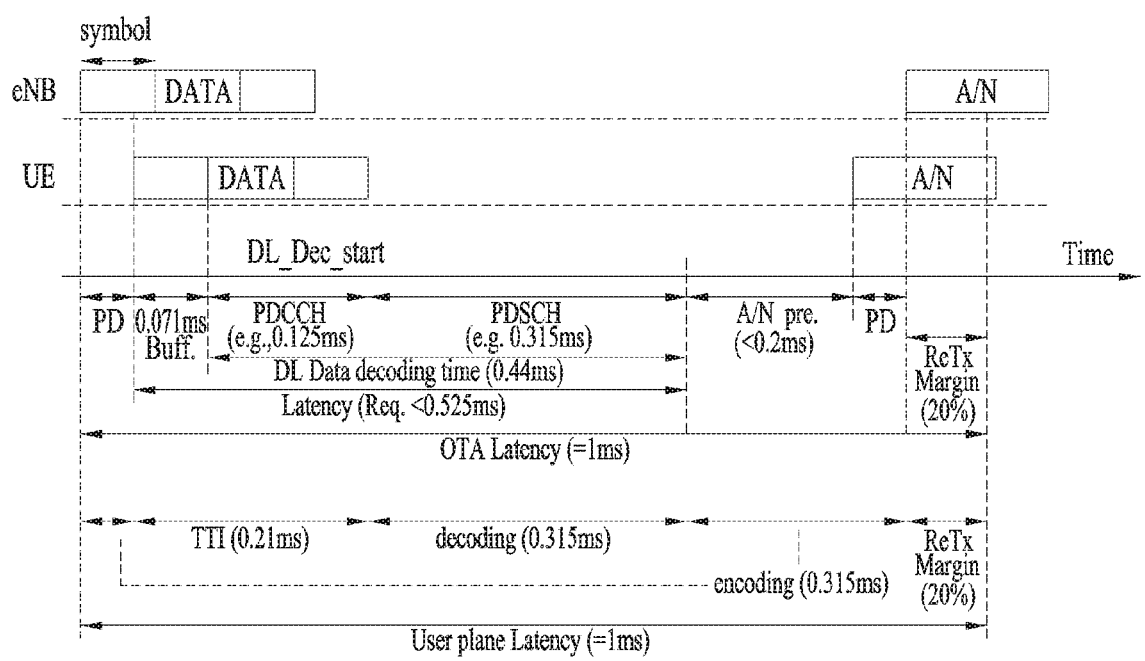
FIG. 7 illustrates the length of a transmission time interval (TTI) which is needed to implement low latency.

FIG. 7 illustrates the length of a transmission time interval (TTI) which is needed to implement low latency.

Referring to FIG. 7, a propagation delay (PD), a buffering time, a decoding time, an A/N preparation time, an uplink PD, and an OTA (over the air) delay according to a retransmission margin are produced while a signal transmitted from the eNB reaches the UE, the UE transmits an A/N for the signal, and the A/N reaches the eNB. To satisfy low latency, a shortened TTI (sTTI) shorter than or equal to 0.5 ms needs to be designed by shortening the TTI, which is the smallest unit of data transmission. For example, to shorten the OTA delay, which is a time taken from the moment the eNB starts to transmit data (PDCCH and PDSCH) until the UE completes transmission of an A/N for the data to the eNB, to a time shorter than 1 ms, the TTI is preferably set to 0.21 ms. That is, to shorten the user plane (U-plane) delay to 1 ms, the sTTI may be set in the unit of about three OFDM symbols.

While FIG. 7 illustrates that the sTTI is configured with three OFDM symbols to satisfy 1 ms as the OTA delay or U-plane delay, an sTTI shorter than 1 ms may also be configured. For example, for the normal CP, an sTTI consisting of 2 OFDM symbols, an sTTI consisting of 4 OFDM symbols and/or an sTTI consisting of 7 OFDM symbols may be configured.

In the time domain, all OFDM symbols constituting a default TTI or the OFDM symbols except the OFDM symbols occupying the PDCCH region of the TTI may be divided into two or more sTTIs on some or all frequency resources in the frequency band of the default TTI.

In the following description, a default TTI or main TTI used in the system is referred to as a TTI or subframe, and the TTI having a shorter length than the default/main TTI of the system is referred to as an sTTI. For example, in a system in which a TTI of 1 ms is used as the default TTI as in the current LTE/LTE-A system, a TTI shorter than 1 ms may be referred to as the sTTI. In addition, in the following description, a physical downlink control channel/physical downlink data channel/physical uplink control channel/physical uplink data channel transmitted in units of the default/main TTI are referred to as a PDCCH/PDSCH/PUCCH/PUSCH, and a PDCCH/PDSCH/PUCCH/PUSCH transmitted within an sTTI or in units of sTTI are referred to as sPDCCH/sPDSCH/sPUCCH/sPUSCH. In the new RAT environment, the numerology may be changed, and thus a default/main TTI different from that for the current LTE/LTE-A system may be used. However, for simplicity, the default/main TTI will be referred to as a TTI, subframe, legacy TTI or legacy subframe, and a TTI shorter than 1 ms will be referred to as an sTTI, on the assumption that the time length of the default/main TTI is 1 ms. The method of transmitting/receiving a signal in a TTI and an sTTI according to embodiments described below is applicable not only to the system according to the current LTE/LTE-A numerology but also to the default/main TTI and sTTI of the system according to the numerology for the new RAT environment.

Figure 8:
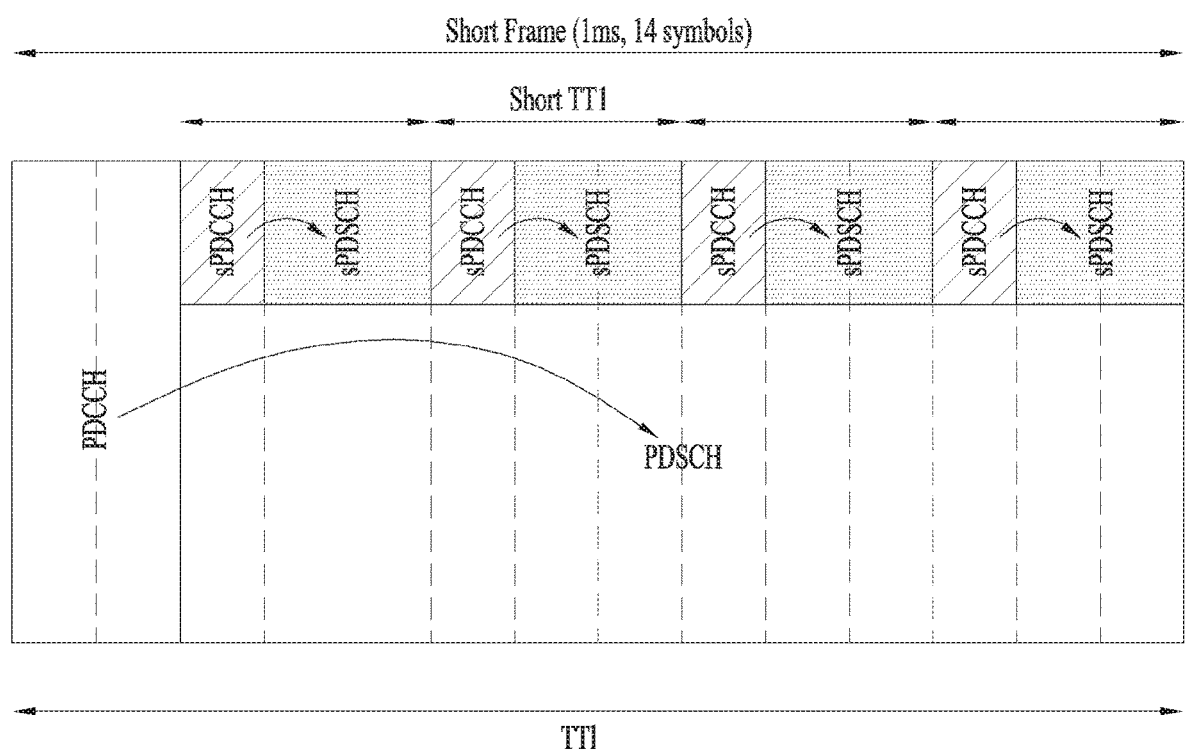
FIG. 8 illustrates an example of a shortened TTI and an example of transmission of a control channel and a data channel in a shortened TTI.

FIG. 8 illustrates an sTTI and transmission of a control channel and data channel within the sTTI.

In the downlink environment, a PDCCH for transmission/scheduling of data within an sTTI (i.e., sPDCCH) and a PDSCH transmitted within an sTTI (i.e., sPDSCH) may be transmitted. For example, referring to FIG. 8, a plurality of the sTTIs may be configured within one subframe, using different OFDM symbols. For example, the OFDM symbols in the subframe may be divided into one or more sTTIs in the time domain. OFDM symbols constituting an sTTI may be configured, excluding the leading OFDM symbols on which the legacy control channel is transmitted. Transmission of the sPDCCH and sPDSCH may be performed in a TDM manner within the sTTI, using different OFDM symbol regions. In an sTTI, the sPDCCH and sPDSCH may be transmitted in an FDM manner, using different regions of PRB(s)/frequency resources.

The present invention is directed to a method of providing a plurality of different services in one system by applying different system parameters according to the services or UEs to satisfy the requirements for the services. In particular, for a service/UE sensitive to latency, an sTTI may be used to send data in a short time and to allow a response to the data to be sent in a short time. Thereby, the latency may be reduced as much as possible. On the other hand, for a service/UE which is less sensitive to latency, a longer TTI may be used to transmit/receive data. For a service/UE which is sensitive to power efficiency rather than to latency, data may be repeatedly transmitted at the same low power or may be transmitted in units of a longer TTI. The present invention proposes a transmission method and multiplexing method for controlling information and data signals to enable the operations described above. The proposed methods are associated with the transmission aspect of a network, the reception aspect of a UE, multiplexing of multiple TTIs in one UE, and multiplexing of multiple TTIs between multiple UEs.

Figure 9:
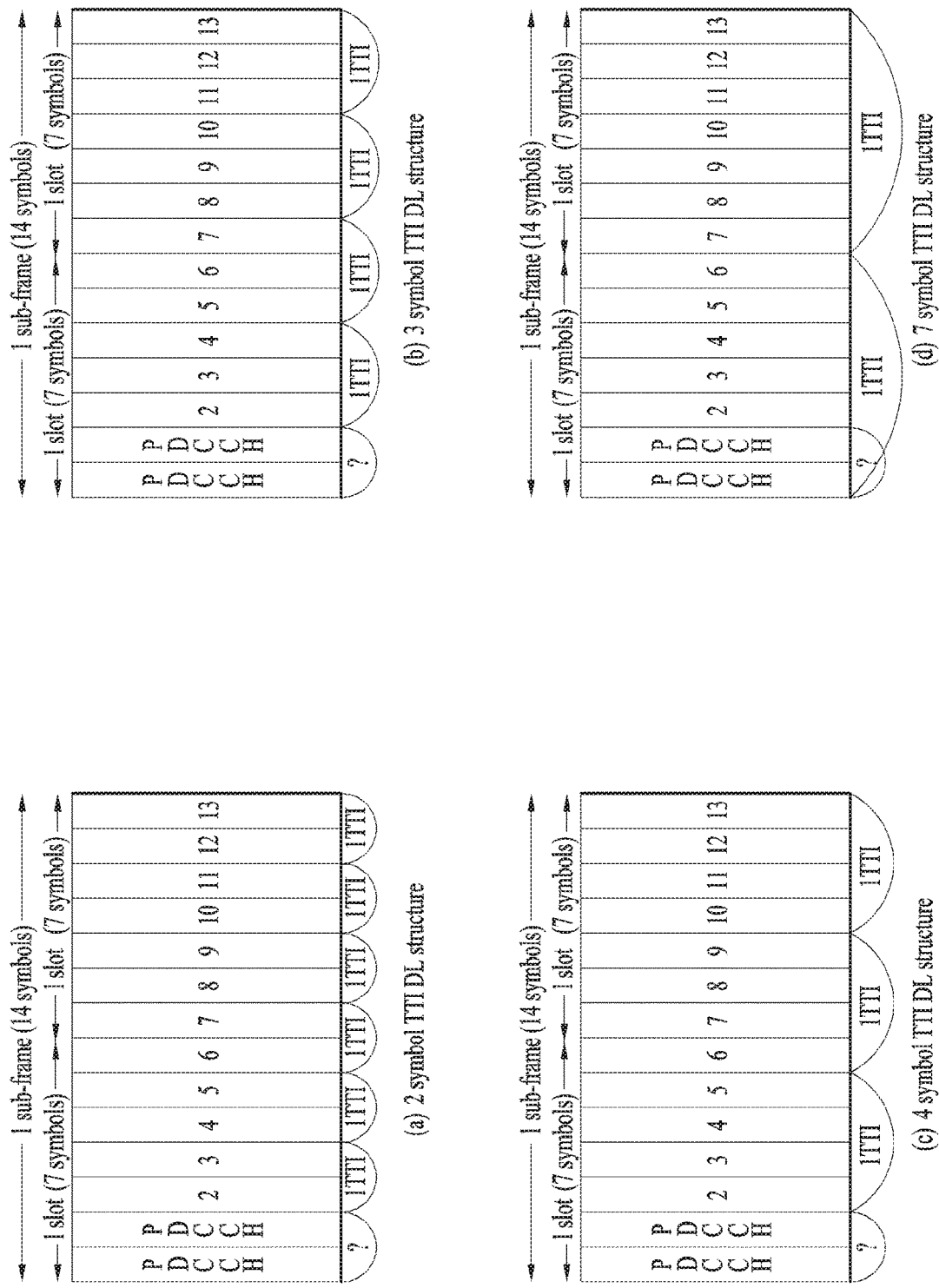
FIG. 9 illustrates an example of short TTIs configured in a legacy subframe.

FIG. 9 illustrates an example of short TTIs configured in a legacy subframe.

In legacy LTE/LTE-A, if a subframe of 1 ms has a normal CP, the subframe consists of 14 OFDM symbols. If a TTI shorter than 1 ms is configured, a plurality of TTIs may be configured within one subframe. As shown in FIG. 9, each TTI may consist of, for example, 2 symbols, 3 symbols, 4 symbols, or 7 symbols. Although not shown in FIG. 9, a TTI consisting of one symbol may also be considered. If one symbol is one TTI unit, 12 TTIs may be configured in the default TTI of 1 ms, on the assumption that the legacy PDCCH is transmittable within two OFDM symbols. Similarly, when the two leading OFDM symbols are assumed to be the legacy PDCCH region, and two symbols are taken as one TTI unit, 6 TTIs may be configured within the default TTI. If three symbols are taken as one TTI, 4 TTIs may be configured within the default TTI. If 4 symbols are taken as one TTI unit, 3 TTIs may be configured within the default TTI.

If the 7 symbols are configured as one TTI, a TTI consisting of 7 leading symbols including the legacy PDCCH region and a TTI consisting of 7 subsequent symbols may be configured. If one TTI consists of 7 symbols, a UE supporting the short TTI assumes that the two leading OFDM symbols on which the legacy PDCCH is transmitted are punctured or rate-matched and the data and/or control channels of the UE are transmitted on the five subsequent symbols in the TTI (i.e., the TTI of the first slot) positioned at the leading part of one subframe (i.e., default TTI). On the other hand, the UE may assume that the data and/or control channels can be transmitted on all 7 symbols in a TTI positioned at the rear part of the same subframe (i.e., the TTI of the second slot) without any rate-matched or punctured resource region.

Puncturing a channel on a specific resource means that the signal of the channel is mapped to the specific resource in the procedure of resource mapping of the channel, but a portion of the signal mapped to the punctured resource is excluded in transmitting the channel. In other words, the specific resource which is punctured is counted as a resource for the channel in the procedure of resource mapping of the channel, a signal mapped to the specific resource among the signals of the channel is not actually transmitted. The receiver of the channel receives, demodulates or decodes the channel, assuming that the signal mapped to the specific resource is not transmitted. On the other hand, rate-matching of a channel on a specific resource means that the channel is never mapped to the specific resource in the procedure of resource mapping of the channel, and thus the specific resource is not used for transmission of the channel. In other words, the rate-matched resource is not counted as a resource for the channel in the procedure of resource mapping of the channel. The receiver of the channel receives, demodulates, or decodes the channel, assuming that the specific rate-matched resource is not used for mapping and transmission of the channel.

<OFDM Numerology>

The new RAT system uses an OFDM transmission scheme or a similar transmission scheme. For example, the new RAT system may follow the OFDM parameters defined in the following table.

TABLE 11

| Parameter | Value |
| --- | --- |
| Subcarrier-spacing (Δf) | 75 kHz |
| OFDM symbol length | 13.33 us |
| Cyclic Prefix (CP) length | 1.04 us/0.94 us |
| System BW | 100 MHz |
| No. of available subcarriers | 1200 |
| Subframe length | 0.2 ms |
| Number of OFDM symbol per Subframe | 14 symbols |

<Self-Contained Subframe Structure>

Figure 10:
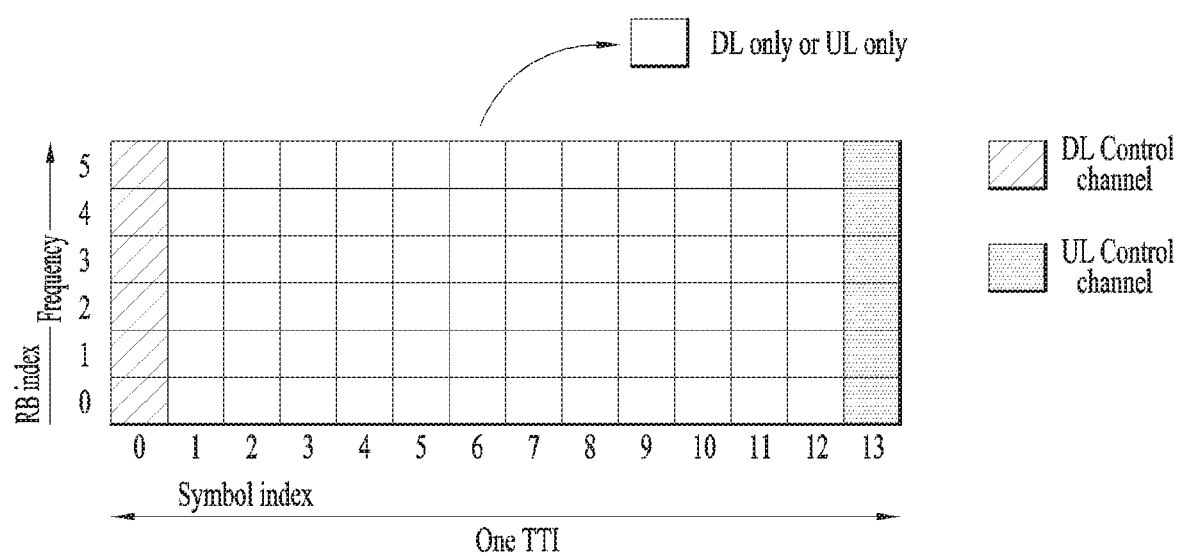
FIG. 10 illustrates a self-contained subframe structure.

FIG. 10 illustrates a self-contained subframe structure.

In order to minimize the latency of data transmission in the TDD system, a self-contained subframe structure is considered in the new fifth-generation RAT.

In FIG. 10, the hatched area represents the transmission region of a DL control channel (e.g., PDCCH) carrying the DCI, and the black area represents the transmission region of a UL control channel (e.g., PUCCH) carrying the UCI. Here, the DCI is control information that the eNB transmits to the UE. The DCI may include information on cell configuration that the UE should know, DL specific information such as DL scheduling, and UL specific information such as UL grant. The UCI is control information that the UE transmits to the eNB. The UCI may include a HARQ ACK/NACK report on the DL data, a CSI report on the DL channel status, and a scheduling request (SR).

In FIG. 10, the region of symbols from symbol index 1 to symbol index 12 may be used for transmission of a physical channel (e.g., a PDSCH) carrying downlink data, or may be used for transmission of a physical channel (e.g., PUSCH) carrying uplink data. According to the self-contained subframe structure, DL transmission and UL transmission may be sequentially performed in one subframe, and thus transmission/reception of DL data and reception/transmission of UL ACK/NACK for the DL data may be performed in one subframe. As a result, the time taken to retransmit data when a data transmission error occurs may be reduced, thereby minimizing the latency of final data transmission.

In such a self-contained subframe structure, a time gap is needed for the process of switching from the transmission mode to the reception mode or from the reception mode to the transmission mode of the eNB and UE. On behalf of the process of switching between the transmission mode and the reception mode, some OFDM symbols at the time of switching from DL to UL in the self-contained subframe structure are set as a guard period (GP).

<Analog Beamforming>

In millimeter wave (mmW), the wavelength is shortened, and thus a plurality of antenna elements may be installed in the same area. For example, a total of 100 antenna elements may be installed in a 5-by-5 cm panel in a 30 GHz band with a wavelength of about 1 cm in a 2-dimensional array at intervals of 0.5λ (wavelength). Therefore, in mmW, increasing the coverage or the throughput by increasing the beamforming (BF) gain using multiple antenna elements is taken into consideration.

If a transceiver unit (TXRU) is provided for each antenna element to enable adjustment of transmit power and phase, independent beamforming is possible for each frequency resource. However, installing TXRU in all of the about 100 antenna elements is less feasible in terms of cost. Therefore, a method of mapping a plurality of antenna elements to one TXRU and adjusting the direction of a beam using an analog phase shifter is considered. This analog beamforming method may only make one beam direction in the whole band, and thus may not perform frequency selective beamforming (BF), which is disadvantageous.

Hybrid BF with B TXRUs that are fewer than Q antenna elements as an intermediate form of digital BF and analog BF may be considered. In the case of hybrid BF, the number of directions in which beams may be transmitted at the same time is limited to B or less, which depends on the method of collection of B TXRUs and Q antenna elements.

Unlike the conventional LTE/LTE-A system where all UEs and eNBs perform signal transmission and reception on a 1 ms basis due to the TTI with a fixed length of 1 ms, the present invention proposes the system where a UE and an eNB can transmit and receive signals using a plurality of TTI lengths in the state that the TTI has a plurality of lengths. In particular, the present invention proposes a method for allowing an eNB and a UE to communicate to each other by supporting various TTI lengths and variability thereof in the state that the TTI length can be changed and a multiplexing scheme for each channel and UE. Although the present invention is described based on the conventional LTE/LTE-A system, the invention can be applied to other systems including the LTE/LTE-A system or the RAT.

The sPDCCH referred to in the present invention may include a PDCCH transmitted in the new RAT environment as well as a PDCCH transmitted in an sTTI in the LTE/LTE-A system.

To transmit data using a TTI of which the length is dynamically changed based on a plurality of TTI lengths, a control channel (e.g., sPDCCH) for scheduling the data should also be transmitted using various transmission time lengths. For example, to schedule data transmitted with a short TTI length, the sPDCCH also needs to be transmitted with a short transmission time length. On the contrary, to schedule data transmitted with a long TTI length, the sPDCCH may also be transmitted with a long transmission time length. Thus, an SPDCCH search space needs to be designed such that the transmission time length of the sPDCCH can be dynamically changed depending on the size of the TTI, where data is transmitted.

The present invention proposes a method of configuring a search space where an sPDCCH is to be transmitted/monitored. The search space according to the present invention can be applied not only to a PDCCH but to a channel(s) carrying control information of the new RAT.

Figure 11:
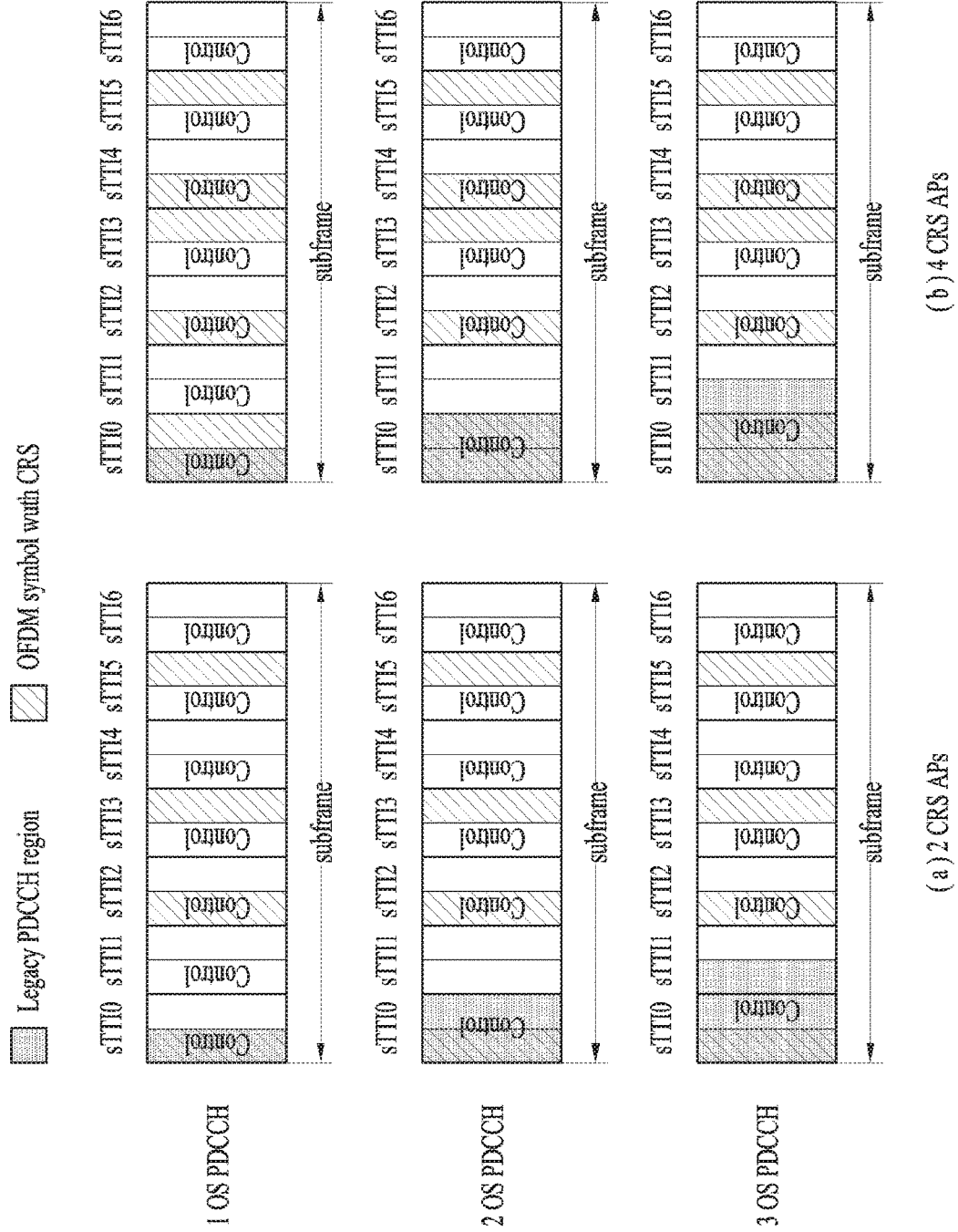
FIGS. 11 to 14 illustrate shortened TTI (sTTI) boundaries in a legacy subframe.
Figure 12:
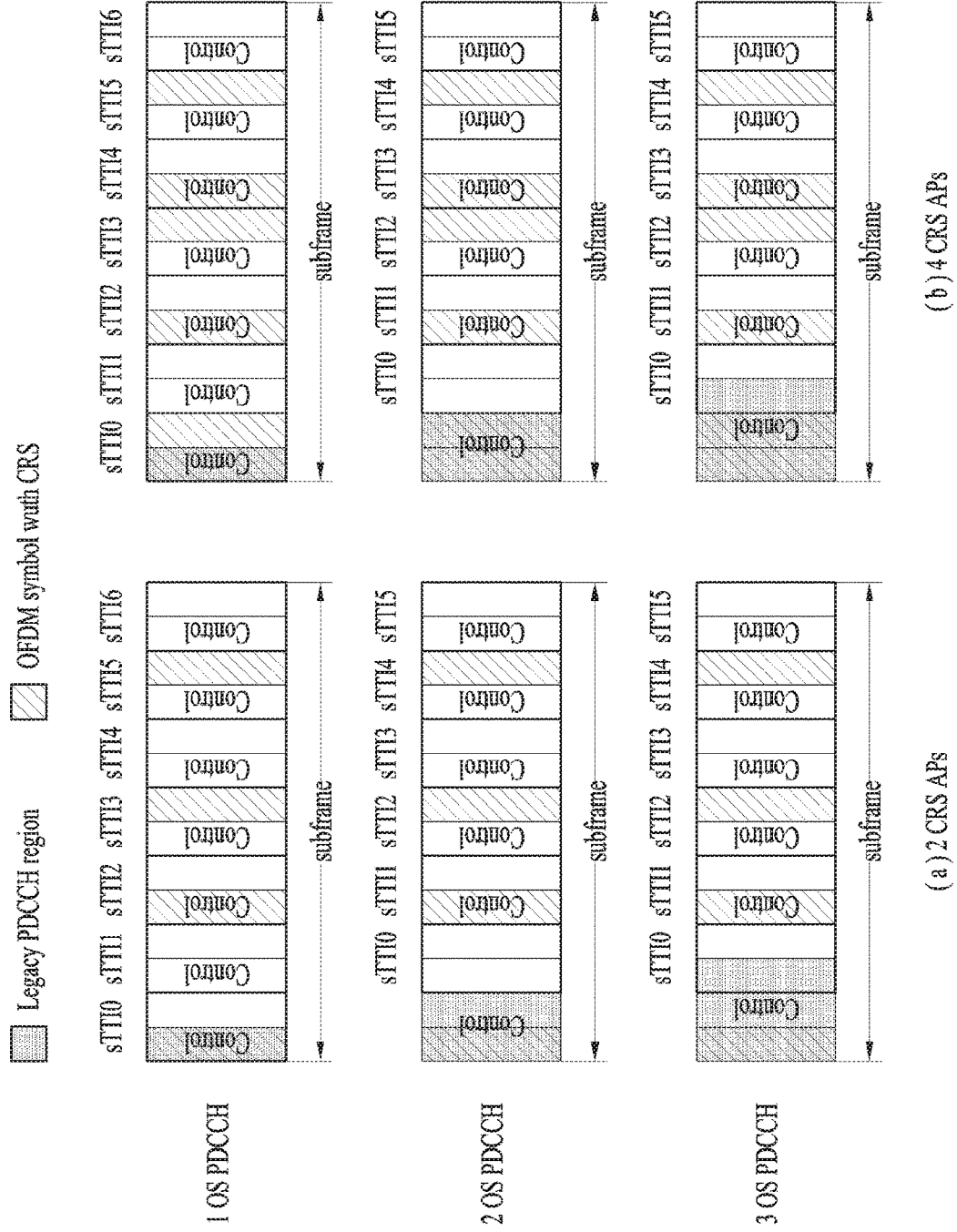
Figure 13:
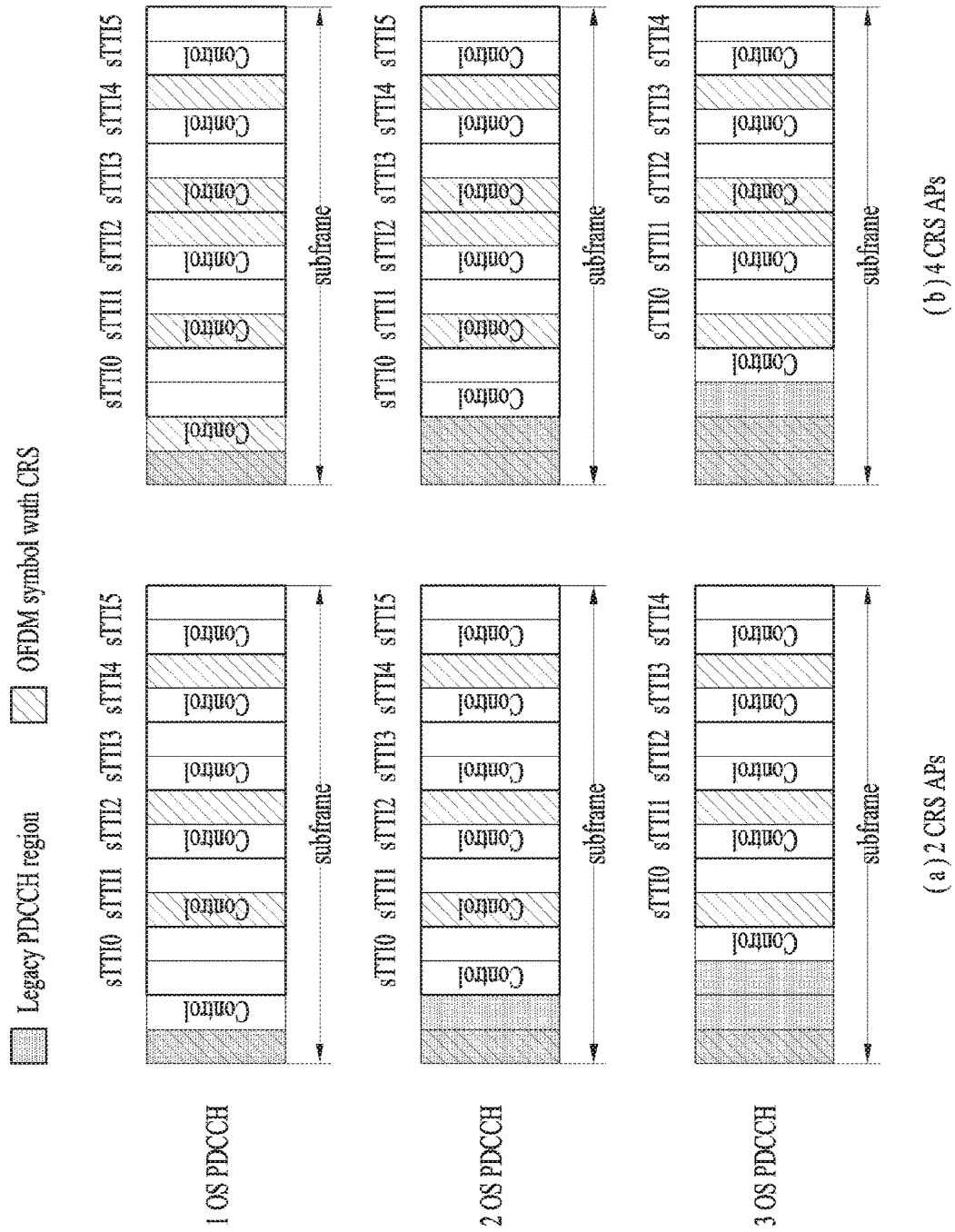
Figure 14:
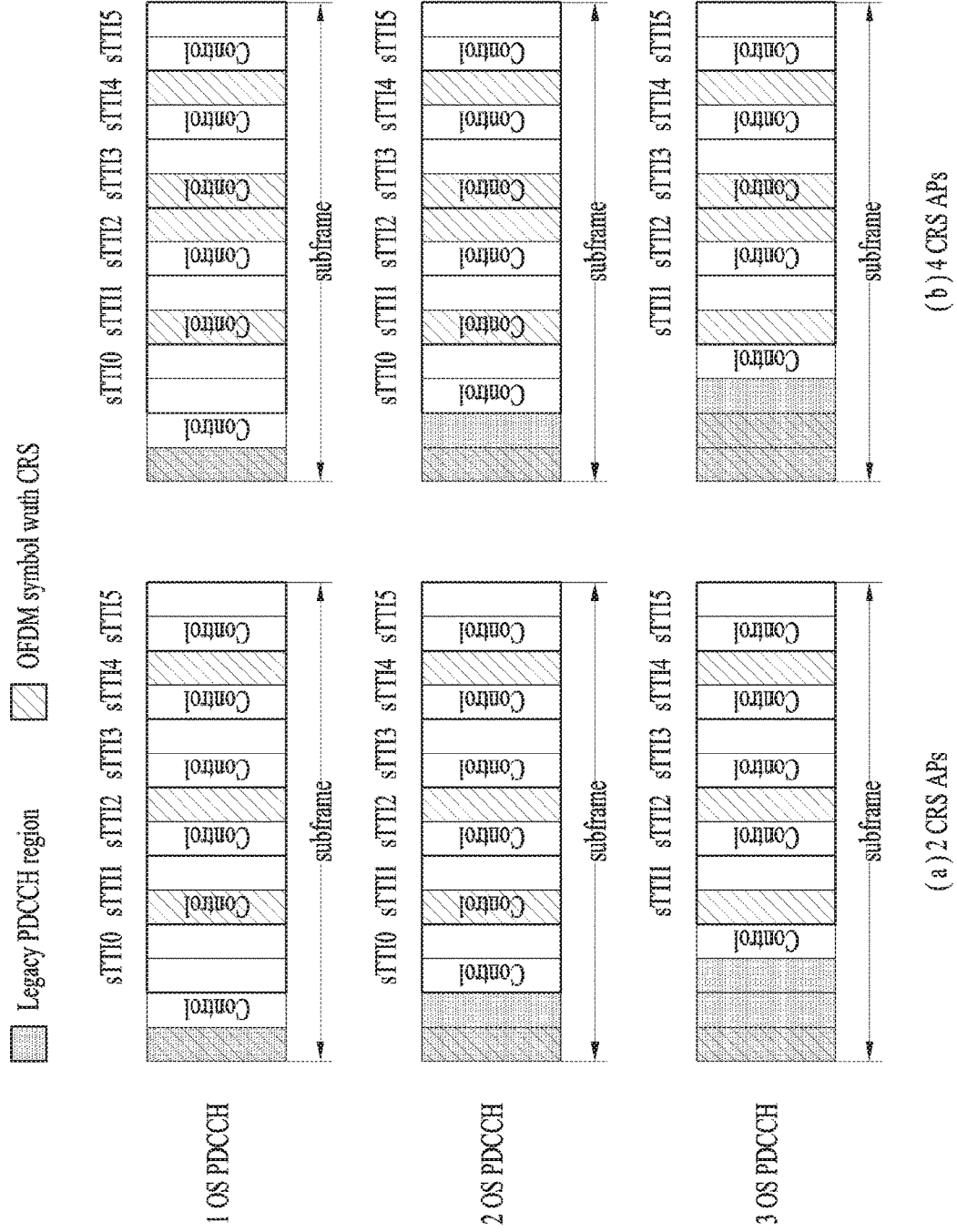

According to the present invention, an sTTI may have a length of two OFDM symbols. For example, in one subframe, sTTIs may have the boundaries shown in FIGS. 11 to 14. In FIGS. 11 to 14, the OFDM symbols denoted as "control" mean OFDM symbol regions in which DCI scheduling sTTI data is transmitted. If a specific one among the OFDM symbols corresponds to an OFDM symbol region where a legacy PDCCH is transmitted, it means that DCI scheduling sTTI data is transmitted on the legacy PDCCH. On the other hand, if the specific OFDM symbol corresponds to an OFDM symbol region where no legacy PDCCH is transmitted, it means that DCI scheduling sTTI data is transmitted on an sPDCCH. In FIG. 11, if one sTTI is completely included in the OFDM symbol region where the legacy PDCCH is transmitted, the corresponding sTTI may be assumed to be a non-existing or unused sTTI. Alternatively, it is possible to configure one sTTI by binding two OFDM symbols except the OFDM symbol region where the legacy PDCCH is transmitted or the OFDM symbol region corresponding to the control region. For example, if a legacy PDCCH is transmitted in the first two OFDM symbols in a subframe, each sTTI can be configured by sequentially binding two OFDM symbols from OFDM symbol #2 except OFDM symbols #0 and #1 in which the legacy PDCCH is transmitted. If the legacy PDCCH is transmitted in an odd number of OFDM symbols so that the last OFDM symbol in the subframe remains, the corresponding OFDM symbol may not belong to any sTTIs or belong to the last sTTI in the subframe such that the last sTTI includes three OFDM symbols. Although FIGS. 11 to 14 assume that a control channel (e.g., sPDCCH) is transmitted in one OFDM symbol for convenience of description, the present invention can be applied when the control channel (e.g., sPDCCH) is transmitted in two or more OFDM symbols.

The sPDCCH has the following sREG configuration. The sREG is the minimum resource unit for the sPDCCH and can be configured by reusing the REG concept for the legacy PDCCH. For example, one sREG may be composed of four consecutive REs except a CRS RE(s) in the frequency domain. Then, one sCCE may be composed of distributed sREGs in sPDCCH time/frequency resources. However, this design is only suitable for the legacy PDCCH that does not share OFDM symbol resources with an sPDSCH. Unlike the legacy PDCCH, resources unused for sPDCCH transmission in an sPDCCH OFDM symbol(s) in the sTTI need to be used for sPDSCH transmission. The necessity increases if the sTTI includes a small number of OFDM symbols. However, when the REG concept for the legacy PDCCH is reused (that is, when the sREG is composed of four consecutive REs except a CRS RE(s)), sREG boundaries are not well aligned with PRB boundaries, and thus the reuse of the REG concept is not suitable for multiplexing the sPDCCH and sPDSCH within one OFDM symbol.

Figure 15:
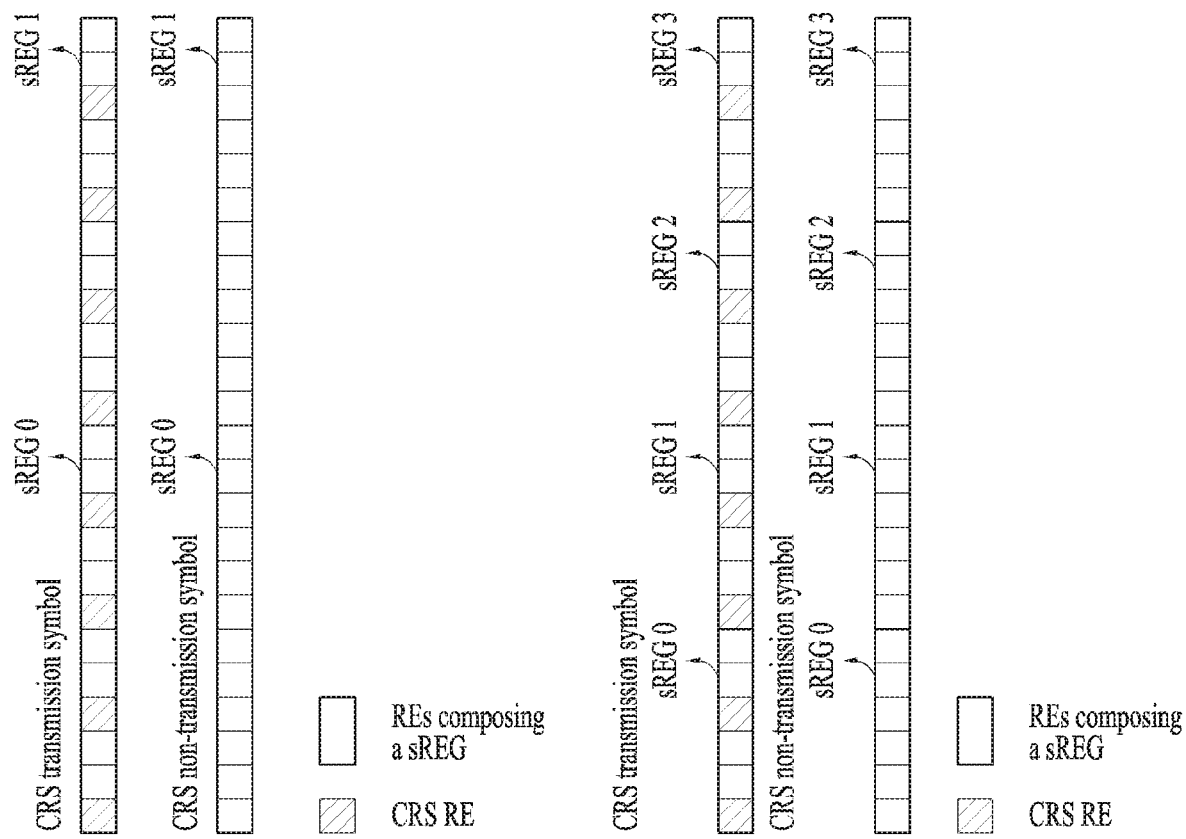
FIG. 15 illustrates how a short Resource Element Group (REG) is configured.

Therefore, the present invention proposes to configure an sREG using four, six, or twelve consecutive REs within one OFDM symbol as shown in FIG. 15. In this case, a CRS RE(s) is included in the sREG but not used for the sPDCCH transmission. The same sREG concept may be applied to a DMRS-based sPDCCH. In this case, the sPDCCH is rate-matched in consideration of a DMRS RE(s). FIG. 15(a) illustrates a case in which one sREG is composed of twelve consecutive REs, and FIG. 15(b) illustrates a case in which one sREG is composed of six consecutive REs. In addition, one sCCE is composed of a plurality of sREGs (e.g., three sREGs). In particular, when one sREG is composed of twelve consecutive REs within one OFDM symbol as shown in FIG. 15(a), the size of the sREG is aligned with that of a PRB in the frequency domain. Hence, even though the sPDCCH (or sCCE) is composed of a plurality of distributed sREGs, the sPDCCH and sPDSCH can be Frequency Division Multiplexed (FDMed) (within one OFDM symbol) without any restrictions. Meanwhile, when sREGs are configured as shown in FIG. 15, the actual number of REs in one sREG that can be used for the sPDCCH transmission may vary per OFDM symbol according to RS configurations (e.g., CRS configuration) (see FIG. 5). Accordingly, the actual number of REs in one sCCE available for the sPDCCH transmission may also vary per OFDM symbol. That is, sPDCCHs with the same Aggregation Level (AL) may have different code rates. The solution thereto will be described later.

Meanwhile, if small granularity of resources (i.e., sREGs) are not necessary, an sCCE can be defined without using the sREG concept. For example, one sCCE may be composed of thirty-six consecutive/non-consecutive REs within one OFDM symbol. In addition, one sCCE may be composed of at least one PRB in the OFDM symbol region where the sPDCCH is transmitted or in one OFDM symbol. For example, one sCCE may be composed of A PRBs (i.e., A*12 subcarriers) in one OFDM symbol region.

In general, a DMRS for the sPDCCH (i.e., sPDCCH DMRS) can be transmitted on sPDCCH transmission resources. Similarly, an sPDSCH DMRS can be transmitted on sPDSCH resources. In the case of a two-symbol sTTI, the sPDCCH DMRS and sPDSCH DMRS may be naturally transmitted in the first and second OFDM symbols in the sTTI, respectively. Meanwhile, the sPDCCH and sPDSCH may share a DMRS(s) in order to reduce DMRS overhead in an sTTI. If the DMRS sharing is applied, OFDM symbol resources for the sPDCCH DMRS and sPDSCH DMRS can be given as follows.

If the number of Antenna Ports (APs) used for the sPDCCH transmission is different from that for the sPDSCH transmission, the sPDCCH and sPDSCH can share some APs. For example, assuming that antenna ports p and p+1 are used for the sPDCCH transmission and antenna ports p, p+1, p+2, and p+3 are used for the sPDSCH transmission, DMRSs for antenna ports p and p+1 may be allocated to the first OFDM symbol in the sTTI to reduce sPDCCH decoding latency. On the other hand, DMRSs for antenna ports p+2 and p+3 may be allocated only to the second OFDM symbol in the sTTI, which is used for the sPDSCH transmission.

The number of APs used for the sPDCCH transmission can be set equal to that for the sPDSCH transmission. In this case, it is possible to maximize beamforming gain for the sPDCCH and sPDSCH. This is because when the number of APs used for the sPDCCH transmission is different from that for the sPDSCH transmission, a precoding matrix optimized for both the sPDCCH and sPDSCH cannot be used. DMRSs for the sPDCCH and sPDSCH may be allocated only to the first OFDM symbol in the sTTI to reduce the sPDCCH decoding latency.

One or two APs can be used for the sPDCCH transmission. Meanwhile, even though the sPDCCH is transmitted via one antenna port, DMRSs may be defined for a plurality of APs (e.g., two APs) in consideration of sPDCCH multiplexing (for example, sPDCCH transmission via two APs). Thus, regardless of the number of APs used for the sPDCCH transmission, a UE may attempt to receive the sPDCCH by assuming that an eNB always transmits as many DMRSs as a specific number of APs. In addition, the eNB may perform sPDCCH resource mapping by assuming that it always transmits as many DMRSs as the specific number of APs. Here, the sPDCCH resource mapping may mean: a) that the sPDCCH is rate-matched in DMRS regions corresponding to the specific number of APs and/or; b) that sREGs/sCCEs are configured except the DMRS regions corresponding to the specific number of APs. In addition, the specific number of APs may be determined equal to: 1) the maximum number of sPDCCH DMRS APs supported by the technical specifications; 2) a specific number of DMRS APs defined in the technical specifications; or 3) the number of DMRS APs configured by SIB, RRC, etc. Moreover, by considering the case where the sPDCCH and sPDSCH share DMRSs, the specific number of APs may be determined equal to the number of DMRS APs transmitted in sPDCCH transmission OFDM symbols, the number of sPDSCH transmission APs, or a larger one between the number of sPDSCH transmission APs and the number of sPDCCH transmission APs.

A. Elements for Determining the Number of sPDCCH Decoding Candidates

Aggregation Level (AL) Restriction

The sPDCCH should be completely decoded in a short period of time to reduce data transmission and reception latency. As one method for reducing sPDCCH decoding latency, it is possible to reduce the number of blind detection/decoding candidates a UE should monitor. In the prior art, a UE has performed (E)PDCCH monitoring for four ALs (see Table 6). However, in the case of the sPDCCH, the number of decoding candidates can be reduced by decreasing the number of ALs a UE should monitor. To this end, the UE can performing monitoring for the following ALs.

The UE can monitor only ALs 1, 2, and 4 for the sPDCCH reception. That is, the UE should monitor ALs 1, 2, 4 and 8 for the legacy PDCCH, whereas the UE can monitor only the three ALs for the sPDCCH. In particular, if the UE is capable of reducing latency, the UE may exclude the highest AL, i.e., AL 8 on the assumption that the UE has a relatively good channel environment.

The UE can monitor only an AL(s) for the sPDCCH reception. To this end, using the PDCCH or RRC, an eNB may inform the UE of the AL(s) the UE should monitor. As one method, the AL(s) the UE should monitor may be configured independently. In other words, if the UE should monitor AL x and AL y, the eNB may inform the UE of the values of x and y through the PDCCH or RRC. As another method, the eNB may inform the UE of only one AL. In this case, the ALs the UE should monitor may be implicitly determined based on the notified AL value. For example, if the AL value configured by the eNB is x, two AL values the UE should monitor may be equal to AL x and AL 2x.

The UE can monitor only an AL(s) for the sPDCCH reception. In this case, an AL or a set of ALs that the UE should monitor may vary according to the length of a (s)TTI where a shortened PUCCH (sPUCCH) and/or a shortened PUSCH (sPUSCH) is transmitted. This is because since in the case of the sPUCCH, the amount of transmission resources may vary depending on the TTI length, the transmission time (i.e., (s)TTI length) may differ according to the channel environment (e.g., required coverage).

Alternatively, an AL(s) may be restricted by the MCS of the last scheduled PDSCH. For example, when 64 Quadrature Amplitude Modulation (QAM) or 256 QAM is used, the maximum AL may be limited to 4. In this case, since there may be no data transmission after the last scheduled PDSCH, the AL or the set of ALs may be reconfigured by higher layers (e.g., RRC layer).

Alternatively, an AL(s) may be restricted by a common control channel or other control channels.

If the UE reads one or more control channels to read data (one or more physical channels matching to the one or more control channels may be equal to or different from each other), the AL of the first control channel may correspond to an entire AL set, and the AL of the second or later control channel may be correspond to a restricted AL set. In this case, the restriction about the AL of the second or later control channel may be determined by the AL of the first control channel. An AL relationship between channels may be given by a function determined by considering multiple factors including a difference between control information bits, a scheme of transmitting the first control channel, etc.

Depending on the payload size of DCI to be monitored, an AL or a set of ALs may vary or a restricted AL(s) may be designated. For example, if the payload size is extremely small, the AL may be fixed to 1 and/or 2. In this case, it may be considered to apply power boosting to CCEs or control channels transmitted to individual UEs. In other words, the control channels transmitted to different UEs may have different transmit power, and the power control may bring additional AL effects.

RS Overhead

When resources constituting an sREG include an RE region a CRS/DMRS is transmitted in, the number of REs available for sPDCCH transmission varies according to whether the CRS/DMRS is transmitted in an OFDM symbol where an sPDCCH is transmitted even if the SPDCCH is transmitted at the same AL (see FIG. 15). Thus, a CRS/DMRS transmission OFDM symbol has lower sPDCCH performance than a CRS/DMRS non-transmission OFDM symbol even though the sPDCCH is transmitted at the same AL in the same channel environment. Hence, the present invention proposes to change the value of an sPDCCH AL(s) a UE should monitor or change the number of sREGs or PRBs included in one sCCE depending on the amount of CRS and/or DMRS overhead.

In the CRS and/or DMRS transmission OFDM symbol, an AL(s) of which the value is two times greater than that of an AL(s) monitored in the CRS and/or DMRS non-transmission OFDM symbol can be monitored. For example, a UE may monitor ALs 1, 2, and 4 in the CRS non-transmission OFDM symbol and ALs 2, 4, and 8 in the CRS transmission OFDM symbol. As one implementation example, when an AL(s) a UE should monitor is configured by an eNB, the AL(s) may mean an AL(s) in the CRS and/or DMRS non-transmission OFDM symbol. And, the UE may monitor an AL(s) of which the value is two times greater than that of the configured AL(s) in the CRS and/or DMRS transmission OFDM symbol. In this case, a DMRS may mean an RS shared by UEs rather than a UE-specific or PDCCH-specific RS.

The CRS transmission OFDM symbol and CRS non-transmission OFDM symbol may differ in the number of sREGs included in one sCCE. For example, in the case of the CRS transmission OFDM symbol, the number of sREGs included in one sCCE may be about one-and-half or two times greater than that in the case of the CRS non-transmission OFDM symbol. This ratio may differ according to DMRS and/or CRS overhead. For example, in the case of the CRS non-transmission OFDM symbol, one sCCE may include three sREGs, whereas in the case of the CRS transmission OFDM symbol, one sCCE may include six sREGs. Thus, the number of valid REs in one sCCE, which are used for the sPDCCH transmission, may be maintained similarly/equally regardless of RS overhead, and thus the UE can monitor the same AL(s) in the CRS non-transmission and CRS transmission OFDM symbols.

When one sCCE includes at least one PRB in one OFDM symbol or an OFDM symbol region where the sPDCCH is transmitted, the CRS transmission OFDM symbol and CRS non-transmission OFDM symbol may differ in the number of PRBs included in one sCCE. For example, in the case of the CRS transmission OFDM symbol, the number of PRBs included in one sCCE may be about one-and-half or two times greater than that in the case of the CRS non-transmission OFDM symbol. This ratio may differ according to the DMRS and/or CRS overhead. For example, in the case of the CRS non-transmission OFDM symbol, one sCCE may include three PRBs, whereas in the case of the CRS transmission OFDM symbol, one sCCE may include six PRBs. Thus, the number of valid REs in one sCCE, which are used for the sPDCCH transmission, may be maintained similarly/equally regardless of the RS overhead, and thus the UE can monitor the same AL(s) in the CRS non-transmission and CRS transmission OFDM symbols.

The CRS transmission OFDM symbol and CRS non-transmission OFDM symbol may differ in the number of REs included in one sREG. For example, in the case of the CRS transmission OFDM symbol, the number of sREGs included in one sCCE may be about one-and-half or two times greater than that in the case of the CRS non-transmission OFDM symbol. This ratio may differ according to the DMRS and/or CRS overhead. For example, in the case of the CRS non-transmission OFDM symbol, one sREG may include four REs, whereas in the case of the CRS transmission OFDM symbol, one sREG may include six REs. Thus, the number of valid REs in one sREG, which are used for the sPDCCH transmission, may be maintained similarly/equally regardless of the RS overhead, and thus the UE can monitor the same AL(s) in the CRS non-transmission and CRS transmission OFDM symbols.

B. The Number of sPDCCH Decoding Candidates

The number of rounds of Blind Detection (BD) for sPDCCH reception needs to be discussed to reduce sPDCCH decoding latency. Since the time required for sPDCCH decoding should be reduced compared to that required for decoding the legacy PDCCH, the total number of decoding candidates in an sPDCCH search space should decrease. To this end, the following matters can be considered.

In the case of a legacy PDCCH UE-specific search space, since DCI format 1A or DCI format X can be transmitted for each decoding candidate, the number of rounds of the BD may be twice the number of decoding candidates. To reduce the number of rounds of the BD in the sPDCCH search space, a UE needs to monitor only one DCI format in the sPDCCH search space.

To prevent the number of rounds of the BD from increasing, the payload size of a DL grant should be equal to that of a UL grant regardless of DCI formats or transmission modes.

If a UE should monitors four ALs in the sPDCCH search space similar to the legacy PDCCH/EPDCCH, it is difficult to significantly decrease the number of decoding candidates. On the contrary, if a UE monitors a limited number of ALs (e.g., one or two ALs) for the sPDCCH reception, the number of decoding candidates may decrease. In this case, an AL or an AL set for sPDCCH monitoring may be configured by the legacy PDCCH or RRC signaling.

Assuming that one sCCE is composed of a total of thirty-six REs including a CRS transmission RE(s), the number of sCCEs that can be included in one OFDM symbol may depend on sPDCCH PRB-set size as shown in Table 12. Here, it is assumed that resources do not overlap between sCCEs, and an sPDCCH PRB-set means a PRB set constituting the sPDCCH search space. In case the sPDCCH is transmitted over the entire system bandwidth, the sPDCCH PRB-set is equal to whole PRB resources.

TABLE 12

| | sPDCCH PRB-set size | | | | |
|---|---|---|---|---|---|
| | 6 RB | 12 RB | 24 RB | 48 RB | 96 RB |
| # of CCEs | 2 | 4 | 8 | 16 | 32 |

If UE's BD capability is not considered, the maximum number of decoding candidates included in one OFDM symbol may depend on ALs as shown in Table 13. In this case, it is assumed that resources do not overlap between decoding candidates.

TABLE 13

| | sPDCCH PRB-set size | | | | |
|---|---|---|---|---|---|
| | 6 RB | 12 RB | 24 RB | 48 RB | 96 RB |
| AL 1 | 2 | 4 | 8 | 16 | 32 |
| AL 2 | 1 | 2 | 4 | 8 | 16 |
| AL 4 | — | 1 | 2 | 4 | 8 |
| AL 8 | — | — | 1 | 2 | 4 |

If an sCCE is composed of one PRB (i.e., twelve REs), Table 13 can be modified by the change. For example, in the case of 6-RB in Table 13, AL 1 may be changed from two candidates to six candidates, and AL 2 may be changed from one candidate to three candidates (that is, one candidate is extended to three candidates). In this case, the RPB-set size may be set to an integer multiple of 4.

Meanwhile, if the UE's BD capability is considered, the number of decoding candidates existing in the sPDCCH search space can be reduced compared to that in Table 13. In the present invention, it is assumed that the maximum number of rounds of the BD in the sPDCCH search space is six and monitoring is performed during the length of a single piece of DCI. To this end, if a DL grant and a UL grant are monitored in the same search space, they may have the same length. Thus, the maximum number of decoding candidates a UE can monitor within each sPDCCH search space becomes six. Based on these assumptions, the number of decoding candidates constituting the sPDCCH search space can be determined as follows. Here, the number six is merely an example, and thus it can be properly changed to another value in consideration of the UE BD capability.

Case 1: a UE monitors all ALs

A UE may monitor all ALs supported by the sPDCCH in all sPDCCH search spaces. For example, the UE may monitor ALs 1, 2, 4 and 8. Assuming that the number of decoding candidates existing in AL i is M_i, the total number of decoding candidates should be equal to or less than six. In addition, the total number of decoding candidates may depend on the sPDCCH PRB-set size. If the sPDCCH PRB-set size is small, there may be restriction on the number of decoding candidates where resources do not overlap, and thus the total number of decoding candidates may become less than six. For example, the number of decoding candidates per AL may depend on the sPDCCH PRB-set size as shown in Table 14.

TABLE 14

| | sPDCCH PRB-set size | | | | |
|---|---|---|---|---|---|
| | 6 RB | 12 RB | 24 RB | 48 RB | 96 RB |
| AL 1 | 2 | 3 | 2 | 2 | 2 |
| AL 2 | 1 | 2 | 2 | 2 | 2 |
| AL 4 | — | 1 | 1 | 1 | 1 |
| AL 8 | — | — | 1 | 1 | 1 |

Case 2: a UE monitors ALs 1, 2, and 4 only

A UE may monitor ALs 1, 2, and 4 only. In this case, the number of decoding candidates per AL may increase compared to Case 1. For example, the number of decoding candidates per AL may depend on the sPDCCH PRB-set size as shown in Table 15.

TABLE 15

| | sPDCCH PRB-set size | | | | |
|---|---|---|---|---|---|
| | 6 RB | 12 RB | 24 RB | 48 RB | 96 RB |
| AL 1 | 2 | 3 | 2 | 2 | 2 |
| AL 2 | 1 | 2 | 2 | 2 | 2 |
| AL 4 | — | 1 | 2 | 2 | 2 |

Case 3: a UE monitors only two ALs

A UE may monitor only two ALs. For convenience of description, the two ALs are named AL x and AL y, respectively. Assuming that y is two times greater than x, the number of decoding candidates per AL may depend on the sPDCCH PRB-set size as shown in Table 16. In Table 16, when the sPDCCH PRB-set size is 6-RB, x and y may be equal to 1 and 2, respectively. When the sPDCCH PRB-set size is 12-RB, if x=1 and y=2, the numbers of decoding candidates for AL x and AL y may be 2 and 2 or 3 and 2, respectively. If x=2 and y=4, the numbers of decoding candidates for AL x and AL y may be 2 and 1, respectively. When the SPDCCH PRB-set size is 24-RB, if y=2 or 4, the number of decoding candidates for AL y may be 2. If y=8, the number of decoding candidates for AL y may be 1.

TABLE 16

| | sPDCCH PRB-set size | | | | |
|---|---|---|---|---|---|
| | 6 RB | 12 RB | 24 RB | 48 RB | 96 RB |
| AL x | 2 (x = 1) | 2 or 3 (x = 1)<br>2 (x = 2) | 4 | 4 | 4 |
| AL y | 1 (y = 2) | 2 (y = 2)<br>1 (y = 4) | 2 (y = 2 or 4)<br>1 (y = 8) | 2 | 2 |

Case 4: a UE monitors only one AL

A UE may monitor only one AL. For example, the number of decoding candidates may depend on the sPDCCH PRB-set size and the AL monitored by the UE as shown in Table 17. That is, the number of decoding candidates depending on the AL may be determined by a smaller one between the maximum number of decoding candidates that can be included in one OFDM symbol within an sPDCCH PRB-set and the maximum BD size of the UE (or the maximum number of decoding candidates that the UE can monitor at once).

TABLE 17

| | sPDCCH PRB-set size | | | | |
|---|---|---|---|---|---|
| | 6 RB | 12 RB | 24 RB | 48 RB | 96 RB |
| AL 1 | 2 | 4 | 6 | 6 | 6 |
| AL 2 | 1 | 2 | 4 | 6 | 6 |
| AL 4 | — | 1 | 2 | 4 | 6 |
| AL 8 | — | — | 1 | 2 | 4 |

If downlink control information is distributedly transmitted over multiple channels or if a UE receives multiple control channels and performs data decoding, the configuration of the AL, candidate set, or search space may vary (between the channels). It can be applied when channels have the same PRB sets. In this case, candidates monitored at once may be distributed over the search spaces for the multiple channels. Alternatively, in one channel, the UE may performs blind decoding for multiple candidates, but in other channels, the UE may perform DTX/DRX detection at predetermined positions. However, in case a different AL is used according to DCI size, the UE may monitor one candidate per AL. In this case, the search spaces for individual ALs may have the same starting point. By doing so, DMRS-based channel estimation can be facilitated by maximizing the amount of resources shared between different ALs.

C. sCCE Composition

Hereinafter, methods of configuring sREGs included in one sCCE will be described.

Distributed Mapping

Figure 16:
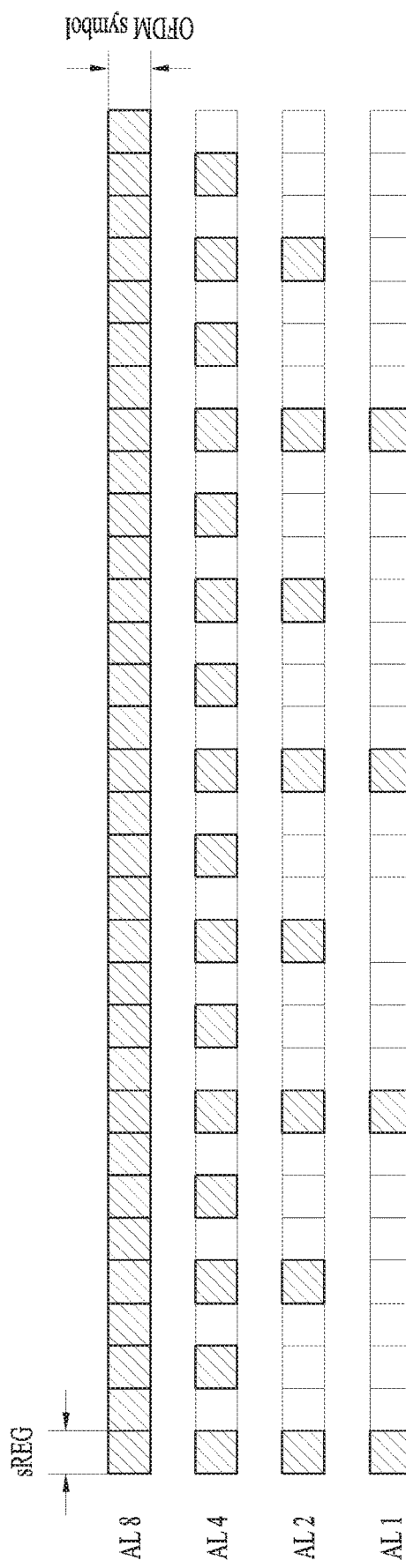
FIGS. 16 to 19 illustrates how a short PDCCH decoding candidate (sPDCCH) is configured.

Among sREGs existing in the same OFDM symbol, non-consecutive sREGs may constitute one sCCE as shown in FIG. 16. Specifically, FIG. 16 shows the locations of sREGs constituting one sCCE when the one sCCE is composed of four sREGs. Here, the sREG may be defined as a set of REs in one OFDM symbol within one or multiple PRBs (see FIG. 15). In addition, the PRBs may be obtained by sequentially arranging PRBs configured by an sPDCCH PRB-set. Moreover, the number of sREGs constituting one sCCE is merely an example and thus may vary depending on situations. For example, one sCCE may be composed of one sREG. Further, an sREG may be replaced with one or multiple PRBs, and a PRB may be replaced with a logical RB. Logical RBs may sequentially match with PRBs from a PRB with the lowest index. Further, the PRBs matching with the logical RBs may be non-consecutive.

For example, assuming that the RB size of the sPDCCH PRB-set is P (that is, P RBs) and the number of sREGs included in one sCCE is N, the one sCCE may be composed of a total of N sREGs by allocating one sREG every P/N PRBs. Here, the PRB-set may be a set of consecutive or non-consecutive PRBs. If the PRB-set consists of non-consecutive PRBs, the present invention can be applied to PRBs corresponding to logical RB indices 0, . . . , P−1.

Alternatively, assuming that there are R sREGs in the sPDCCH PRB-set, one sCCE may be composed of a total of N sREGs by allocating one sREG every R/N sREGs. In this structure, if CCE 1 is located at a resource farthest away from CCE 0, frequency hopping diversity (between consecutive CCEs) may be obtained. Alternatively, CCEs may be sequentially mapped to resources.

In the case of distributed mapping, where one sCCE is composed of sREGs distributed in the frequency and/or time domain, sCCE indices can be determined as follows. In this case, sCCEs constituting one sPDCCH decoding candidate (i.e., a resource region in which the sPDCCH is transmitted) may be composed of one or a plurality of sCCEs with consecutive indices.

Alt 1. Frequency First Mapping

First, sCCE indexing can be performed such that sCCEs existing in the same OFDM symbol region have consecutive indices. For example, when N potential sCCE resources are present in one symbol, indexing may be performed on the N sCCE resources such that the sCCE indices are set to: 0, 2, 4, . . . , N−2, 1, 3, 5, . . . , N−5, N−3, N−1; 0, 1, 2, . . . , N−1; or 0, N/k, N/k*2, . . . , 1, N/k+1, N/k*2+1, . . . , 2, N/k+2, N/k*2+2, . . . , 3, N/k+3, N/k*2+3, . . . (i.e., uniform distribution over k blocks), where k is an integer greater than 2.

Thereafter, if all sCCEs in one OFDM symbol are completely indexed, indexing may continue on sCCEs in a next OFDM symbol may be indexed subsequently.

Alternatively, if all sCCEs in one OFDM symbol are completely indexed, the sCCEs in a next OFDM symbol may be indexed from 0 again. Thus, each OFDM symbol may have the same sCCE index.

In this case, sCCE indexing in each OFDM symbol may be performed as follows.

1-1. Distributed Frequency

The sCCE indexing can be performed such that for sCCEs in the same OFDM symbol, sCCEs distributed/non-consecutive in the frequency domain have consecutive indices. If all sCCEs in one OFDM symbol is completely indexed, sCCEs existing in a next OFDM symbol may be indexed subsequently or starting from 0 again. In this case, a different indexing method may be applied to each OFDM symbol.

1-2. Localized Frequency

The sCCE indexing can be performed such that for sCCEs in the same OFDM symbol, sCCEs consecutive in the frequency domain have consecutive indices. If all sCCEs in one OFDM symbol is completely indexed, sCCEs existing in a next OFDM symbol may be indexed subsequently or starting from 0 again. In this case, a different indexing method may be applied to each OFDM symbol.

Alt 2. Time First Mapping

First, sCCE indexing can be performed such that sCCEs existing in the same/adjacent frequency region(s) have consecutive indices. Thereafter, sCCEs existing in other frequency regions can be indexed subsequently.

2-1. Time-First and Distributed Mapping in Frequency

The sCCE indexing can be performed such that for sCCEs existing in the same frequency region, sCCEs consecutive in the time/OFDM symbol domain have consecutive indices. If all sCCEs in the same frequency region is completely indexed, sCCEs existing in a distributed/non-consecutive frequency region may be indexed subsequently. For example, if an sREG is composed of twelve consecutive REs in one OFDM symbol within a PRB and an sCCE is composed of three sREGs consecutive (or non-consecutive) in the frequency domain, the sCCE indexing may be performed such that sCCEs existing in the same PRB (group) have consecutive indices in a direction where the OFDM symbol index increases. Thereafter, sCCEs existing in a distributed/non-consecutive different PRB (group) may be indexed subsequently.

2-2. Time First and Localized Mapping in Frequency

Figure 17:
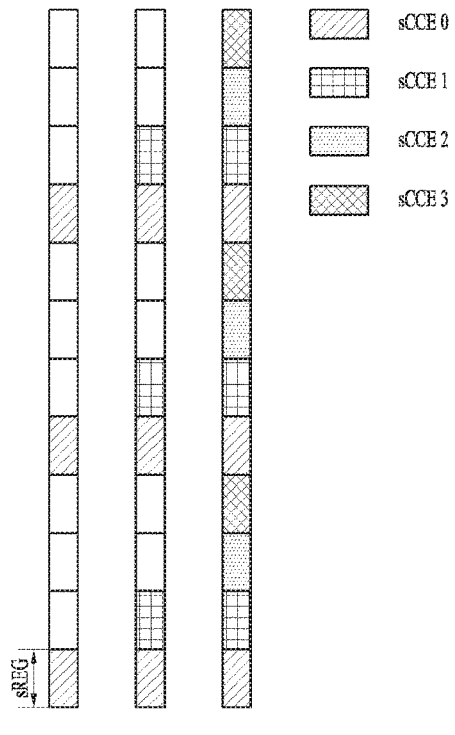
Figure 17:
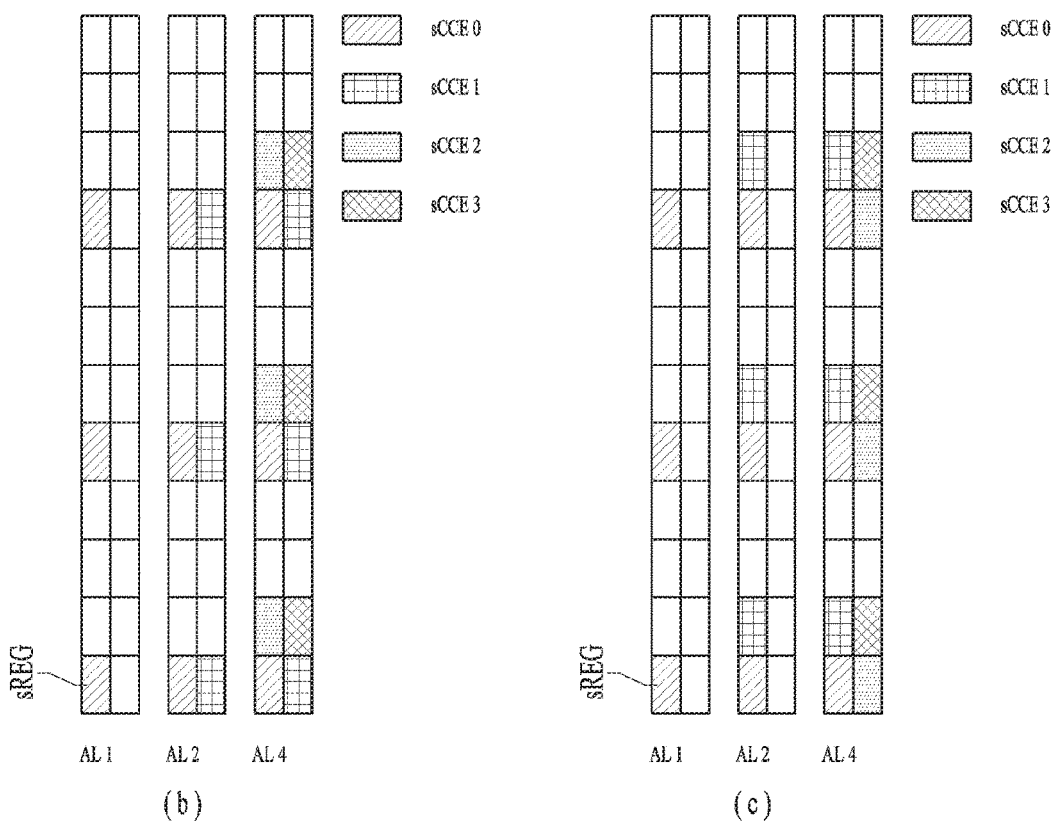

The sCCE indexing can be performed such that for sCCEs existing in the same frequency region, sCCEs consecutive in the time/OFDM symbol domain have consecutive indices. If all sCCEs in the same frequency region is completely indexed, sCCEs existing in a next/adjacent frequency region may be indexed subsequently. For example, if an sREG is composed of twelve consecutive REs in one OFDM symbol within a PRB and an sCCE is composed of three sREGs consecutive (or non-consecutive) in the frequency domain, the sCCE indexing may be performed such that sCCEs existing in the same PRB (group) have consecutive indices in a direction where the OFDM symbol index increases. Thereafter, sCCEs existing in a next PRB (group) may be indexed subsequently. For example, sCCE resources constituting an sPDCCH decoding candidate may be determined according to ALs as shown in FIG. 17. Specifically, FIG. 17(*a*) illustrates a case in which a resource region where the sPDCCH can be transmitted (that is, a control region or search space) is composed of one OFDM symbol, and FIG. 17(*b*) illustrates a case in which the resource region where the sPDCCH can be transmitted is composed of two OFDM symbols.

2-3. Partial Frequency First, Time Second, and Frequency Third Mapping

Assuming that a specific group has a size of G, the sCCE indexing can be performed such that for as many sCCEs as the corresponding group size G, sCCEs existing in an adjacent frequency region in the same OFDM symbol region have consecutive indices. When the G consecutive sCCEs in the frequency domain are completely indexed, G sCCEs existing in a next OFDM symbol in the same frequency region may be indexed subsequently. When the indexing is performed for all OFDM symbol regions, sCCEs existing in a next/adjacent frequency region may be indexed in the same manner. For example, it is assumed that one sREG is composed of twelve consecutive REs in one OFDM symbol within a PRB and an sCCE is composed of three sREGs consecutive (or non-consecutive) in the frequency domain. In this case, the sCCE indexing may be performed such that sCCEs existing in G PRBs within the first OFDM symbol have consecutive indices in a direction where the PRB index increases, and then the sCCE indexing may be performed for sCCEs existing in the same G PRBs within the next OFDM symbol. When the sCCE indexing is performed for all OFDM symbols, the sCCE indexing may be performed for sCCEs existing in next G PRBs in the same manner. For example, sCCE resources constituting an sPDCCH decoding candidate may be determined according to ALs as shown in FIG. 17(*c*). Specifically, FIG. 17(*c*) illustrates a case in which a resource region where the sPDCCH can be transmitted (that is, a control region or search space) is composed of two OFDM symbols. In this case, the group size G is set to 2, and thus, the sCCE indexing is performed such that for two sCCEs, sCCEs existing in an adjacent frequency region in the same OFDM symbol have consecutive indices.

Here, the group size G may mean the number of sCCEs or the PRB size. When G indicates the PRB size, the sCCE indexing may be performed for sCCEs consecutive in the frequency domain within the same OFDM symbol in G PRB regions, and then it may be performed for sCCEs existing in a next OFDM symbol within corresponding PRBs.

Localized Mapping

Figure 18:
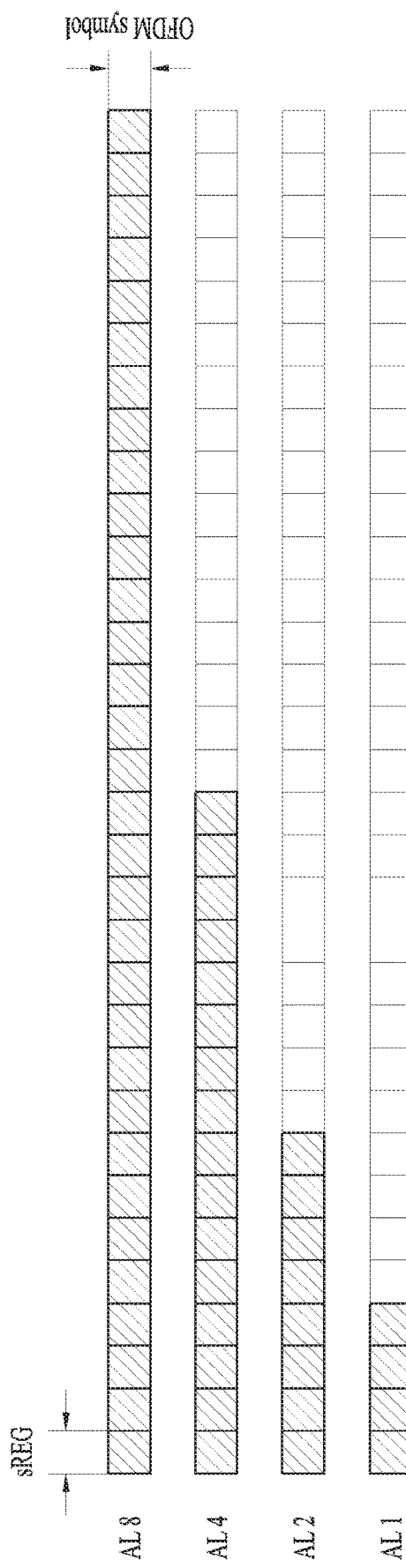

Among sREGs existing within the same OFDM symbol, consecutive sREGs may be included in one sCCE. FIG. 18 shows the locations of sREGs constituting one sPDCCH decoding candidate according to ALs when one sCCE is composed of four sREGs.

For example, assuming that the RB size of the sPDCCH PRB-set is P (that is, P RBs) and the number of sREGs included in one sCCE is N, the one sCCE may be composed of N consecutive sREGs. First, consecutive sREGs existing in the same PRB (group) are used to constitute the sCCE. However, if the PRB (group) has an insufficient number of sREGs constituting the sCCE, consecutive sREGs existing in a next PRB (group) may be used to constitute the sCCE.

Alternatively, assuming that the total number of sREGs in the sPDCCH PRB-set is R, one sCCE may be composed of N consecutive sREGs among the R sREGs.

In the case of localized mapping, where one sCCE is composed of sREGs consecutive in the frequency and/or time domain, sCCE indices can be determined as follows. In this case, sCCEs constituting one sPDCCH decoding candidate (i.e., a resource region in which the sPDCCH is transmitted) may be composed of sCCEs with consecutive indices.

Alt 1. Frequency First Mapping

First, sCCE indexing can be performed such that sCCEs consecutive in the frequency domain have consecutive indices. In this case, if a resource region where the sPDCCH can be transmitted (i.e., a control region or search space) is composed of a plurality of OFDM symbols, the sCCE indexing may be performed first in the frequency domain. After completion of the sCCE indexing in one OFDM symbol, it may be continued in a next OFDM symbol. In other words, sCCE resources constituting one decoding candidate may be determined in a frequency-first time-second manner. Alternatively, when the resource region where the sPDCCH can be transmitted (i.e., control region or search space) is composed of a plurality of OFDM symbols, after completion of indexing all sCCEs in one OFDM symbol, sCCEs existing in a next OFDM symbol may be indexed from 0 again. In this case, each OFDM symbol may have the same sCCE index.

Alt 2. Time First Mapping

Figure 19:
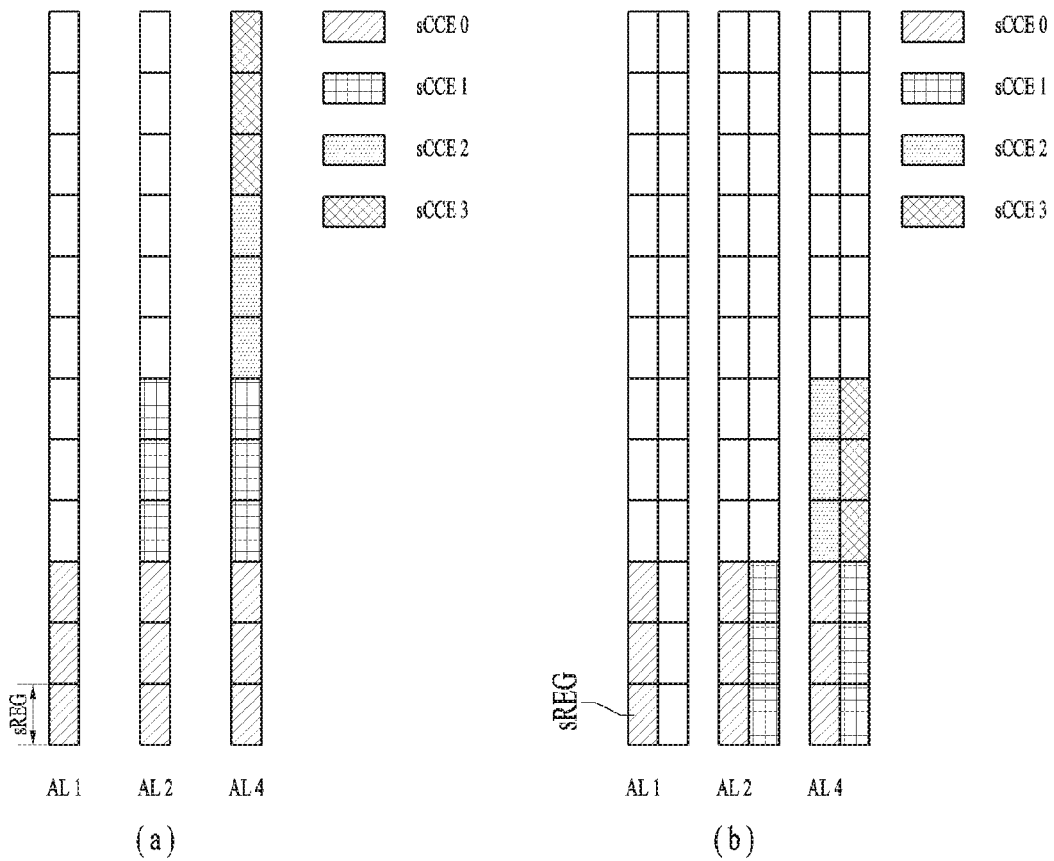

The sCCE indexing can be performed such that sCCEs consecutive in the time domain have consecutive indices. In this case, the sCCE indexing may be performed first in the time domain (in a direction where the OFDM symbol index increases). After completion of the sCCE indexing in the time domain, it may continue in an adjacent frequency region. For example, assuming that an sREG is composed of twelve consecutive REs in one OFDM symbol within a PRB and an sCCE is composed of three consecutive sREGs in the frequency domain, the sCCE indexing may be performed first in the direction where the OFDM symbol index increases and then continue in a direction where the frequency-domain index increases. In this case, if one sPDCCH decoding candidate is composed of sCCEs with consecutive indices, the sCCE resources constituting the sPDCCH decoding candidate may be determined according to ALs as shown in FIG. 19. In other words, sCCE resources constituting one decoding candidate may be determined in a time-first frequency-second manner Specifically, FIG. 19(*a*) illustrates a case in which the resource region where the sPDCCH can be transmitted (i.e., control region or search space) is composed of one OFDM symbol (in this case, there is no difference between Alt 1 and Alt 2), and FIG. 19(*b*) illustrates a case in which the resource region where the sPDCCH can be transmitted is composed of two OFDM symbols.

Change in Mapping According to Whether a UL Grant is Transmitted

If DL and UL grants to be transmitted to one UE is transmitted in one PRB, it may be helpful in terms of multiplexing between the sPDCCH and sPDSCH. This is because if the sPDSCH is transmitted in an OFDM symbol region where the sPDCCH is transmitted, it is not necessary to consider resources for transmitting the UL grant by rate-matching PRB resources on which the DL grant is transmitted for the sPDSCH reception.

Figure 20:
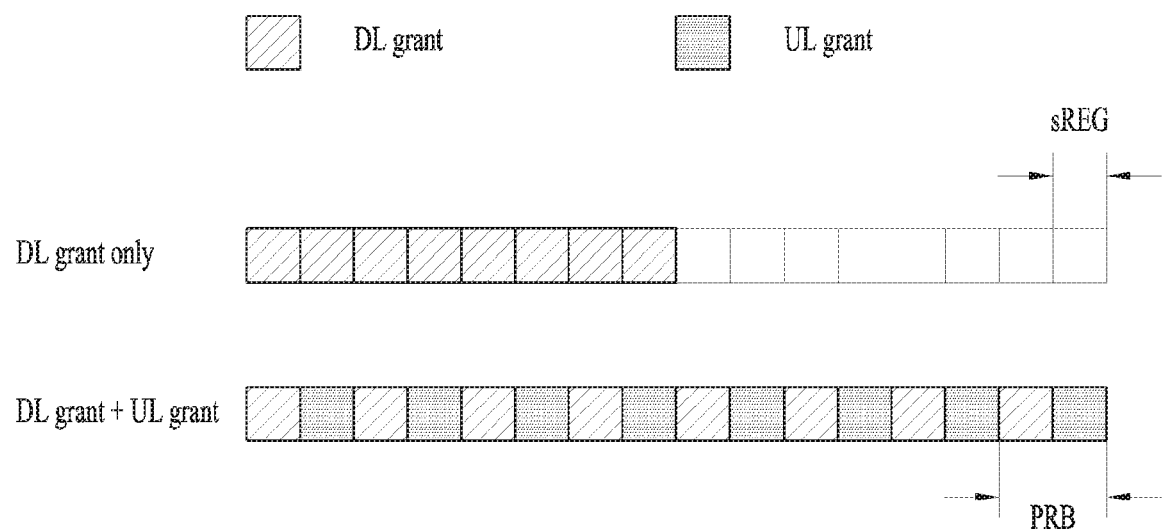
FIG. 20 illustrates that DL and UL grants are transmitted in one some Physical Resource Block (PRB).

Therefore, when DL and UL grants are transmitted to one UE in the same search space, the DL and UL grants may be transmitted in the same PRB as shown in FIG. 20. To this end, when the DL and UL grants are transmitted to the same UE, the distributed mapping may be applied to the DL and UL grants. FIG. 20 illustrates a case in which two sREGs exist in one PRB. Meanwhile, if only a DL grant is transmitted to a UE, the localized mapping may be applied to the DL grant as shown in the upper portion of FIG. 20 in order to use sREG resources in a PRB as many as possible.

D. Hashing of a Search Space

In the case of a legacy (E)PDCCH USS, (E)CCE resources constituting a (E)PDCCH decoding candidate may vary according to a UE ID (e.g., C-RNTI) and a subframe index (or slot index). For example, the location of the first (E)CCE resource constituting the (E)PDCCH search space may vary per subframe according to the UE ID (e.g., C-RNTI) and the subframe index (or slot index) (see Equation 6). By doing so, the (E)CCE resources constituting the search space can be randomized between UEs. In the case of a sPDCCH, hashing of sCCE resources constituting an sPDCCH search space may be performed for the purpose of inter-cell interference coordination. Moreover, in the case of the sPDCCH, which is transmitted in an sTTI, the sPDCCH is rarely transmitted to multiple UEs at the same time, that is, the sPDCCH may be transmitted only to one or few UEs at once. In this case, sPDCCH search space collision between UEs may not be a significant problem. Instead, the hashing of sCCE resources constituting an sPDCCH search space may be performed for the purpose of reducing the impact of inter-cell interference. To this end, the present invention proposes to change sCCE resources constituting an sPDCCH decoding candidate depending on a cell ID (e.g., Physical Cell ID (PCID)) and/or a time index. Alternatively, the hashing may be applied according to a group ID given to a UE rather than a UE ID. For example, when the term $Y_p$,k is defined in Equation 6, $Y_{p,-1}=n_{RNTI}\neq 0$ can be replaced with $Y_{p,-1}=$group ID$\neq 0$. Here, the group ID may be equal to the cell ID or be an RNTI for group casting such as Single-Cell Point-To-Multipoint (SC-PTM), etc. It may allow UEs sharing the group ID to regard the same CCE structure and facilitate data/control multiplexing. In this case, the time index may mean that the following indices are used independently or by combining them.

subframe index
slot index
sTTI index within a subframe
sTTI index within subframe (=radio frame) duration of 10 msec
sTTI index within subframe duration of 40 msec More specifically, it is possible to apply the same hashing regardless of ALs instead of applying different hashing to each AL. In addition, the configuration of a hashing function may be set by higher layers (higher layer signaling). This structure may facilitate FDM between sPDCCHs for different UEs or FDM between an sPDCCH and an sPDSCH by localizing an sCCE region monitored by one UE for sPDCCH reception. In addition, when the sCCE region where one UE monitors the sPDCCH is localized, the burden of channel estimation can be reduced. In this case, the hashing can be determined as follows.

Figure 21:
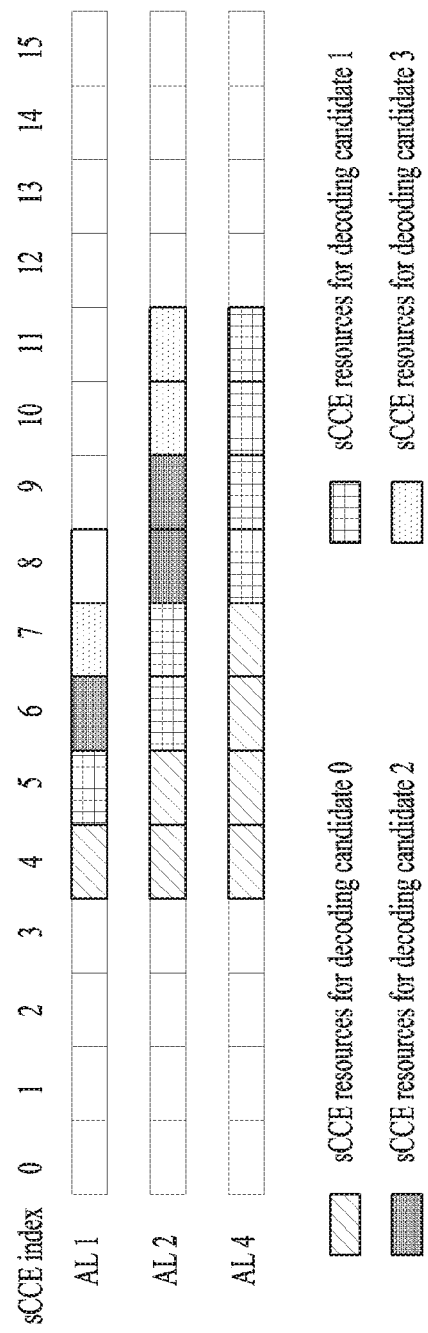
FIGS. 21 and 22 illustrate how an sPDCCH decoding candidate is configured based on a hashing function.

Method 1. Assuming that the maximum AL value monitored by a UE or supported by a cell is L_max, the index of the first sCCE constituting a search space may be determined based one of sCCEs satisfying the condition of sCCE index modulo L_max=0. In other words, the index of the first sCCE may be determined based on one sCCE among available sCCE indices indicated by the hashing function (that is, sCCEs satisfying the condition of sCCE index modulo L_max=0). The first sCCE may be commonly applied to all ALs. Similar to the legacy (E)PDCCH, decoding candidates to be monitored by the UE are determined using consecutive sCCEs from the first sCCE. For example, if the UE monitors ALs 1, 2, and 4, initial candidate sCCEs may be sCCEs #0, 4, 8, 12, 16, . . . because L_max=4. In this case, as shown in FIG. 21, the first sCCE may be set to sCCE #4 by the hashing function at a specific time, and the first sCCE may be commonly applied to all ALs. In addition, if the numbers of decoding candidates that the UE should monitor for ALs 1, 2, and 4 are set to 4, 4, and 2, respectively, sCCEs constituting the decoding candidates may be determined using consecutive sCCEs from sCCE #4 in each AL. In other words, the search space for AL 1 may be composed of sCCEs #4 to #7, the search space for AL 2 may be composed of sCCEs #4 to #11, and the search space for AL 4 may be composed of sCCEs #4 to #11.

Figure 22:
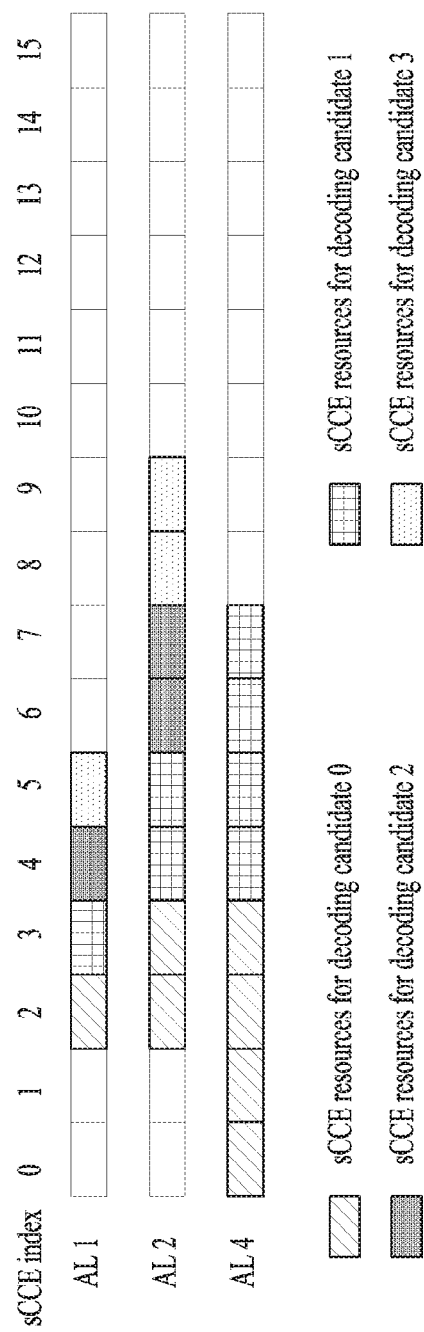

Method 2. Assuming that the minimum AL value monitored by a UE or supported by a cell is L_min, one of sCCEs satisfying the condition of sCCE index modulo L_min=0 may be determined as the first sCCE. In this case, the value of L_min may be always set to 1 regardless of the minimum AL value monitored by the UE or supported by the cell. If the index of the first sCCE (i.e., sCCE_first) is determined as described above, the index of the first sCCE of each AL may be given as floor(sCCE_first/AL)*AL. For example, if the sCCE_first is sCCE #k, floor(k/AL)*AL becomes the index of the first sCCE of each AL. In addition, if the UE monitors ALs 1, 2, and 4, initial candidate sCCEs may be sCCEs #0, 1, 2, 3, . . . because L_min=1. In this case, as shown in FIG. 22, the first sCCE may be set to sCCE #2 by the hashing function at a specific time. And, the first sCCE of each AL may be given as floor(2/AL)*AL, that is, the first sCCEs of ALs 1, 2, and 4 may be set to sCCE #2, sCCE #2, and sCCE #0, respectively. In this case, if the numbers of decoding candidates that the UE should monitor for ALs 1, 2, and 4 are set to 4, 4, and 2, respectively, sCCEs constituting the decoding candidates may be determined using consecutive sCCEs from sCCE #2, sCCE #2, and sCCE #0 in each AL. In other words, the search space for AL 1 may be composed of sCCEs #2 to #5, the search space for AL 2 may be composed of sCCEs #2 to #9, and the search space for AL 4 may be composed of sCCEs #0 to #7.

Method 3. Similar to the EPDCCH, when a set of PRBs constituting an sPDCCH search space is defined as an sPDCCH PRB-set, PRB resources constituting the sPDCCH PRB-set monitored by a UE may vary according to some or all of the following elements.
cell ID
UE ID
subframe index
slot index
sTTI index within a subframe
sTTI index within subframe (=radio frame) duration of 10 msec
sTTI index within subframe duration of 40 msec That is, the PRB resources constituting the sPDCCH PRB-set may vary depending on time.

Method 4. Similar to the EPDCCH, when a set of PRBs constituting an sPDCCH search space is defined as an sPDCCH PRB-set, a plurality of sPDCCH PRB-sets may be defined and among the plurality of sPDCCH PRB-sets, an sPDCCH PRB-set to be monitored by a UE at a specific time may be determined. The index of the sPDCCH PRB-set monitored by the UE may be determined by a specific hashing function and vary according to some or all of the following elements.
cell ID
UE ID
subframe index
slot index
sTTI index within a subframe
sTTI index within subframe (=radio frame) duration of 10 msec
sTTI index within subframe duration of 40 msec To further restrict the sCCE region the UE monitors the sPDCCH in, it may be determined that the sCCE resources constituting the sPDCCH decoding candidates should be within resources in a specific PRB group. To this end, if sCCE resources constituting the sPDCCH decoding candidates do not belong to the specific sCCE group, the sCCE resources may be wrapped around in a resource region of an sCCE group and then set to the first sCCE resource in the sCCE group. For example, if the sCCE group is composed of sCCEs #n, #n+1, #n+2, #n+N−1, sCCE resources after sCCE #n+N−1 may be wrapped around as sCCE #n to configure the sPDCCH decoding candidates using only sCCEs in the sCCE group. In this case, there may be a plurality of sCCE groups, and an sCCE group of the UE may be determined according to the first sCCE of the corresponding UE. For example, assuming that M sCCEs from sCCE #0 to sCCE #M−1 are present in the sPDCCH monitoring region, the sCCEs may be divided into M/N sCCE groups, and more particularly, into sCCE group 0 (sCCEs #0 to #N−1), sCCE group 1 (sCCEs #N to #2N−1), sCCE group 2 (sCCEs #2N to #3N−1), . . . . In this case, if the first sCCE constituting the sPDCCH search space is sCCE #k (see Methods 1 and 2), an sCCE group to which sCCE #k belongs may be determined as the sCCE group of the corresponding UE. The sPDCCH decoding candidates may be composed of only sCCE resources in the corresponding sCCE group.

E. Configuration of a Search Space on a Slot Basis

Figure 23:
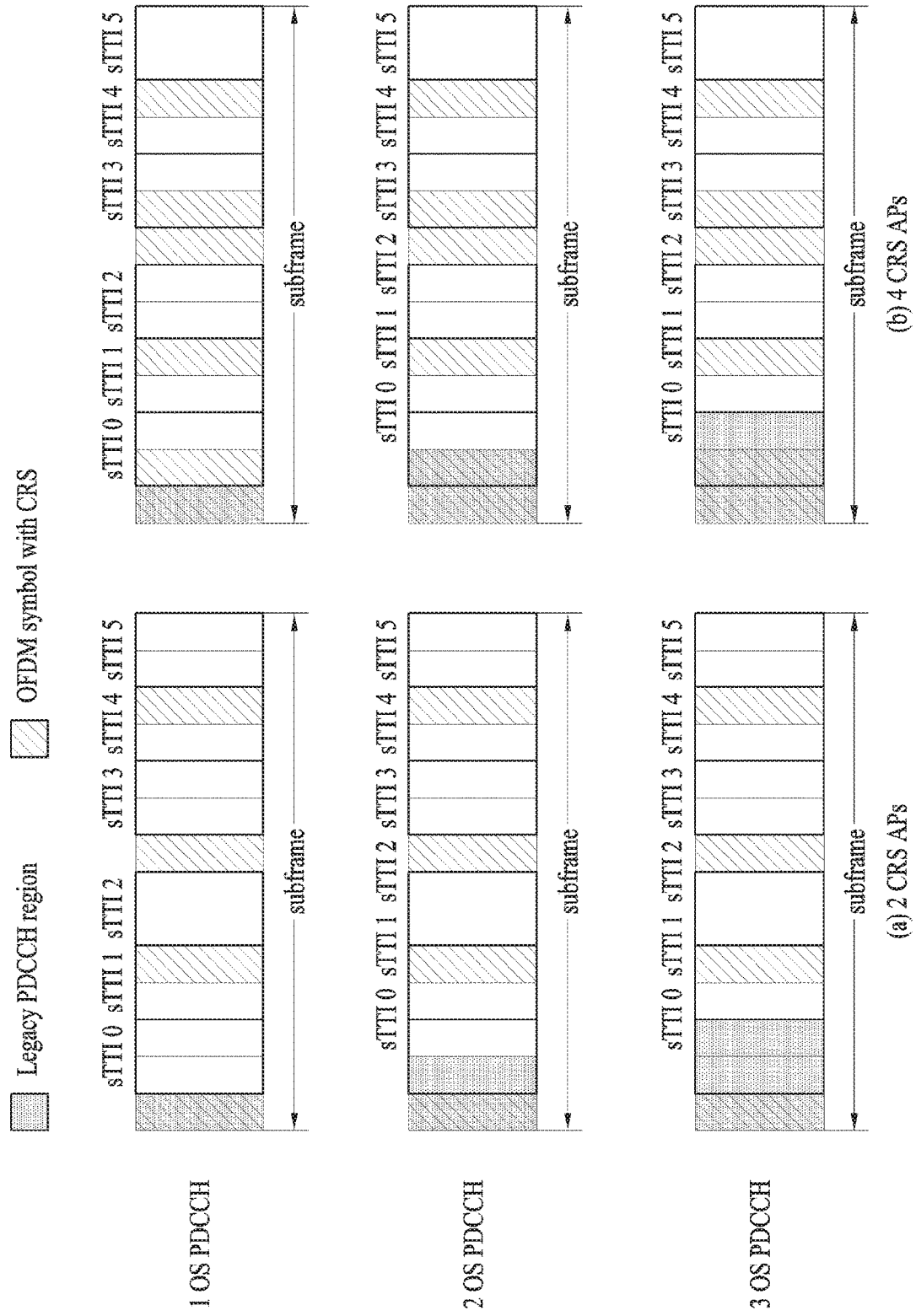
FIG. 23 illustrates sTTI boundaries in a legacy subframe.

In addition to the conventional TTI composed of fourteen OFDM symbols, an sTTI composed of two OFDM symbols and an sTTI composed of seven OFDM symbols can be introduced for latency reduction. In this case, a single eNB may support the two-OFDM-symbol sTTI and the seven-OFDM-symbol sTTI at the same time. In particular, the eNB may transmit and receive data to different UEs using different sTTI lengths in one subframe. From the perspective of eNB's scheduling, it is desirable that the sTTI boundary of the two-OFDM-symbol sTTI is aligned with that of the seven-OFDM-symbol sTTI as much as possible. In the case of the seven-OFDM-symbol sTTI, a slot boundary may be the sTTI boundary. On the other hand, in the case of the two-OFDM-symbol sTTI, the sTTI boundary thereof may be configured as shown in FIG. 23 in consideration of the sTTI boundary of the seven-OFDM-symbol sTTI. In FIG. 23, if one sTTI region is all included in an OFDM symbol region in which a legacy PDCCH is transmitted, the corresponding sTTI can be assumed to be a non-existing or unused sTTI.

In this case, the legacy PDCCH is transmitted in a legacy PDCCH region including the first OFDM symbol, and in all or some or all of the sTTIs, sPDCCHs containing information for scheduling data to be transmitted in the sTTIs may be transmitted.

Meanwhile, an extra downlink physical control channel can be transmitted in OFDM symbol #7 (i.e., the first OFDM symbol of the second slot of the subframe). In the present invention, such a downlink physical control channel is referred to as a Group PDCCH (GPDCCH) for convenience of description. A search space for monitoring the GPDCCH (i.e., GPDCCH search space) may be configured using resources in OFDM symbol #7. The GPDCCH search space may be UE-specific, UE-group-specific, or cell-specific. Particularly, the GPDCCH and GPDCCH search space may have the following features.

Hereinafter, resources for transmitting the GPDCCH and transmission structures will be described.

Alt 1. The GPDCCH is transmitted in OFDM symbol #7 and may have the same REG, CCE, and decoding candidate configurations as those of the legacy PDCCH with one transmission OFDM symbol. However, the GPDCCH search space may have decoding candidates less than those of the legacy PDCCH in order to reduce UE's decoding complexity. In the OFDM symbol the GPDCCH is transmitted in, a PRB region constituting the GPDCCH search space may be limited to a partial contiguous or non-contiguous PRB region in the entire system bandwidth for the purpose of multiplexing between the GPDCCH and a PDSCH, which is transmitted to a legacy UE. Such a PRB region may be pre-defined or notified to a UE by an eNB through the legacy PDCCH, SIB, or RRC.

Alt 2. The GPDCCH is transmitted in OFDM symbol #7 and may have the same REG, CCE, and decoding candidate configurations as those of the sPDCCH with one transmission OFDM symbol. However, the GPDCCH search space may have decoding candidates more or less than those of the sPDCCH. In the OFDM symbol the GPDCCH is transmitted in, a PRB region constituting the GPDCCH search space may be limited to a partial contiguous or non-contiguous PRB region in the entire system bandwidth. Such a PRB region may be pre-defined or notified to a UE by an eNB through the legacy PDCCH, SIB, or RRC. Alternatively, the PRB region constituting the GPDCCH search space may be identical to that constituting the sPDCCH search space.

Hereinafter, the role of the GPDCCH and information transmitted on the GPDCCH will be described.

Information on sTTIs in a slot in which the GPDCCH is transmitted (e.g., configuration information on sPDCCH/sPDSCH transmission) can be signaled to a UE through the GPDCCH. The information transmitted through the GPDCCH may include some or all of the following information.

Information on a PRB/bandwidth region where the UE can receive control/data using an sTTI Information on a PRB region where the UE can monitor the sPDCCH, that is, information on the PRB region the sPDCCH can be transmitted in Information on a region the sPDSCH can be transmitted in The GPDCCH can carry scheduling information for data to be transmitted in the first sTTI (for example, sTTI #3 of FIG. 23) of the slot the GPDCCH is transmitted in. That is, a DL grant for the data to be transmitted in the first sTTI (for example, sTTI #3 of FIG. 23) of the slot where the GPDCCH is transmitted can be transmitted through the GPDCCH.

The GPDCCH can allow Multi-sTTI scheduling to be performed for data to be transmitted in sTTIs existing in the slot the GPDCCH is transmitted in. In this case, the GPDCCH may carry some or all of the following information.

Information on the location of an sTTI(s) reserved for data transmission among the sTTIs existing in the slot in which the GPDCCH is transmitted may be transmitted. For example, the eNB may inform the UE of the location of the data transmission sTTI in the form of a bitmap through the GPDCCH. If this information is not transmitted over the GPDCCH, the UE may assume that data is scheduled in all sTTIs (for example, sTTIs #3 to #5 of FIG. 23) of the slot the GPDCCH is transmitted in. Alternatively, the eNB may inform the UE of either single-sTTI scheduling or multi-sTTI scheduling through the GPDCCH. In the case of sPDSCH scheduling, if the GPDCCH indicates the single-sTTI scheduling, the UE may assume that the SPDSCH is transmitted in the first sTTI (for example, sTTI #3 of FIG. 23) of the same slot. On the other hand, if the GPDCCH indicates the multi-sTTI scheduling, the UE may assume that the sPDSCH is transmitted in multiple sTTIs.

The role of the GPDCCH and the information transmitted on the GPDCCH can be equally applied to the legacy PDCCH. In this case, the legacy PDCCH carries information on sTTIs existing in the first slot of the subframe, and the GPDCCH carries information on sTTIs existing in the second slot of the frame.

In the sTTI structure shown in FIG. 23, the first OFDM symbol of the second slot (i.e., OFDM symbol #7) may be included in the first sTTI of the second slot (i.e., sTTI #3). In this case, the number of OFDM symbols in sTTI #3 becomes three.

Figure 24:
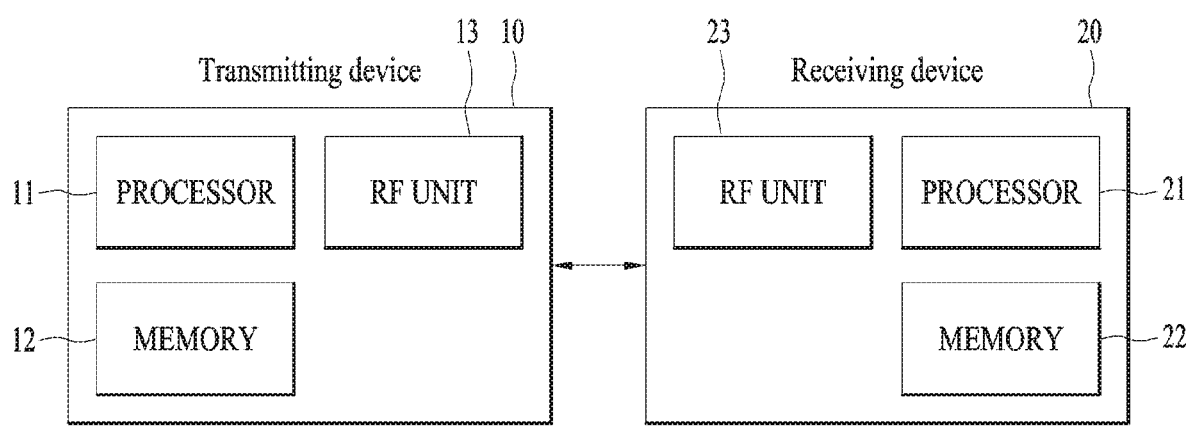
FIG. 24 is a block diagram illustrating elements of a transmitting device 10 and a receiving device 20 for implementing the present invention.

FIG. 24 is a block diagram illustrating elements of a transmitting device 10 and a receiving device 20 for implementing the present invention.

The transmitting device 10 and the receiving device 20 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described embodiments of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas.

A signal processing process of the receiving device 20 is the reverse of the signal processing process of the transmitting device 10. Under control of the processor 21, the RF unit 23 of the receiving device 20 receives radio signals transmitted by the transmitting device 10. The RF unit 23 may include $N_r$ (where $N_r$ is a positive integer) receive antennas and frequency down-converts each signal received through receive antennas into a baseband signal. The processor 21 decodes and demodulates the radio signals received through the receive antennas and restores data that the transmitting device 10 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 20. An RS transmitted through a corresponding antenna defines an antenna from the view point of the receiving device 20 and enables the receiving device 20 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas.

In the embodiments of the present invention, a UE operates as the transmitting device 10 in UL and as the receiving device 20 in DL. In the embodiments of the present invention, an eNB operates as the receiving device 20 in UL and as the transmitting device 10 in DL. Hereinafter, a processor, an RF unit, and a memory included in the UE will be referred to as a UE processor, a UE RF unit, and a UE memory, respectively, and a processor, an RF unit, and a memory included in the eNB will be referred to as an eNB processor, an eNB RF unit, and an eNB memory, respectively.

The eNB processor may control the eNB RF unit to transmit a signal (e.g., sPDCCH/SPDSCH) according to any one of the methods proposed in the present invention. In addition, the UE processor may control the UE RF unit to receive a signal (e.g., sPDCCH/sPDSCH) according to any one of the methods proposed in the present invention.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The embodiments of the present invention are applicable to an eNB, a UE, or other devices in a wireless communication system.

What is claimed is:

1. A method of receiving a downlink channel by a User Equipment (UE) in a wireless communication system, the method comprising:
receiving a downlink control channel carrying downlink control information by blind decoding downlink control channel candidates in at least one Orthogonal Frequency Division Multiplexing (OFDM) symbol within a Transmission Time Interval (TTI); and
receiving a downlink data channel within the TTI based on the downlink control information,
wherein each downlink control channel candidate is composed of at least one Control Channel Element (CCE) based on a Reference Signal (RS) configuration in an OFDM symbol, each CCE is composed of a plurality of Resource Element Groups (REGs), and each REG is composed of N consecutive subcarriers in one same OFDM symbol,
wherein the number of CCEs constituting one downlink control channel candidate in an OFDM symbol having an RS set therein is twice the number of CCEs constituting one downlink control channel candidate in an OFDM symbol having no RS set therein, and wherein the downlink data channel is received using at least one Resource Block (RB) and N is equal to the number of subcarriers constituting one RB.

2. The method of claim 1, wherein N is 12.

3. The method of claim 1, wherein the number of REGs constituting each CCE varies according to a Reference Signal (RS) configuration in an OFDM symbol, and wherein the number of REGs constituting one CCE in an OFDM symbol having an RS set therein is greater than the number of REGs constituting one CCE in an OFDM symbol having no RS set therein.

4. The method of claim 1, wherein receiving the downlink control channel comprises monitoring downlink control channel candidates in a plurality of search spaces configured per Aggregation Level (AL), and wherein each search space has an identical starting location in a CCE domain regardless of ALs.

5. The method of claim 1, wherein the TTI is equal to or less than 0.5 ms in a time domain.

6. The method of claim 1, wherein the TTI is configured within a different TTI with a length of 1 ms in a time domain.

7. The method of claim 1, wherein CCEs in the at least one OFDM symbol are indexed in a time-first or frequency-first manner.

8. A User Equipment (UE) used in a wireless communication system, the UE comprising:
a Radio Frequency (RF) unit; and
a processor configured to control the RF unit, the processor configured to:
receive a downlink control channel carrying downlink control information by blind decoding downlink control channel candidates in at least one Orthogonal Frequency Division Multiplexing (OFDM) symbol within a Transmission Time Interval (TTI); and
receive a downlink data channel within the TTI based on the downlink control information,
wherein each downlink control channel candidate is composed of at least one Control Channel Element (CCE) based on a Reference Signal (RS) configuration in an OFDM symbol, each CCE is composed of a plurality of Resource Element Groups (REGs), and each REG is composed of N consecutive subcarriers in one same OFDM symbol,
wherein the number of CCEs constituting one downlink control channel candidate in an OFDM symbol having an RS set therein is twice the number of CCEs constituting one downlink control channel candidate in an OFDM symbol having no RS set therein, and
wherein the downlink data channel is received using at least one Resource Block (RB) and N is equal to the number of subcarriers constituting one RB.

9. The UE of claim 8, wherein N is 12.

10. The UE of claim 8, wherein the number of REGs constituting each CCE varies according to a Reference Signal (RS) configuration in an OFDM symbol, and wherein the number of REGs constituting one CCE in an OFDM symbol having an RS set therein is greater than the number of REGs constituting one CCE in an OFDM symbol having no RS set therein.

11. The UE of claim 8, wherein receiving the downlink control channel comprises monitoring downlink control channel candidates in a plurality of search spaces configured per Aggregation Level (AL), and wherein each search space has an identical starting location in a CCE domain regardless of ALs.

12. The UE of claim 8, wherein the TTI is equal to or less than 0.5 ms in a time domain.

13. The UE of claim 8, wherein the TTI is configured within a different TTI with a length of 1 ms in a time domain.

14. The UE of claim 8, wherein CCEs in the at least one OFDM symbol are indexed in a time-first or frequency-first manner.

* * * * *